(12) United States Patent
Suzuki et al.

(10) Patent No.: US 9,544,535 B2
(45) Date of Patent: *Jan. 10, 2017

(54) TRANSMISSION SYSTEM, TRANSMISSION APPARATUS, AND TRANSMISSION METHOD FOR TRANSMITTING VIDEO DATA

(71) Applicant: Sony Corporation, Tokyo (JP)

(72) Inventors: Kazuyoshi Suzuki, Tokyo (JP); Katsuji Matsuura, Tokyo (JP)

(73) Assignee: Sony Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/702,053

(22) Filed: May 1, 2015

(65) Prior Publication Data

US 2015/0237299 A1 Aug. 20, 2015

Related U.S. Application Data

(63) Continuation of application No. 14/332,142, filed on Jul. 15, 2014, now Pat. No. 9,065,963, which is a
(Continued)

(30) Foreign Application Priority Data

May 16, 2006 (JP) ................ P2006-136917
Jun. 2, 2006 (JP) ................ P2006-154864

(51) Int. Cl.
*H04N 7/088* (2006.01)
*H04N 7/087* (2006.01)
(Continued)

(52) U.S. Cl.
CPC .............. *H04N 7/083* (2013.01); *G09G 5/003* (2013.01); *H04N 5/04* (2013.01); *H04N 7/015* (2013.01);
(Continued)

(58) Field of Classification Search
CPC ........ H04N 7/087; H04N 7/088; H04N 7/035; G09G 5/003
(Continued)

(56) References Cited

U.S. PATENT DOCUMENTS 6,747,580 B1  6/2004 Schmidt
6,914,637 B1  7/2005 Wolf et al.
(Continued)

FOREIGN PATENT DOCUMENTS

JP 09-037083 A 2/1997
JP 2001078008 A 3/2001
(Continued)

OTHER PUBLICATIONS

Anonymous: "High-Definition Multimedia Specification, specification version 1.2a" Dec. 14, 2005 (Dec. 14, 2005), XP 030001518, pp. 67-74, 87-90, 8-9.
(Continued)

*Primary Examiner* — Michael Lee
(74) *Attorney, Agent, or Firm* — Lerner, David, Littenberg, Krumholz & Mentlik, LLP

(57) ABSTRACT

An HDMI® source determines whether or not an HDMI® sink can receive a sub-signal based on VSDB of E-EDID. When the HDMI® sink can receive the sub-signal, the HDMI® source adds a sub-signal to pixel data of a main image composed of pixel data whose number of bits is smaller than that of transmission pixel data transmitted by a transmitter, thereby constructing transmission pixel data. This data is transmitted by the transmitter through TMDS channels #0 to #2. Furthermore, the HDMI® source transmits a general control packet containing sub-signal information indicating whether or not the sub-signal is contained in the transmission pixel data in the control period of a
(Continued)

vertical blanking period. The present invention can be applied to, for example, HDMI®.

2 Claims, 49 Drawing Sheets

Related U.S. Application Data continuation of application No. 14/297,157, filed on Jun. 5, 2014, now Pat. No. 8,982,278, which is a continuation of application No. 14/149,054, filed on Jan. 7, 2014, now Pat. No. 8,817,182, which is a continuation of application No. 13/544,429, filed on Jul. 9, 2012, now Pat. No. 8,854,543, which is a continuation of application No. 11/919,883, filed as application No. PCT/JP2007/060009 on May 16, 2007, now Pat. No. 8,253,859.

(51) Int. Cl.
| | |
|---|---|
| *H04N 7/083* | (2006.01) |
| *G09G 5/00* | (2006.01) |
| *H04N 7/10* | (2006.01) |
| *H04N 5/04* | (2006.01) |
| *H04N 7/08* | (2006.01) |
| *H04N 7/015* | (2006.01) |
| *H04N 7/081* | (2006.01) |
| *H04N 7/035* | (2006.01) |
| *G09G 5/02* | (2006.01) |

(52) U.S. Cl.
CPC ............ *H04N 7/081* (2013.01); *H04N 7/0803* (2013.01); *H04N 7/087* (2013.01); *H04N 7/10* (2013.01); *G09G 5/02* (2013.01); *G09G 2340/10* (2013.01); *G09G 2340/12* (2013.01); *G09G 2370/047* (2013.01); *H04N 7/035* (2013.01); *H04N 7/088* (2013.01)

(58) Field of Classification Search
USPC ........................................................ 348/478
See application file for complete search history.

(56) References Cited

U.S. PATENT DOCUMENTS

| | | | |
|---|---|---|---|
| 7,020,121 B2 | 3/2006 | Hardacker et al. | |
| 7,558,326 B1 | 7/2009 | Lyle et al. | |
| 9,065,963 B2* | 6/2015 | Suzuki | G09G 5/003 |
| 2003/0231191 A1 | 12/2003 | Glen | |
| 2004/0080671 A1 | 4/2004 | Siemens et al. | |
| 2004/0125886 A1 | 7/2004 | Berard | |
| 2004/0143847 A1 | 7/2004 | Suzuki et al. | |
| 2004/0158873 A1 | 8/2004 | Pasqualino | |
| 2005/0027993 A1 | 2/2005 | Yanagisawa | |
| 2005/0027994 A1 | 2/2005 | Sai | |
| 2005/0047447 A1 | 3/2005 | Satoh et al. | |
| 2005/0063707 A1 | 3/2005 | Imai | |
| 2005/0068346 A1 | 3/2005 | Ogawa et al. | |
| 2005/0105498 A1 | 5/2005 | Hardacker et al. | |
| 2005/0120384 A1 | 6/2005 | Stone et al. | |
| 2005/0134739 A1 | 6/2005 | Bian | |
| 2005/0144468 A1 | 6/2005 | Northcutt et al. | |
| 2005/0162184 A1 | 7/2005 | Shibata et al. | |
| 2005/0182876 A1 | 8/2005 | Kim et al. | |
| 2005/0195894 A1 | 9/2005 | Kim et al. | |
| 2005/0223411 A1 | 10/2005 | Jung et al. | |
| 2005/0228995 A1 | 10/2005 | Kwak et al. | |
| 2005/0246329 A1 | 11/2005 | Milirud et al. | |
| 2005/0246430 A1 | 11/2005 | Milirud et al. | |
| 2005/0246753 A1 | 11/2005 | Milirud et al. | |
| 2005/0259948 A1 | 11/2005 | Ando | |
| 2005/0268321 A1 | 12/2005 | Milirud et al. | |
| 2006/0001554 A1 | 1/2006 | Morishita | |
| 2006/0010274 A1 | 1/2006 | Olson | |
| 2006/0036788 A1 | 2/2006 | Galang et al. | |
| 2006/0050657 A1 | 3/2006 | Lee | |
| 2006/0055710 A1 | 3/2006 | Lo et al. | |
| 2006/0061517 A1 | 3/2006 | Jolly et al. | |
| 2006/0067690 A1 | 3/2006 | Tatum et al. | |
| 2006/0074682 A1 | 4/2006 | Chou et al. | |
| 2006/0077298 A1 | 4/2006 | Gotanda et al. | |
| 2006/0077778 A1 | 4/2006 | Tatum et al. | |
| 2006/0089735 A1 | 4/2006 | Atkinson | |
| 2006/0095623 A1 | 5/2006 | Nio et al. | |
| 2006/0095638 A1 | 5/2006 | Unger | |
| 2006/0101485 A1 | 5/2006 | Nishimoto | |
| 2006/0104392 A1 | 5/2006 | Chung | |
| 2006/0209745 A1 | 9/2006 | MacMullan et al. | |
| 2006/0209880 A1 | 9/2006 | Chang et al. | |
| 2007/0009060 A1* | 1/2007 | Lavelle | G06F 3/14 375/295 |
| 2007/0070402 A1 | 3/2007 | Kitayama et al. | |

FOREIGN PATENT DOCUMENTS

| | | |
|---|---|---|
| JP | 2002229444 A | 8/2002 |
| JP | 2005-102161 A | 4/2005 |
| JP | 2005-318490 A | 4/2005 |
| WO | 02/078336 A1 | 10/2002 |

OTHER PUBLICATIONS

Supplementary Partial European Search Report EP 07743444, dated Apr. 5, 2011.
Office Action from Japanese Application No. 2006-136917, dated Mar. 27, 2012.

* cited by examiner

FIG. 10

| Byte# | 7 | 6 | 5 | 4 | 3 | 2 | 1 | 0 | |
|---|---|---|---|---|---|---|---|---|---|
| 0 | Vendor-specific tag code (=3) | | | | | | | | |
| 1 | Length (=N) | | | | | | | | |
| 2 | 24-bit IEEE Registration Identifier (0×000C03) (least significant byte first) | | | | | | | | |
| 3 | | | | | | | | | |
| 4 | A | | | | B | | | | |
| 5 | C | | | | D | | | | |
| 6 | Supports_AI | Supports_48 bit | Supports_36 bit | Supports_30 bit | Reserved(0) | | | | ← extension fields |
| 7 | Reserved | | | | | | | | |
| 8..N-1 | Reserved(0) | | | | | | | | |
| N | Reserved(0) | | | | | | | | → |

FIG. 11

General Control Packet Header

| Bit / Byte | 7 | 6 | 5 | 4 | 3 | 2 | 1 | 0 |
|---|---|---|---|---|---|---|---|---|
| HB0 | 0 | 0 | 0 | 0 | 0 | 0 | 1 | 0 |
| HB1 | 0 | 0 | 0 | 0 | 0 | 0 | 1 | 1 |
| HB2 | 0 | 0 | 0 | 0 | 0 | 0 | 0 | 0 |

General Control Subpacket

| Bit / Byte | 7 | 6 | 5 | 4 | 3 | 2 | 1 | 0 |
|---|---|---|---|---|---|---|---|---|
| SB0 | 0 | 0 | 0 | Clear_AVMUTE | 0 | 0 | 0 | Set_AVMUTE |
| SB1 | 0 | PP2 | PP1 | PP0 | 0 | CD2 | CD1 | CD0 |
| SB2 | 0 | 0 | 0 | 0 | 0 | 0 | 0 | 0 |
| SB3 | 0 | 0 | 0 | 0 | 0 | 0 | 0 | 0 |
| SB4 | 0 | 0 | 0 | 0 | 0 | 0 | 0 | 0 |
| SB5 | 0 | 0 | 0 | 0 | 0 | 0 | 0 | 0 |
| SB6 | 0 | 0 | 0 | 0 | 0 | 0 | 0 | 0 |

FIG. 12

| CD2 | CD1 | CD0 | Color Depth |
|---|---|---|---|
| 0 | 0 | 0 | Color Depth not indicated |
| 0 | 0 | 1 | Reserved |
| 0 | 1 | 0 | Reserved |
| 0 | 1 | 1 | Reserved |
| 1 | 0 | 0 | 24 bits per pixel |
| 1 | 0 | 1 | 30 bits per pixel |
| 1 | 1 | 0 | 36 bits per pixel |
| 1 | 1 | 1 | 48 bits per pixel |

FIG. 17

| Byte# | 7 | 6 | 5 | 4 | 3 | 2 | 1 | 0 | |
|---|---|---|---|---|---|---|---|---|---|
| 0 | Vendor-specific tag code (=3) | | | | | | | | |
| 1 | Length (=N) | | | | | | | | |
| 2 | 24-bit IEEE Registration Identifier (0×000C03) (least significant byte first) | | | | | | | | |
| 3 | | | | | | | | | |
| 4 | A | | | | | B | | | |
| 5 | C | | | | | D | | | |
| 6 | Supports _AI | Supports _48 bit | Supports _36 bit | Supports _30 bit | Reserved(0) | | | | |
| 7 | Sub Data Support | Sub 8 bit | Sub 4 bit | Sub 2 bit | Reserved | | | | extension fields |
| 8...N−1 | Reserved(0) | | | | | | | | |
| N | Reserved(0) | | | | | | | | |

FIG. 18

General Control Packet Header

| Bit<br>Byte | 7 | 6 | 5 | 4 | 3 | 2 | 1 | 0 |
|---|---|---|---|---|---|---|---|---|
| HB0 | 0 | 0 | 0 | 0 | 0 | 0 | 1 | 0 |
| HB1 | 0 | 0 | 0 | 0 | 0 | 0 | 1 | 1 |
| HB2 | 0 | 0 | 0 | 0 | 0 | 0 | 0 | 0 |

General Control Subpacket

| Bit<br>Byte | 7 | 6 | 5 | 4 | 3 | 2 | 1 | 0 |
|---|---|---|---|---|---|---|---|---|
| SB0 | 0 | 0 | 0 | Clear_AVMUTE | 0 | 0 | 0 | 0 |
| SB1 | 0 | PP2 | PP1 | PP0 | 0 | CD2 | CD1 | CD0 |
| SB2 | 0 | 0 | 0 | 0 | 0 | SD2 | SD1 | SD0 |
| SB3 | 0 | 0 | 0 | 0 | 0 | 0 | 0 | 0 |
| SB4 | 0 | 0 | 0 | 0 | 0 | 0 | 0 | 0 |
| SB5 | 0 | 0 | 0 | 0 | 0 | 0 | 0 | 0 |
| SB6 | 0 | 0 | 0 | 0 | 0 | 0 | 0 | 0 |

FIG. 19

| SD2 | SD1 | SD0 | Sub Data Bit |
|---|---|---|---|
| 0 | 0 | 0 | Sub Data not Inserted |
| 0 | 0 | 1 | 2 bit sub data |
| 0 | 1 | 0 | 4 bit sub data |
| 0 | 1 | 1 | 8 bit sub data |
| 1 | 0 | 0 | Reserved |
| 1 | 0 | 1 | Reserved |
| 1 | 1 | 0 | Reserved |
| 1 | 1 | 1 | Reserved |

FIG. 31

| BYTE | 7 | 6 | 5 | 4 | 3 | 2 | 1 | 0 |
|---|---|---|---|---|---|---|---|---|
| 0 | TAG CODE | | | | DATA LENGTH | | | |
| 1 | IDENTIFICATION CODE | | | | | | | |
| 2 | | | | | | | | |
| 3 | | | | | | | | |
| 4 | A | | | | B | | | |
| 5 | C | | | | D | | | |
| 6 | SUPPORT AI | SUPPORT_48 bit | SUPPORT_36 bit | SUPPORT_30 bit | PRESENCE/ABSENCE OF SUB-IMAGE (OR PRESENCE/ABSENCE OF AUXILIARY AUDIO) | | | |
| 7...N-1 | UNDEFINED | | | | | | | |
| N | UNDEFINED | | | | | | | |

EXAMPLE OF DEFINITION IN VSDB

EXAMPLE OF DISPLAY OF MAIN IMAGE AND SUB-IMAGE

FIG. 38

24-BIT MODE: P(PIXEL/GROUP) = 1 PIXEL; L(FRAGMENT/GROUP) = 1 FRAGMENT (1 TMDS CHARACTER) STANDARD HDMI FORMAT

| FRAGMENT | PHASE | PIXEL | 8-BIT HDMI PIXEL DATA CODE (TO ENCODER) |||||||||
|---|---|---|---|---|---|---|---|---|---|---|
| | | | BIT 0 | BIT 1 | BIT 2 | BIT 3 | BIT 4 | BIT 5 | BIT 6 | BIT 7 |
| 8P0 | 0 | A | A0 | A1 | A2 | A3 | A4 | A5 | A6 | A7 |

30-BIT MODE: P = 4 PIXELS, L = 5 FRAGMENTS

| FRAGMENT | PHASE | PIXEL | 8-BIT HDMI PIXEL DATA CODE (TO ENCODER) |||||||||
|---|---|---|---|---|---|---|---|---|---|---|
| | | | BIT 0 | BIT 1 | BIT 2 | BIT 3 | BIT 4 | BIT 5 | BIT 6 | BIT 7 |
| 10P0 | 0 | A | A0 | A1 | A2 | A3 | A4 | A5 | A6 | A7 |
| 10P1 | 1 | A+B | A8 | A9 | B0 | B1 | B2 | B3 | B4 | B5 |
| 10P2 | 2 | B+C | B6 | B7 | B8 | B9 | C0 | C1 | C2 | C3 |
| 10P3 | 3 | C+D | C4 | C5 | C6 | C7 | C8 | C9 | D0 | D1 |
| 10P4 | 4 | D | D2 | D3 | D4 | D5 | D6 | D7 | D8 | D9 |

36-BIT MODE: P = 2 PIXELS, L = 3 FRAGMENTS

| FRAGMENT | PHASE | PIXEL | 8-BIT HDMI PIXEL DATA CODE (TO ENCODER) |||||||||
|---|---|---|---|---|---|---|---|---|---|---|
| | | | BIT 0 | BIT 1 | BIT 2 | BIT 3 | BIT 4 | BIT 5 | BIT 6 | BIT 7 |
| 12P0 | 0 | A | A0 | A1 | A2 | A3 | A4 | A5 | A6 | A7 |
| 12P1 | 1 | A+B | A8 | A9 | A10 | A11 | B0 | B1 | B2 | B3 |
| 12P2 | 2 | B | B4 | B5 | B6 | B7 | B8 | B9 | B10 | B1 |

48-BIT MODE: P = 1 PIXEL, L = 2 FRAGMENTS

| FRAGMENT | PHASE | PIXEL | 8-BIT HDMI PIXEL DATA CODE (TO ENCODER) |||||||||
|---|---|---|---|---|---|---|---|---|---|---|
| | | | BIT 0 | BIT 1 | BIT 2 | BIT 3 | BIT 4 | BIT 5 | BIT 6 | BIT 7 |
| 16P0 | 0 | A | A0 | A1 | A2 | A3 | A4 | A5 | A6 | A7 |
| 16P1 | 1 | A | A8 | A9 | A10 | A11 | A12 | A13 | A14 | A15 |

FIG. 39

24-BIT MODE

GROUP SIZE = 1 PIXEL, 1 FRAGMENT

| FRAGMENT | HS/VS VALUE |
|---|---|
| 8C0 | S |

FIG. 40

30-BIT MODE

GROUP SIZE = 4 PIXELS, 5 FRAGMENTS

| FRAGMENT | HS/VS VALUE |
|---|---|
| 10C0 | S |
| 10C1 | T |
| 10C2 | U |
| 10C3 | V |
| 10C4 | V |

FIG. 41

REMAINDER OF 30-BIT MODE
(FALLING EDGE OF DE OCCURS IN INTERMEDIATE GROUP)

| FRAGMENT | HS/VS VALUE |
|---|---|
| 10PC2 | T |
| 10PC3 | U |
| 10PC4 | V |

FIG. 42

36-BIT MODE

GROUP SIZE = 2 PIXELS, 3 FRAGMENTS

| FRAGMENT | HS/VS VALUE |
|---|---|
| 12C0 | S |
| 12C1 | T |
| 12C2 | T |

FIG. 43

48-BIT MODE

GROUP SIZE = 1 PIXEL, 2 FRAGMENTS

| FRAGMENT | HS/VS VALUE |
|---|---|
| 16C0 | S |
| 16C1 | S |

FIG. 44

COLOR DEPTH (CD FIELD) VALUE

| CD3 | CD2 | CD1 | CD0 | COLOR DEPTH |
|---|---|---|---|---|
| 0 | 0 | 0 | 0 | COLOR DEPTH NOT INDICATED |
| 0 | 0 | 0 | 1 | RESERVED |
| 0 | 0 | 1 | 0 | RESERVED |
| 0 | 0 | 1 | 1 | RESERVED |
| 0 | 1 | 0 | 0 | 24 BITS PER PIXEL |
| 0 | 1 | 0 | 1 | 30 BITS PER PIXEL |
| 0 | 1 | 1 | 0 | 36 BITS PER PIXEL |
| 0 | 1 | 1 | 1 | 48 BITS PER PIXEL |
| ALL OTHER VALUES | | | | RESERVED |

| PIXEL PACKING PHASE (PP FIELD) VALUE | | | | |
|---|---|---|---|---|
| PP3 | PP2 | PP1 | PP0 | PIXEL PACKING PHASE |
| 0 | 0 | 0 | 0 | PHASE 4 (10P4) |
| 0 | 0 | 0 | 1 | PHASE 1 (10P1, 12P1, 16P1) |
| 0 | 0 | 1 | 0 | PHASE 2 (10P2, 12P2) |
| 0 | 0 | 1 | 1 | PHASE 3 (10P3) |
| 0 | 1 | 0 | 0 | RESERVED |
| ALL OTHER VALUES | | | | RESERVED |

$YC_BC_R$ 4:2:2 OF PIXEL DOUBLING

FIG. 47

VIDEO COLOR COMPONENT GAMUT

| COLOR COMPONENT | COMPONENT BIT DEPTH | FULL RANGE | |
|---|---|---|---|
| | | BLACK LEVEL | NOMINAL PEAK (WHITE LEVEL) |
| R/G/B | 8 | 0 | 255 |
| R/G/B | 10 | 0 | 1023 |
| R/G/B | 12 | 0 | 4095 |
| R/G/B | 16 | 0 | 65535 |

| COLOR COMPONENT | BIT DEPTH | FULL RANGE | LIMITED RANGE | | VALID RANGE |
|---|---|---|---|---|---|
| | | | BLACK LEVEL | NOMINAL PEAK | |
| Y | 8 | NOT PERMITTED | 16 | 235 | FROM 1 TO 254 |
| Cb/Cr | 8 | NOT PERMITTED | — | 16 AND 240 | FROM 1 TO 254 |
| Y | 10 | NOT PERMITTED | 64 | 940 | FROM 4 TO 1019 |
| Cb/Cr | 10 | NOT PERMITTED | — | 64 AND 960 | FROM 4 TO 1019 |
| Y | 12 | NOT PERMITTED | 256 | 3760 | FROM 16 TO 4079 |
| Cb/Cr | 12 | NOT PERMITTED | — | 256 AND 3840 | FROM 16 TO 4079 |
| Y | 16 | NOT PERMITTED | 4096 | 60160 | FROM 256 TO 65279 |
| Cb/Cr | 16 | NOT PERMITTED | — | 4096 AND 61440 | FROM 256 TO 65279 |

FIG. 52

36 BITS/PIXEL: RECOMMENDED N AND EXPECTED CTS FOR 32 kHz

| TMDS CLOCK (MHz) | 32 kHz | |
|---|---|---|
| | N | CTS |
| 25.2/1.001 | 9152 | 84375 |
| 25.2 | 4096 | 37800 |
| 27 | 4096 | 40500 |
| 27 *1.001 | 8192 | 81081 |
| 54 | 4096 | 81000 |
| 54 *1.001 | 4096 | 81081 |
| 74.25/1.001 | 11648 | 316406-316407* |
| 74.25 | 4096 | 111375 |
| 148.5/1.001 | 11648 | 632812-632813* |
| 148.5 | 4096 | 222750 |
| OTHERS | 4096 | MEASURED VALUE |

*NOTES: THIS VALUE IS ALTERNATELY USED DUE TO LIMITATIONS ON N.

FIG. 53

36 BITS/PIXEL: RECOMMENDED N AND EXPECTED CTS FOR 44.1 kHz AND MULTIPLES

| TMDS CLOCK (MHz) | 44.1 kHz N | 44.1 kHz CTS | 88.2 kHz N | 88.2 kHz CTS | 176.4 kHz N | 176.4 kHz CTS |
|---|---|---|---|---|---|---|
| 25.2/1.001<br>25.2 | 7007<br>6272 | 46875<br>42000 | 14014<br>12544 | 46875<br>42000 | 28028<br>25088 | 46875<br>42000 |
| 27<br>27*1.001 | 6272<br>6272 | 45000<br>45045 | 12544<br>12544 | 45000<br>45045 | 25088<br>25088 | 45000<br>45045 |
| 54<br>54*1.001 | 6272<br>6272 | 90000<br>90090 | 12544<br>12544 | 90000<br>90090 | 25088<br>25088 | 90000<br>90090 |
| 74.25/1.001<br>74.25 | 17836<br>6272 | 351562-351563*<br>123750 | 35672<br>12544 | 351562-351563*<br>123750 | 71344<br>25088 | 341562-351563*<br>123750 |
| 148.5/1.001<br>148.5 | 17836<br>6272 | 703125<br>247500 | 35672<br>12544 | 703125<br>247500 | 71344<br>25088 | 703125<br>247500 |
| OTHERS | 6272 | MEASURED VALUE | 12544 | MEASURED VALUE | 25088 | MEASURED VALUE |

*NOTES: THIS VALUE IS ALTERNATELY USED DUE TO LIMITATIONS ON N.

FIG. 54

36 BITS/PIXEL: RECOMMENDED N AND EXPECTED CTS FOR 48 kHz AND MULTIPLES

| TMDS CLOCK (MHz) | 48 kHz | | 96 kHz | | 192 kHz | |
|---|---|---|---|---|---|---|
| | N | CTS | N | CTS | N | CTS |
| 25.2/1.001<br>25.2 | 9125<br>6144 | 56250<br>37800 | 18304<br>12288 | 56250<br>37800 | 36608<br>24576 | 56250<br>37800 |
| 27<br>27*1.001 | 6144<br>8292 | 40500<br>54054 | 12288<br>16384 | 40500<br>54054 | 24576<br>32768 | 40500<br>54054 |
| 54<br>54*1.001 | 6144<br>6144 | 81000<br>81081 | 12288<br>12288 | 81000<br>81081 | 24576<br>24576 | 81000<br>81081 |
| 74.25/1.001<br>74.25 | 11648<br>6144 | 210937-210938*<br>111375 | 23296<br>12288 | 210937-210938*<br>111375 | 46592<br>24576 | 210937-210938*<br>111375 |
| 148.5/1.001<br>148.5 | 11648<br>6144 | 421875<br>222750 | 23296<br>12288 | 421875<br>222750 | 46592<br>24576 | 421875<br>222750 |
| OTHERS | 6144 | MEASURED VALUE | 12288 | MEASURED VALUE | 24576 | MEASURED VALUE |

*NOTES: THIS VALUE IS ALTERNATELY USED DUE TO LIMITATIONS ON N.

FIG. 55

| 48 BITS/PIXEL: RECOMMENDED N AND EXPECTED CTS FOR 32 kHz | | |
|---|---|---|
| TMDS CLOCK (MHz) | 32 kHz | |
|  | N | CTS |
| 25.2/1.001 | 4576 | 56250 |
| 25.2 | 4096 | 50400 |
| 27 | 4096 | 54000 |
| 27*1.001 | 4096 | 54054 |
| 54 | 4096 | 108000 |
| 54*1.001 | 4096 | 108108 |
| 74.25/1.001 | 11648 | 421875 |
| 74.25 | 4096 | 148500 |
| 148.5/1.001 | 11648 | 843750 |
| 148.5 | 4096 | 297000 |
| OTHERS | 4096 | MEASURED VALUE |

FIG. 56

48 BITS/PIXEL: RECOMMENDED N AND EXPECTED CTS FOR 44.1 kHz AND MULTIPLES

| TMDS CLOCK (MHz) | 44.1 kHz | | 88.2 kHz | | 176.4 kHz | |
|---|---|---|---|---|---|---|
| | N | CTS | N | CTS | N | CTS |
| 25.2/1.001 | 7007 | 62500 | 14014 | 62500 | 28028 | 62500 |
| 25.2 | 6272 | 56000 | 12544 | 56000 | 25088 | 56000 |
| 27 | 6272 | 60000 | 12544 | 60000 | 25088 | 60000 |
| 27*1.001 | 6272 | 60060 | 12544 | 60060 | 25088 | 60060 |
| 54 | 6272 | 120000 | 12544 | 120000 | 25088 | 120000 |
| 54*1.001 | 6272 | 120120 | 12544 | 120120 | 25088 | 120120 |
| 74.25/1.001 | 17836 | 468750 | 35672 | 468750 | 71344 | 468750 |
| 74.25 | 6272 | 165000 | 12544 | 165000 | 25088 | 165000 |
| 148.5/1.001 | 8918 | 468750 | 17386 | 468750 | 35672 | 468750 |
| 148.5 | 6272 | 330000 | 12544 | 330000 | 25088 | 330000 |
| OTHERS | 6272 | MEASURED VALUE | 12544 | MEASURED VALUE | 25088 | MEASURED VALUE |

FIG. 57

48 BITS/PIXEL: RECOMMENDED N AND EXPECTED CTS FOR 48 kHz AND MULTIPLES

| TMDS CLOCK (MHz) | 48 kHz | | 96 kHz | | 192 kHz | |
|---|---|---|---|---|---|---|
| | N | CTS | N | CTS | N | CTS |
| 25.2/1.001<br>25.2 | 6864<br>6144 | 56250<br>50400 | 13728<br>12288 | 56250<br>50400 | 27456<br>24576 | 56250<br>50400 |
| 27<br>27*1.001 | 6144<br>6144 | 50400<br>54054 | 12288<br>12288 | 54000<br>54054 | 24576<br>24576 | 54000<br>54054 |
| 54<br>54*1.001 | 6144<br>6144 | 108000<br>108108 | 12288<br>12288 | 108000<br>108108 | 24576<br>24576 | 108000<br>108108 |
| 74.25/1.001<br>74.25 | 11648<br>6144 | 281250<br>148500 | 23296<br>12288 | 281250<br>148500 | 46592<br>24576 | 281250<br>148500 |
| 148.5/1.001<br>148.5 | 5824<br>6144 | 281250<br>297000 | 11648<br>12288 | 281250<br>297000 | 23296<br>24576 | 281250<br>297000 |
| OTHERS | 6144 | MEASURED VALUE | 12288 | MEASURED VALUE | 24576 | MEASURED VALUE |

TRANSMISSION SYSTEM, TRANSMISSION APPARATUS, AND TRANSMISSION METHOD FOR TRANSMITTING VIDEO DATA

CROSS-REFERENCE TO RELATED APPLICATIONS

The present application is a continuation of U.S. patent application Ser. No. 14/332,142 filed Jul. 15, 2014, which is a continuation of U.S. patent application Ser. No. 14/297, 157, filed Jun. 5, 2014, (U.S. Pat. No. 8,982,278), which is a continuation of U.S. patent application Ser. No. 14/149, 054, filed Jan. 7, 2014, (U.S. Pat. No. 8,817,182), which is a continuation of U.S. patent application Ser. No. 13/544, 429, filed Jul. 9, 2012, (U.S. Pat. No. 8,854,543), which is a continuation of U.S. patent application Ser. No. 11/919, 883, filed Jul. 21, 2009, (U.S. Pat. No. 8,253,859), which is a national phase entry under 35 U.S.C. §371 of International Application No. PCT/JP2007/060009 filed May 16, 2007, published on Nov. 22, 2007 as WO 2007/132877 A1, which claims priority from Japanese Patent Application No. JP 2006-136917 filed in the Japanese Patent Office on May 16, 2006 and Japanese Patent Application No. 2006-154864 filed in the Japanese Patent Office on Jun. 2, 2006, the disclosures of which are incorporated herein by reference.

BACKGROUND OF THE INVENTION

Technical Field

The present invention relates to a communication system, a transmission apparatus, a receiving apparatus, a communication method, and a program. More particularly, the present invention relates to a communication system capable of performing efficient data transmission using, for example, a communication interface, such as HDMI® (High Definition Multimedia Interface), which is capable of transmitting pixel data of an uncompressed image in one direction at high speed, to a transmission apparatus and a receiving apparatus, to a communication method, and to a program.

Background Art

In recent years, for example, as a communication interface for transmitting a digital television signal, that is, pixel data of an uncompressed (baseband) image (moving image) and audio data accompanied with the image, at high speed from a DVD (Digital Versatile Disc) recorder, a set-top box, or another AV source (source) to a television receiver, a projector, or another display, HDMI® has been becoming popular.

Regarding HDMI®, a TMDS (Transition Minimized Differential Signaling) channel for transmitting pixel data and audio data at high speed from an HDMI® source to an HDMI® sink in one direction, a CEC (Consumer Electronics Control) line for performing bidirectional communication between the HDMI® source and the HDMI® sink, and the like have been defined in the specification of HDMI (the current up-to-date specification: "High-Definition Multimedia Interface Specification Version 1.2a", Dec. 14, 2005).

Furthermore, in HDMI®, HDCP (High-Bandwidth Digital Content Protection) can be implemented to prevent copying of content.

In addition, for the HDMI®, a method for not transmitting an unnecessary signal in a vertical blanking period and in a horizontal blanking period has been proposed (refer to, for example, Patent Document 1).

[Patent Document 1] Japanese Unexamined Patent Application Publication No. 2005-102161

DISCLOSURE OF INVENTION

Problems to be Solved by the Invention

In the current HDMI®, for example, an image, RGB (Red, Green, Blue) color data of which is each composed of 8-bit pixel data (hereinafter also referred to as a 24-bit (=8 bits×..3) image as appropriate), can be transmitted. In recent years, there has been an increasing demand for transmitting an image having a higher resolution, that is, an image in which each of RGB data is composed of pixel data of a large number of bits such as 10 bits or 12 bits, which is larger than 8 bits (hereinafter also referred to as a high resolution image).

Accordingly, in HDMI®, a method of transmitting a high resolution image has been studied.

However, although there has been an increasing demand for transmitting a high resolution image, 24-bit images are still often handled.

Therefore, in the case that HDMI® is extended so as to be capable of transmitting a high resolution image, when a 24-bit image is to be transmitted, unnecessary data is transmitted in an amount corresponding to the difference between the number of bits of the pixel data of the high resolution image and the 24 bits, which is the number of bits of the 24-bit image, per pixel. Thus, inefficient data transmission is performed.

The present invention has been made in view of such circumstances. It is an object of the present invention to be capable of performing efficient data transmission using, for example, a communication interface such as HDMI®, which is capable of transmitting pixel data of an uncompressed image at high speed in one direction.

BRIEF SUMMARY OF THE INVENTION

Means for Solving the Problems

A first aspect of the present invention provides a transmission apparatus including a transmission apparatus for, after capability information indicating the capability of a receiving apparatus is received, transmitting pixel data of an uncompressed image for one screen in one direction to the receiving apparatus by using a differential signal through a plurality of channels for transmitting data of a fixed number of bits per clock of a pixel clock in a valid image period that is a period in which a horizontal blanking period and a vertical blanking period are excluded from a period from one vertical synchronization signal to the next vertical synchronization signal; and the receiving apparatus for receiving the pixel data transmitted using a differential signal through the plurality of channels from the transmission apparatus after the capability information is transmitted, wherein the transmission apparatus includes transmission means for transmitting pixel data to which a number of bits, which is greater than the fixed number of bits, is assigned, in one direction to the receiving apparatus by using a differential signal through the plurality of channels by adjusting the frequency of the pixel clock; sub-signal reception capability/incapability determination means for determining whether or not the receiving apparatus can receive a sub-signal on the basis of the capability information; sub-signal addition means for adding the sub-signal to pixel data of a main image composed of pixel data whose number of bits is smaller than that of transmission pixel data that is pixel data to be transmitted by the transmission means when the receiving apparatus can receive the sub-signal, thereby constructing the transmission pixel data; and information transmission control means for allowing sub-signal information indicating whether or not the sub-signal is contained in the transmission pixel data transmitted in the valid image period immediately after the vertical blanking period, to be transmitted in the vertical blanking period, and wherein the receiving apparatus includes receiving means for receiving the transmission pixel data transmitted using a differential signal through the plurality of channels; sub-signal presence/absence determination means for determining whether or not the sub-signal is contained in the transmission pixel data transmitted in a valid image period immediately after the vertical blanking period on the basis of the sub-signal information transmitted in the vertical blanking period; and separation means for separating the sub-signal from the transmission pixel data when the sub-signal is contained in the transmission pixel data.

In the communication system of the above-described first aspect, in the transmission apparatus, the transmission means adjusts the frequency of the pixel clock and thereby transmits pixel data to which a number of bits greater than the fixed number of bits is assigned to the receiving apparatus in one direction by using a differential signal through the plurality of channels. It is determined whether or not the receiving apparatus can receive a sub-signal on the basis of the capability information. When the receiving apparatus can receive the sub-signal, the transmission pixel data is constructed by adding the sub-signal to the pixel data of the main image formed of pixel data having a number of bits less than that of the transmission pixel data that is pixel data to be transmitted by the transmission means. In the vertical blanking period, sub-signal information indicating whether or not the sub-signal is contained in the transmission pixel data that is transmitted in a valid image period immediately after the vertical blanking period is transmitted. On the other hand, in the receiving apparatus, the receiving means receives the transmission pixel data transmitted using a differential signal through the plurality of channels. Furthermore, on the basis of the sub-signal information transmitted in the vertical blanking period, it is determined whether or not the sub-signal is contained in the transmission pixel data transmitted in the valid image period immediately after the vertical blanking period. When the sub-signal is contained in the transmission pixel data, the sub-signal is separated from the transmission pixel data.

A second aspect of the present invention provides a transmission apparatus for, after capability information indicating the capability of a receiving apparatus is received, transmitting pixel data of an uncompressed image for one screen in one direction to the receiving apparatus by using a differential signal through a plurality of channels for transmitting data of a fixed number of bits per clock of a pixel clock in a valid image period that is a period in which a horizontal blanking period and a vertical blanking period are excluded from a period from one vertical synchronization signal to the next vertical synchronization signal, the transmission apparatus including: transmission means for transmitting pixel data to which a number of bits, which is greater than the fixed number of bits, is assigned, in one direction to the receiving apparatus by using a differential signal through the plurality of channels by adjusting the frequency of the pixel clock; sub-signal reception capability/incapability determination means for determining whether or not the receiving apparatus can receive a sub-signal on the basis of the capability information; sub-signal addition means for adding the sub-signal to pixel data of a main image composed of pixel data whose number of bits is smaller than that of transmission pixel data that is pixel data to be transmitted by the transmission means when the receiving apparatus can receive the sub-signal, thereby constructing the transmission pixel data; and information transmission control means for allowing sub-signal information indicating whether or not the sub-signal is contained in the transmission pixel data transmitted in the valid image period immediately after the vertical blanking period, to be transmitted in the vertical blanking period.

A second aspect of the present invention provides a communication method for use with a transmission apparatus for transmitting pixel data of an uncompressed image for one screen in one direction to a receiving apparatus by using a differential signal through a plurality of channels for, after capability information indicating the capability of the receiving apparatus is received, transmitting data of a fixed number of bits per clock of a pixel clock in a valid image period that is a period in which a horizontal blanking period and a vertical blanking period are excluded from a period from one vertical synchronization signal to the next vertical synchronization signal, or provides a program to be executed by a computer for controlling the transmission apparatus, the transmission apparatus including transmission means for transmitting pixel data to which a number of bits, which is greater than the fixed number of bits, is assigned, in one direction to the receiving apparatus by using a differential signal through the plurality of channels by adjusting the frequency of the pixel clock, the communication method including the steps of: determining whether or not the receiving apparatus can receive a sub-signal on the basis of the capability information; adding the sub-signal to pixel data of a main image composed of pixel data whose number of bits is smaller than that of transmission pixel data that is pixel data to be transmitted by the transmission means when the receiving apparatus can receive the sub-signal, thereby constructing the transmission pixel data; and allowing sub-signal information indicating whether or not the sub-signal is contained in the transmission pixel data transmitted in the valid image period immediately after the vertical blanking period, to be transmitted in the vertical blanking period.

In the above-described second aspect, on the basis of the capability information, it is determined whether or not the receiving apparatus can receive a sub-signal. When the receiving apparatus can receive the sub-signal, the transmission pixel data is constructed by adding the sub-signal to the pixel data of the main image formed of pixel data having a number of bits less than that of the transmission pixel data that is pixel data to be transmitted by the transmission means. In the vertical blanking period, sub-signal information indicating whether or not the sub-signal is contained in the transmission pixel data that is transmitted in a valid image period immediately after the vertical blanking period is transmitted.

A third aspect of the present invention provides a receiving apparatus for receiving pixel data transmitted using a differential signal through a plurality of channels from a transmission apparatus after capability information is transmitted to the transmission apparatus for transmitting pixel data of an uncompressed image for one screen in one direction to the receiving apparatus by using a differential signal through a plurality of channels for, after capability information indicating the capability of the receiving apparatus is received, transmitting data of a fixed number of bits per clock of a pixel clock in a valid image period that is a period in which a horizontal blanking period and a vertical blanking period are excluded from a period from one vertical synchronization signal to the next vertical synchronization signal, the transmission apparatus including transmission means for transmitting pixel data to which a number of bits, which is greater than the fixed number of bits, is assigned, in one direction to the receiving apparatus by using a differential signal through the plurality of channels by adjusting the frequency of the pixel clock; sub-signal reception capability/incapability determination means for determining whether or not the receiving apparatus can receive a sub-signal on the basis of the capability information; sub-signal addition means for adding the sub-signal to pixel data of a main image composed of pixel data whose number of bits is smaller than that of transmission pixel data that is pixel data to be transmitted by the transmission means when the receiving apparatus can receive the sub-signal, thereby constructing the transmission pixel data; and information transmission control means for allowing sub-signal information indicating whether or not the sub-signal is contained in the transmission pixel data transmitted in the valid image period immediately after the vertical blanking period, to be transmitted in the vertical blanking period, the receiving apparatus including: receiving means for receiving the transmission pixel data transmitted using a differential signal through the plurality of channels; sub-signal presence/absence determination means for determining whether or not the sub-signal is contained in the transmission pixel data transmitted in a valid image period immediately after the vertical blanking period on the basis of the sub-signal information transmitted in the vertical blanking period; and separation means for separating the sub-signal from the transmission pixel data when the sub-signal is contained in the transmission pixel data.

A third aspect of the present invention provides a communication method for use with a receiving apparatus for receiving pixel data transmitted using a differential signal through a plurality of channels from a transmission apparatus after capability information is transmitted to the transmission apparatus for, after capability information indicating the capability of the receiving apparatus is received, transmitting pixel data of an uncompressed image for one screen in one direction to the receiving apparatus by using a differential signal through a plurality of channels for transmitting data of a fixed number of bits per clock of a pixel clock in a valid image period that is a period in which a horizontal blanking period and a vertical blanking period are excluded from a period from one vertical synchronization signal to the next vertical synchronization signal, the transmission apparatus including transmission means for transmitting pixel data to which a number of bits, which is greater than the fixed number of bits, is assigned, in one direction to the receiving apparatus by using a differential signal through the plurality of channels by adjusting the frequency of the pixel clock; sub-signal reception capability/incapability determination means for determining whether or not the receiving apparatus can receive a sub-signal on the basis of the capability information; sub-signal addition means for adding the sub-signal to pixel data of a main image composed of pixel data whose number of bits is smaller than that of transmission pixel data that is pixel data to be transmitted by the transmission means when the receiving apparatus can receive the sub-signal, thereby constructing the transmission pixel data; and information transmission control means for allowing sub-signal information indicating whether or not the sub-signal is contained in the transmission pixel data transmitted in the valid image period immediately after the vertical blanking period, to be transmitted in the vertical blanking period, or provides a program to be executed by a computer for controlling the receiving apparatus, the receiving apparatus including receiving means for receiving the transmission pixel data transmitted using a differential signal through the plurality of channels, the communication method including the steps of: determining whether or not the sub-signal is contained in the transmission pixel data transmitted in a valid image period immediately after the vertical blanking period on the basis of the sub-signal information transmitted in the vertical blanking period; and separating the sub-signal from the transmission pixel data when the sub-signal is contained in the transmission pixel data.

In the above-described third aspect, on the basis of the sub-signal information transmitted in the vertical blanking period, it is determined whether or not the sub-signal is contained in the transmission pixel data transmitted in the valid image period immediately after the vertical blanking period. When the sub-signal is contained in the transmission pixel data, the sub-signal is separated from the transmission pixel data.

Advantages

According to the first to third aspects of the present invention, efficient data transmission can be performed using, for example, a communication interface such as HDMI®, which is capable of transmitting pixel data of an uncompressed image at high speed in one direction.

BRIEF DESCRIPTION OF THE DRAWINGS

FIG. 10 shows the format of VSDB in E-EDID.

FIG. 11 shows the format of a general control packet.

FIG. 12 shows the relationship between bits CD0, CD1, and CD2 of byte #SB1 of a subpacket, and an image transmitted in a video data period.

FIG. 17 shows the format of VSDB in E-EDID.

FIG. 18 shows the format of a general control packet.

FIG. 19 shows the relationship between bits SD0, SD1, and SD2 of byte #SB2 of a subpacket, and the number of bits of a sub-signal.

FIG. 31 is an illustration showing an example of the data structure of VSDB according to an embodiment of the present invention.

FIG. 38 shows all "pixel coding" for all color depths.

FIG. 39 shows a group size, and a sequence of HSYNC and VSYNC transmission within a group for a 24-bit mode.

FIG. 40 shows a group size, and a sequence of HSYNC and VSYNC transmission within a group for a 30-bit mode.

FIG. 41 shows a group size, and a sequence of HSYNC and VSYNC transmission within a group for the remainder of a 30-bit mode.

FIG. 42 shows a group size, and a sequence of HSYNC and VSYNC transmission within a group for a 36-bit mode.

FIG. 43 shows a group size, and a sequence of HSYNC and VSYNC transmission within a group for a 48-bit mode.

FIG. 44 shows color depth values (CD fields) of SB1.

FIG. 47 shows a video color component range.

FIG. 52 shows recommended N and expected CTS of 36 bits/pixel for 32 kHz and multiples.

FIG. 53 shows recommended N and expected CTS of 36 bits/pixel for 44.1 kHz and multiples.

FIG. 54 shows recommended N and expected CTS of 36 bits/pixel for 48 kHz and multiples.

FIG. 55 shows recommended N and expected CTS of 48 bits/pixel for 32 kHz and multiples.

FIG. 56 shows recommended N and expected CTS of 48 bits/pixel for 44.1 kHz and multiples.

FIG. 57 shows recommended N and expected CTS of 48 bits/pixel for 48 kHz and multiples.

DETAILED DESCRIPTION

Reference Numerals

41 HD recorder, 42 display, 43 cable, 51 recording/reproduction section, 52 codec, 53 HDMI® source, 54 HD, 61 HDMI® sink, 62 display controller, 63 display section, 71 source signal processor, 72 transmitter, 72A to 72C encoder/serializer, 81 receiver, 81A to 81C recovery/decoder, 82 sink signal processor, 101 main image processor, 102 sub-signal addition section, 103 sub-signal processor, 104 sub-signal-related information insertion section, 105 sub-signal reception capability/incapability determination section, 106 number of sub-signal assignment bits determination section, 107 sub-signal frame information transmission controller, 108 deep-color-mode determination section, 121 FIFO memory, 122 sub-signal presence/absence determination section, 123 separator, 124 main image processor, 125 main image memory, 126 sub-signal processor, 127 sub-signal memory, 201 bus, 202 CPU, 203 ROM, 204 RAM, 205 EEPROM, 206 input/output interface, 301 HDMI cable, 310 video recording/reproduction apparatus (source-side apparatus), 311 recording/reproduction section, 312 video processor, 314 audio processor, 315 controller, 316 tuner, 320 HDMI transmission processor, 321 multiplexing circuit, 322 HDCP encryptor, 323 transmission processor, 324 HDMI terminal, 330 television receiver (sink-side apparatus), 331 video selector/combiner, 332 video processor, 333 display processor, 334 audio processor, 335 output processor, 336 controller, 340 HDMI transmission processor, 341 HDMI terminal, 342 transmission processor, 343 HDCP decryptor, 344 demultiplexing circuit, 351 to 354 speaker, 360 display panel

BEST MODE FOR CARRYING OUT THE INVENTION

Embodiments of the present invention will now be described below with reference to the drawings.

Figure 1:
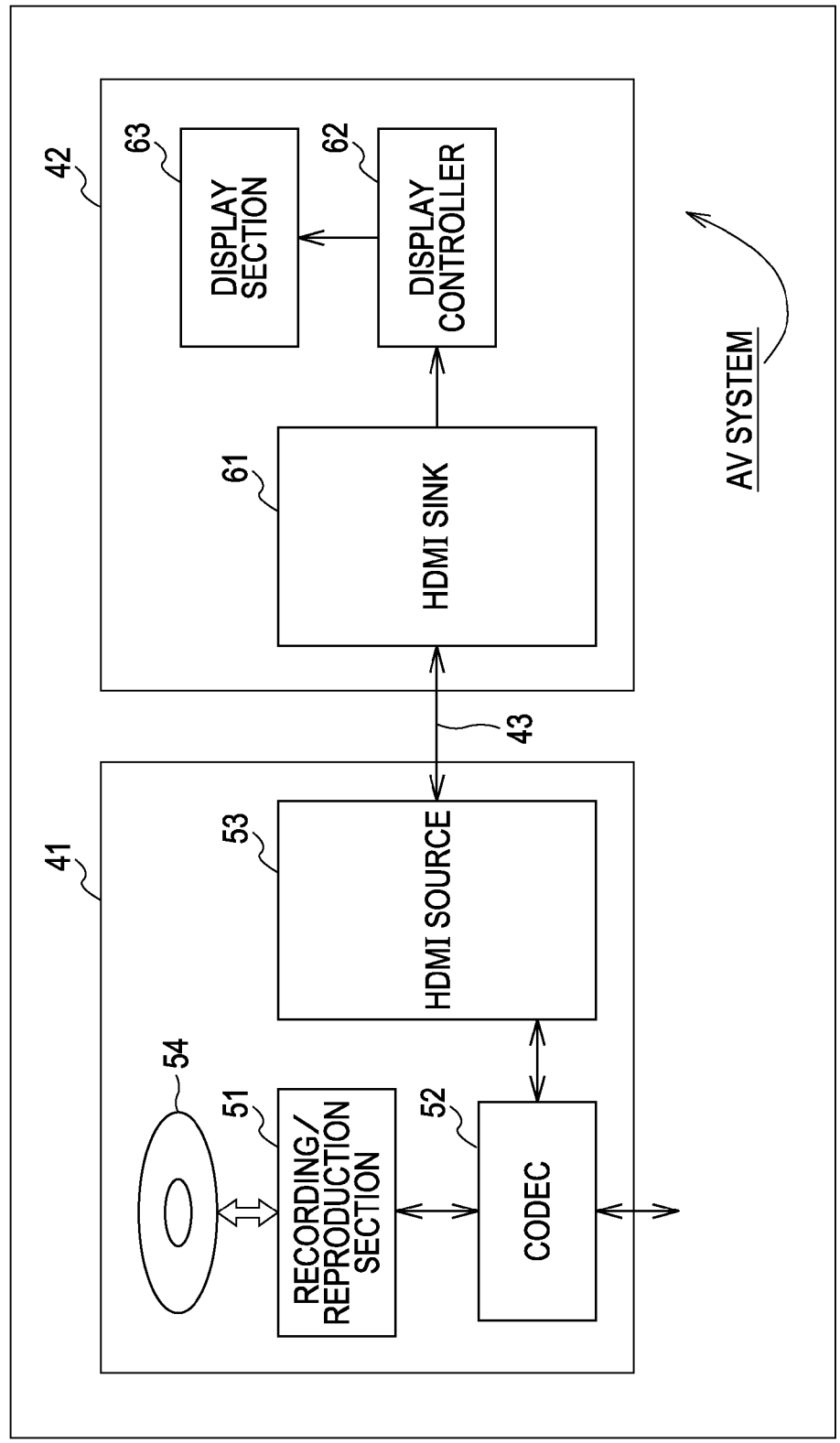
FIG. 1 is a block diagram showing an example of the configuration of an embodiment of an AV system to which the present invention is applied.

FIG. 1 shows an example of the configuration of an embodiment of an AV (Audio Visual) system to which the present invention is applied.

In FIG. 1, an AV system includes an HD (Hard Disk) recorder 41 and a display 42, with the HD recorder 41 and the display 42 being connected to each other via a cable 43 for HDMI®.

The HD recorder 41 includes a recording/reproduction section 51, a codec 52, an HDMI® source 53, and an HD 54, and records and reproduces data to and from the HD 54.

That is, the recording/reproduction section 51 records, in the HD 54, encoded data obtained by encoding data of a baseband image and audio accompanied therewith, which is supplied from the codec 52, by using an MPEG (Moving Picture Experts Group) scheme or the like. Furthermore, the recording/reproduction section 51 reproduces (reads) the encoded data from the HD 54 and supplies it to the codec 52.

The codec 52 decodes the encoded data supplied from the recording/reproduction section 51 into data of a baseband image and audio by using an MPEG scheme or the like, and supplies the data of the baseband image and audio to the HDMI® source 53 and an external apparatus (not shown).

Furthermore, the codec 52 encodes, for example, data of a baseband image and audio, which is supplied from an external apparatus (not shown), into encoded data, and supplies the encoded data to the recording/reproduction section 51.

The HDMI® source 53 transmits the data of the baseband image and audio, which is supplied from the codec 52, to the display 42 via the cable 43 in one direction in accordance with communication compliant with HDMI®.

The display 42 includes an HDMI® sink 61, a display controller 62, and a display section 63, and displays an image.

That is, the HDMI® sink 61 receives data of a baseband image and audio, which is transmitted from the HDMI® source 53 of the HD recorder 41 connected via the cable 43 in one direction in accordance with communication in compliance with HDMI®, and supplies the data of the image among the received data to the display controller 62. The data of audio, which is received by the HDMI® sink 61, is supplied to, for example, a speaker (not shown) incorporated in the display 42 and is output therefrom.

The display controller 62 controls (drives) the display section 63 on the basis of the data of the baseband image supplied from the HDMI® sink 61, so that the display section 63 displays a corresponding image.

The display section 63 is constituted by, for example, a CRT (Cathode Ray Tube), an LCD (Liquid Crystal Display), an organic EL (Electro Luminescence), or the like, and displays an image under the control of the display controller 62.

In the AV system of FIG. 1, which is configured as described above, for example, when a user operates the HD recorder 41 so as to reproduce the HD 54, the recording/reproduction section 51 reproduces encoded data from the HD 54 and supplies it to the codec 52.

The codec 52 decodes the encoded data supplied from the recording/reproduction section 51 into baseband image and audio data, and supplies the baseband image and audio data to the HDMI® source 53.

On the basis of communication in compliance with HDMI®, the HDMI® source 53 transmits the baseband image and audio data supplied from the codec 52 to the display 42 in one direction via the cable 43.

In the display 42, on the basis of communication in compliance with HDMI®, the HDMI® sink 61 receives the baseband image and audio data transmitted in one direction from the HDMI® source 53 of the HD recorder 41 connected via the cable 43, and supplies the image data among the received data to the display controller 62 and supplies the audio data to a speaker (not shown).

The display controller 62 controls the display section 63 on the basis of the image data supplied from the HDMI® sink 61, so that a corresponding image is displayed on the display section 63.

Figure 2:
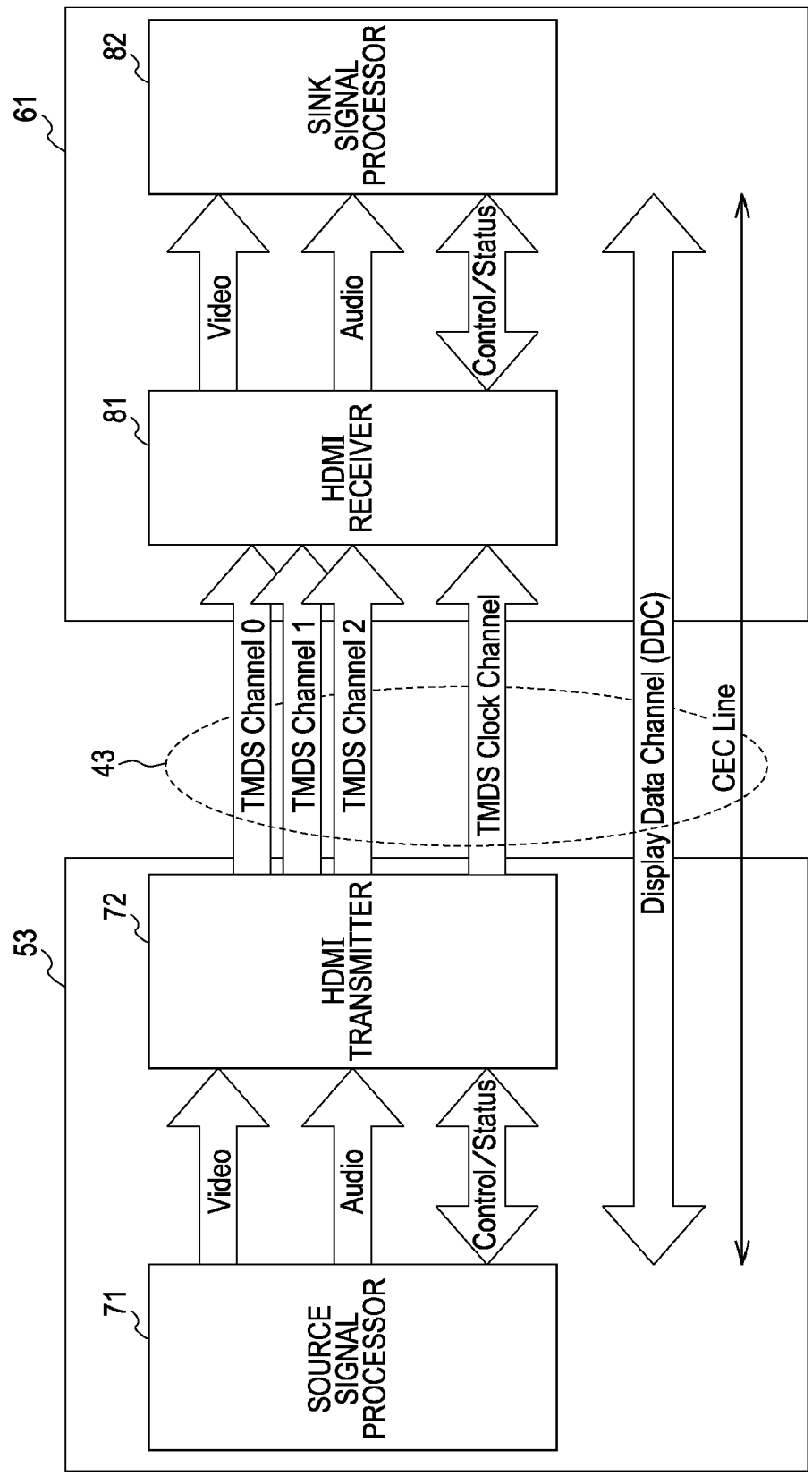
FIG. 2 is a block diagram showing an example of the configuration of an HDMI® source 53 and an HDMI® sink 61.

FIG. 2 shows an example of the configuration of the HDMI® source 53 and the HDMI® sink 61.

In a valid image period (hereinafter referred to as an "active video period" as appropriate) that is a period in which a horizontal blanking period and a vertical blanking period are excluded from the period from one vertical synchronization signal to the next vertical synchronization signal, the HDMI® source 53 transmits a differential signal corresponding to pixel data of an uncompressed image for one screen to the HDMI® sink 61 in one direction through a plurality of channels. In the horizontal blanking period or in the vertical blanking period, the HDMI® source 53 transmits differential signals corresponding to audio data accompanied with an image, a control packet, and other auxiliary data to an HDMI® sink in one direction through a plurality of channels.

That is, the HDMI® source 53 includes a source signal processor 71 and a transmitter 72.

Data of an uncompressed baseband image (Video) and audio (Audio) is supplied to the source signal processor 71 from the codec 52 (FIG. 1) or the like. The source signal processor 71 performs necessary processing on the image and audio data supplied thereto and supplies the data to the transmitter 72. Furthermore, the source signal processor 71 transmits and receives information for control and information that informs status (Control/Status) to and from the transmitter 72 as necessary.

The transmitter 72 converts the pixel data of the image supplied from the source signal processor 71 into a corresponding differential signal, and serially transmits the differential signal to the HDMI® sink 61 connected via the cable 43 in one direction through three TMDS channels #0, #1, and #2.

Furthermore, the transmitter 72 converts audio data accompanied with an uncompressed image, a control packet, and other auxiliary data, which are supplied from the source signal processor 71, and control data such as a vertical synchronization signal (VSYNC) and a horizontal synchronization signal (HSYNC), into corresponding differential signals, and serially transmits the differential signals to the HDMI® sink 61 connected via the cable 43 in one direction through three TMDS channels #0, #1, and #2.

Furthermore, the transmitter 72 transmits a pixel clock synchronized with pixel data to be transmitted through three TMDS channels #0, #1, and #2 to the HDMI® sink 61 connected via the cable 43 in a TMDS clock channel.

In the active video period, the HDMI® sink 61 receives the differential signal corresponding to the pixel data transmitted in one direction from the HDMI® source 53 through a plurality of channels, and receives a differential signal corresponding to the auxiliary data and the control data, which is transmitted in one direction from the HDMI® source through a plurality of channels in the horizontal blanking period and in the vertical blanking period.

That is, the HDMI® sink 61 includes a receiver 81 and a sink signal processor 82.

The receiver 81 receives, through the TMDS channels #0, #1, and #2, a differential signal corresponding the pixel data and a differential signal corresponding to the auxiliary data and the control data, which are transmitted in one direction from the HDMI® source 53 connected via the cable 43 in synchronization with a pixel clock transmitted through a TMDS clock channel from the HDMI® source 53 in a similar manner.

Furthermore, the receiver 81 converts the differential signal into corresponding pixel data, auxiliary data, and control data, and supplies them to the sink signal processor 82 as necessary.

The sink signal processor 82 performs necessary processing on the data supplied from the receiver 81, and supplies the data to the display controller 62 and the like. In addition, the sink signal processor 82 transmits and receives information for control and information that informs status (Control/Status) to and from the receiver 81 as necessary.

The transmission channels of HDMI® include three TMDS channels #0 to #2 serving as transmission channels for serially transmitting pixel data, auxiliary data, and control data in synchronization with a pixel clock in one direction from the HDMI® source 53 to the HDMI® sink 61, and transmission channels called DDC (Display Data Channel) and CEC lines in addition to a TMDS clock channel serving as a transmission channel for transmitting the pixel clock.

The DDC is used for the HDMI® source 53 to read E-EDID (Enhanced Extended Display Identification Data) from the HDMI® sink 61 connected via the cable 43.

That is, the HDMI® sink 61 has an EDID ROM (Read Only Memory) (not shown) storing E-EDID that is capability information regarding its own capability (configuration/capability) in addition to the receiver 81. The HDMI® source 53 reads, via the DDC, the E-EDID of the HDMI® sink 61 from the HDMI® sink 61 connected via the cable 43. On the basis of the E-EDID, the HDMI® source 53 recognizes capability and setting of the HDMI® sink 61, that is, for example, the format (the profile) of an image that (an electronic apparatus having) the HDMI® sink 61 supports (for example, RGB (Red, Green, Blue), $YC_BC_R$ 4:4:4, $YC_BC_R$ 4:2:2).

The HDMI® source 53 can also store E-EDID and transmit the E-EDID to the HDMI® sink 61 as necessary in the same manner as for the HDMI® sink 61.

The CEC line is used to perform bidirectional communication of data for control between the HDMI® source 53 and an HDMI® link 2.

Figure 3:
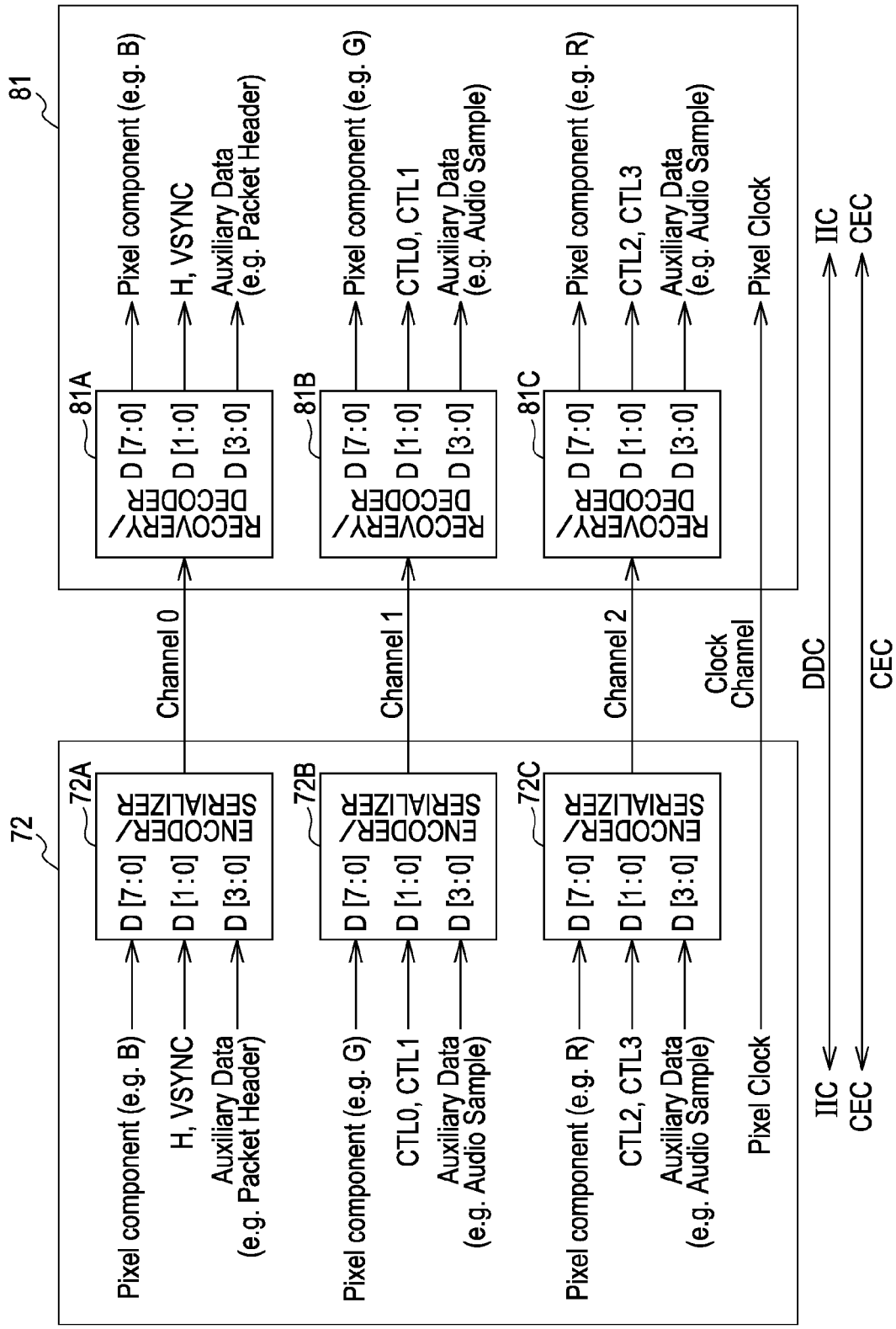
FIG. 3 is a block diagram showing an example of the configuration of a transmitter 72 and a receiver 81.

FIG. 3 shows an example of the configuration of the transmitter 72 and the receiver 81 illustrated in FIG. 2.

The transmitter 72 includes three encoders/serializers 72A, 72B, and 72C corresponding to three TMDS channels #0 to #2, respectively. Then, each of the encoders/serializers 72A, 72B, and 72C encodes pixel data, auxiliary data, and control data supplied thereto, converts them from parallel data into serial data, and transmits it using a differential signal.

At this point, when the pixel data has, for example, three components of R, G, and B, the B component is supplied to the encoder/serializer 72A, the G component is supplied to the encoder/serializer 72B, and the R component is supplied to the encoder/serializer 72C.

Examples of auxiliary data include audio data and a control packet. The control packet is supplied to, for example, the encoder/serializer 72A, and the audio data is supplied to, for example, the encoders/serializers 72B and 72C.

Furthermore, the control data includes a 1-bit vertical synchronization signal (VSYNC), a 1-bit horizontal synchronization signal (HSYNC), and control bits CTL0, CTL1, CTL2, and CTL3, each of which is 1 bit. The vertical synchronization signal and the horizontal synchronization signal are supplied to the encoder/serializer 72A, the control bits CTL0 and CTL1 are supplied to the encoder/serializer 72B, and the control bits CTL2 and the CTL3 are supplied to the encoder/serializer 72C.

The encoder/serializer 72A transmits the B component of the pixel data, the vertical synchronization signal and the horizontal synchronization signal, and auxiliary data, which are supplied thereto, at time division.

That is, the encoder/serializer 72A converts the B component of the pixel data supplied thereto into parallel data in units of 8 bits, which is a fixed number of bits. Furthermore, the encoder/serializer 72A encodes the parallel data so as to convert the data into serial data, and transmits it through the TMDS channel #0.

Furthermore, the encoder/serializer 72A encodes 2-bit parallel data of the vertical synchronization signal and the horizontal synchronization signal, which are supplied thereto, so as to convert the data into serial data, and transmits it through the TMDS channel #0.

Furthermore, the encoder/serializer 72A converts the auxiliary data supplied thereto into parallel data in units of 4 bits. Then, the encoder/serializer 72A encodes the parallel data so as to convert the data into serial data, and transmits it through the TMDS channel #0.

The encoder/serializer 72B transmits the G component of the pixel data, the control bits CTL0 and CTL1, and the auxiliary data, which are supplied thereto, at time division.

That is, the encoder/serializer 72B converts the G component of the pixel data supplied thereto into parallel data in units of 8 bits, which is a fixed number of bits. Furthermore, the encoder/serializer 72B encodes the parallel data so as to convert the data into serial data, and transmits it through the TMDS channel #1.

Furthermore, the encoder/serializer 72B encodes 2-bit parallel data of the control bits CTL0 and CTL1 supplied thereto so as to convert the data into serial data, and transmits it through the TMDS channel #1.

Furthermore, the encoder/serializer 72B converts the auxiliary data supplied thereto into parallel data in units of 4 bits. Then, the encoder/serializer 72B encodes parallel data so as to convert the data into serial data, and transmits it through the TMDS channel #1.

The encoder/serializer 72C transmits the R component, the control bits CTL2 and CTL3, and the auxiliary data, which are supplied thereto, at time division.

That is, the encoder/serializer 72C converts the R component of the pixel data supplied thereto into parallel data in units of 8 bits, which is a fixed number of bits. Furthermore, the encoder/serializer 72C encodes the parallel data so as to convert the data into serial data, and transmits it through the TMDS channel #2.

Furthermore, the encoder/serializer 72C encodes the 2-bit parallel data of the control bits CTL2 and CTL3 supplied thereto so as to convert the data into serial data, and transmits it through the TMDS channel #2.

Furthermore, the encoder/serializer 72C converts the auxiliary data supplied thereto into parallel data in units of 4 bits. Then, the encoder/serializer 72C encodes the parallel data so as to convert the data into serial data, and transmits it through the TMDS channel #2.

The receiver 81 includes three recovery/decoders 81A, 81B, and 81C corresponding to the three TMDS channels #0 to #2, respectively. Each of the recovery/decoders 81A, 81B, and 81C receives pixel data, auxiliary data, and control data, which are transmitted using a differential signal through the TMDS channels #0 to #2. Furthermore, each of the recovery/decoders 81A, 81B, and 81C converts the pixel data, the auxiliary data, and the control data from serial data into parallel data, decodes them, and outputs them.

That is, the recovery/decoder 81A receives the B component of the pixel data, the vertical synchronization signal, the horizontal synchronization signal, and the auxiliary data, which are transmitted using a differential signal through the TMDS channel #0. Then, the recovery/decoder 81A converts the B component of the pixel data, the vertical synchronization signal, the horizontal synchronization signal, and the auxiliary data from serial data into parallel data, decodes them, and outputs them.

The recovery/decoder 81B receives the G component of the pixel data, the control bits CTL0 and CTL1, and the auxiliary data, which are transmitted using a differential signal through the TMDS channel #1. Then, the recovery/decoder 81B converts the G component of the pixel data, the control bits CTL0 and CTL1, the auxiliary data from serial data into parallel data, decodes them, and outputs them.

The recovery/decoder 81C receives the R component of the pixel data, the control bits CTL2 and CTL3, and the auxiliary data, which are transmitted using a differential signal through the TMDS channel #2. Then, the recovery/decoder 81C converts the R component of the pixel data, the control bits CTL2 and CTL3, and the auxiliary data from serial data into parallel data, decodes them, and outputs them.

Figure 4:
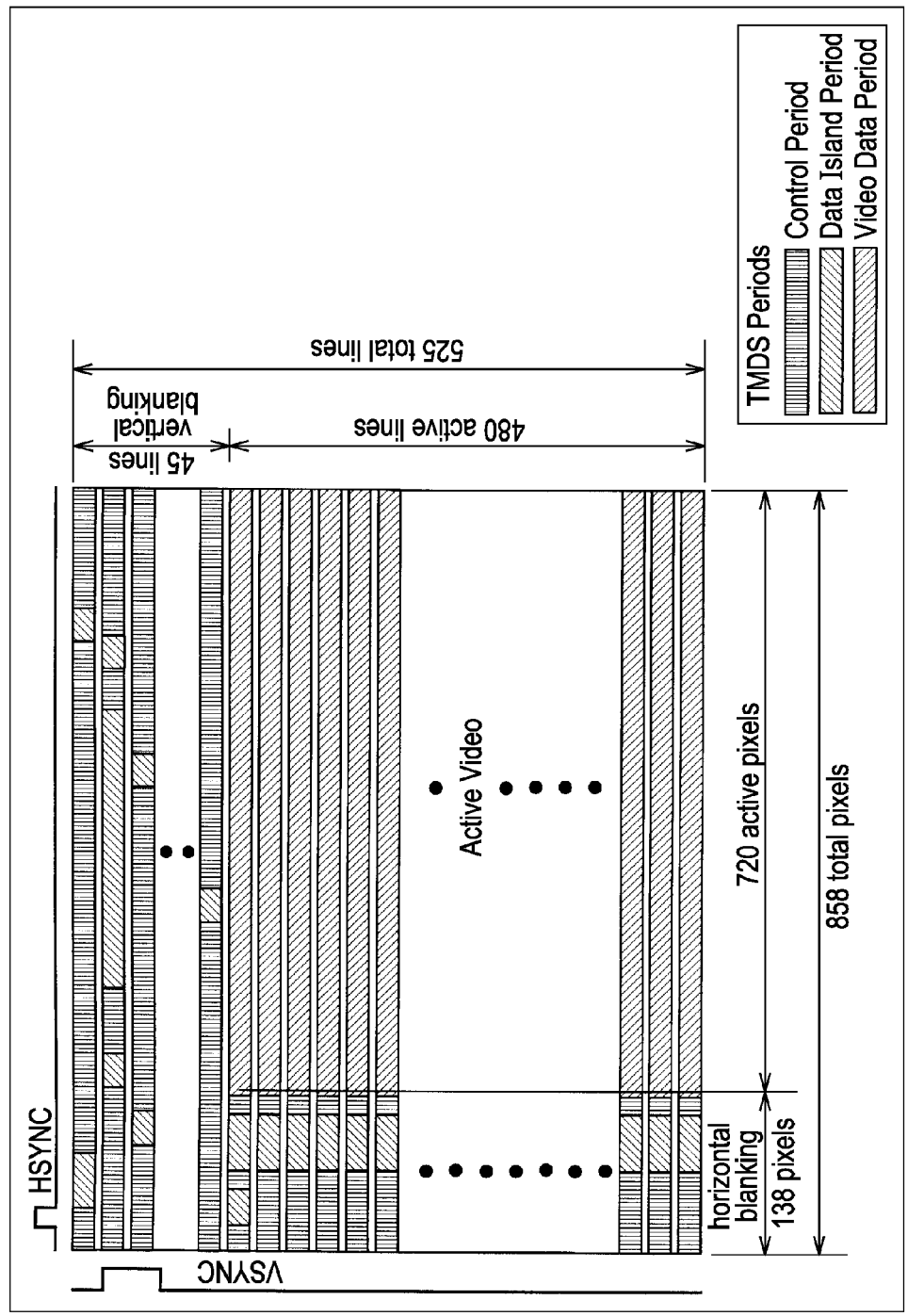
FIG. 4 shows a transmission period of transmission through three TMDS channels #0 to #2.

FIG. 4 shows an example of a transmission period in which various kinds of transmission data are transmitted through the three TMDS channels #0 to #2 of HDMI®.

FIG. 4 shows a transmission period of various kinds of transmission data when a progressive image of a 720..x..480 matrix of pixels is transmitted through the TMDS channels #0 to #2.

In a video field in which transmission data is transmitted through the three TMDS channels #0 to #2 of HDMI®, there are three kinds of periods, that is, a video data period, a data island period, and a control period, according to the type of transmission data.

At this point, the video field is a period from (the rise edge (active edge)) of one vertical synchronization signal to the next vertical synchronization signal, and is divided into a horizontal blanking period (horizontal blanking), a vertical blanking period (vertical blanking), and an active video period (Active Video), which is a period in which the horizontal blanking period and the vertical blanking period are excluded from the video field.

A video data period (the portion shaded with left upward (right downward) diagonal lines in FIG. 4) is assigned to an active video period. In the video data period, pixel (active pixels) data of an uncompressed image for one screen is transmitted.

A data island period (the portion shaded with right upward (left downward) diagonal lines in FIG. 4) and a control period (the portion shaded with lines in the vertical direction in FIG. 4) are assigned to a horizontal blanking period and a vertical blanking period. In the data island period and the control period, auxiliary data is transmitted.

That is, the data island period is assigned to portions of the horizontal blanking period and the vertical blanking period. In the data island period, data that is not related to control, for example, packets of audio data, among the auxiliary data, is transmitted.

The control period is assigned to the other portions of the horizontal blanking period and the vertical blanking period. In the control period, data that is related to control, for example, the vertical synchronization signal, the horizontal synchronization signal, control packets, and the like, among the auxiliary data, is transmitted.

At this point, in the current HDMI®, that is, in "High-Definition Multimedia Interface Specification Version 1.2a", Dec. 14, 2005, which is the up-to-date specification of HDMI®, the frequency of the pixel clock transmitted through a TDMS clock channel (FIG. 2) is, for example, 165 MHz. In this case, the transmission rate in the data island period is approximately 500 Mbps.

As described above, in both the data island period and the control period, the auxiliary data is transmitted, and the distinction therebetween is made possible using the control bits CTL0 and CTL1.

Figure 5:
FIG. 5 is a timing chart showing the relationship among control bits CTL0 and CTL1, a data island period, and a control period.

FIG. 5 shows the relationship among the control bits CTL0 and CTL1, a data island period, and a control period.

The control bits CTL0 and CTL1 can represent, for example, two states, a device enable state and a device disable state, as shown in the first area from the top in FIG. 5. In the first area from the top in FIG. 5, the device enable state is represented using an H (High) level and the device disable state is represented using an L (Low) level.

The control bits CTL0 and CTL1 enter a device disable state in the data island period and enter a device enable state in the control period. This makes it possible to distinguish between the data island period and the control period.

Then, in the data island period in which the control bits CTL0 and CTL1 become an L level denoting a device disable state, as shown from the second area from the top in FIG. 5, data that is not related to control, for example, audio data, among the auxiliary data, is transmitted.

On the other hand, in the control period in which the control bits CTL0 and CTL1 become an H level denoting a device enable state, as shown from the third area from the top in FIG. 5, data that is related to control, for example, a control packet and a preamble, among the auxiliary data, is transmitted.

In addition, in the control period, as shown from the fourth area from the top in FIG. 5, a vertical synchronization signal and a horizontal synchronization signal are also transmitted.

Next, a description will be given, with reference to FIG. 6, of the transmission of pixel data, which is defined in the current HDMI®, that is, "High-Definition Multimedia Interface Specification Version 1.2a", Dec. 14, 2005, which is the up-to-date specification of HDMI®.

Figure 6:
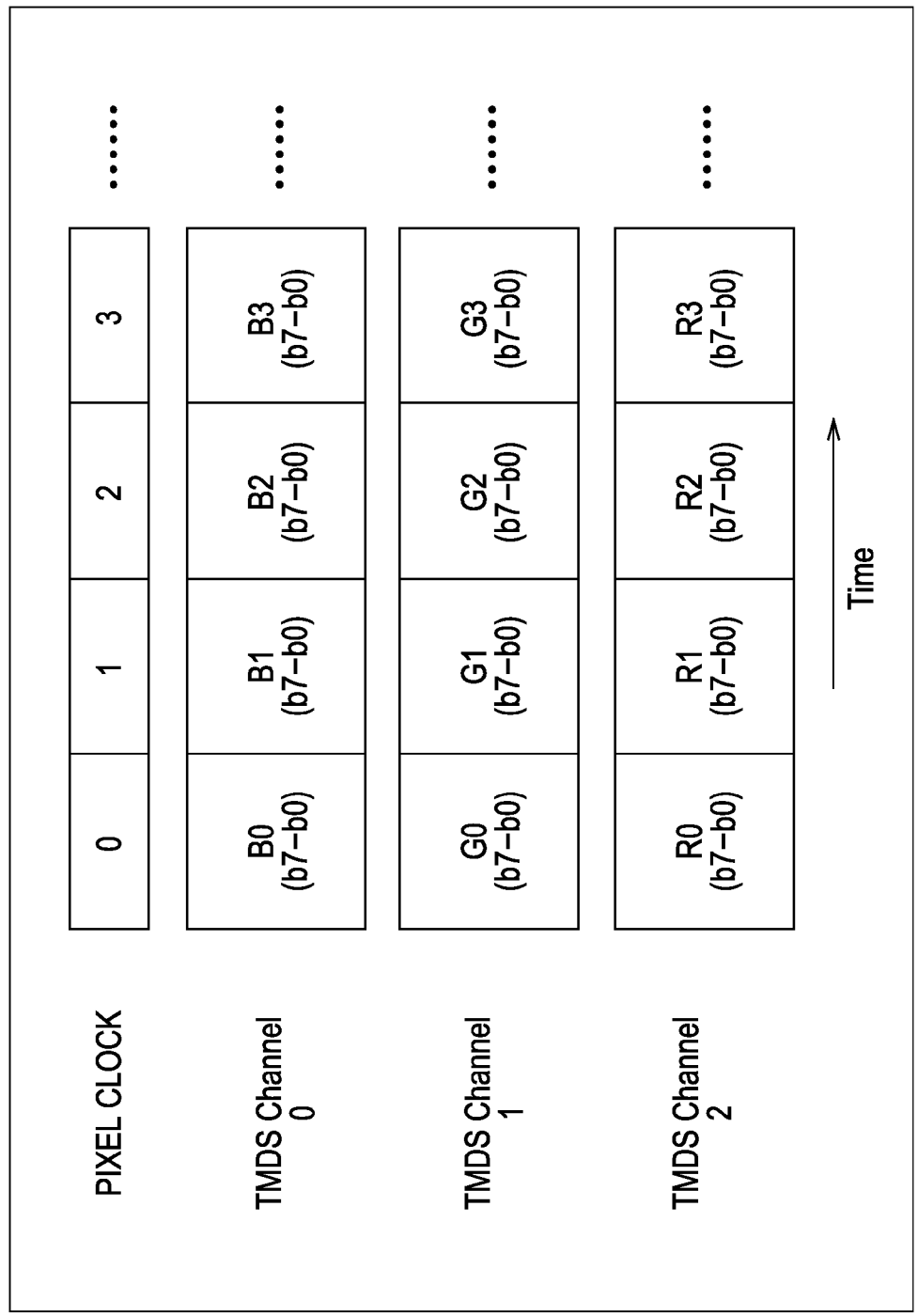
FIG. 6 is a timing chart showing the timing of transmission of the pixel data of an image transmitted in a video data period of the current HDMI®.

FIG. 6 is a timing chart showing the timing of transmission of pixel data of an image transmitted in a video data period of the current HDMI®.

In the current HDMI®, pixel data of an image of three formats of RGB 4:4:4, $YC_BC_R$ 4:4:4, and $YC_BC_R$ 4:2:2 can be transmitted through the TMDS channels #0 to #2. In the following, a description will be given using, for example, RGB 4:4:4 as an example among the above-described three formats.

In HDCP, a technology for preventing copying of content, which is adopted in HDMI®, data is scrambled in units of bits. For this reason, through one TMDS channel, data is transmitted in units of a fixed number of bits, that is, in units of 8 bits for the object of processing in HDCP, per clock of a pixel clock.

In the manner described above, through one TMDS channel, since 8-bit data is transmitted per clock of a pixel clock, it is possible for the three TMDS channels #0 to #2 to transmit 24-bit data per clock.

Therefore, in the current HDMI®, a 24-bit image as an image of RGB 4:4:4, in which each of the R component, the G component, and the B component of each pixel is 8 bits, is transmitted through the three TMDS channels #0 to #2.

That is, in the current HDMI®, as shown in FIG. 6, per clock of a pixel clock, the 8-bit B component among the pixel data of one pixel of a 24-bit image is transmitted through TMDS channel #0, the 8-bit G component is transmitted through TMDS channel #1, and the 8-bit R component is transmitted through TMDS channel #2.

As described above, in recent years, there has been an increasing demand for transmitting an image having a higher resolution, that is, a high resolution image formed of a large number of bits of pixel data such that each of the R component, the G component, and the B component is 10 bits or 12 bits, which is larger than 8 bits.

In the current HDMI®, as described above, the transmission of a 24-bit image is performed in such a manner that 8-bit data is transmitted per clock of a pixel clock through one TMDS channel. Therefore, simply, the transmission of a high resolution image can be performed by transmitting data of, for example, 10 bits or 12 bits, which is larger than 8 bits, per clock of a pixel clock through one TMDS channel.

However, as described above, in HDCP, a technology for preventing copying of content, which is adopted in HDMI®, data is scrambled in units of 8 bits. Therefore, when data transmission is to be performed in units of bits other than 8 bits per clock of a pixel clock through one TMDS channel, it is difficult to apply HDCP. As a result, it is difficult to perform data transmission in compliance with HDMI®.

Therefore, in the current HDMI®, as described above, a pixel clock of the frequency of 165 MHz is employed. By employing, as this pixel clock, a pixel clock having a higher frequency, a high resolution image can also be transmitted while HDCP can be applied by transmitting data in fixed units of 8 bits per clock of a pixel clock through one TMDS channel.

It is possible to transmit a 10-bit high resolution image (hereinafter also referred to as a "30 bit (=10 bits×..3) image" as appropriate) such that each of the R component, the G component, and the B component is 10 bits by setting, for example, the frequency of the pixel clock to 5/4 times 165 MHz when a 24-bit image is to be transmitted.

Figure 7:
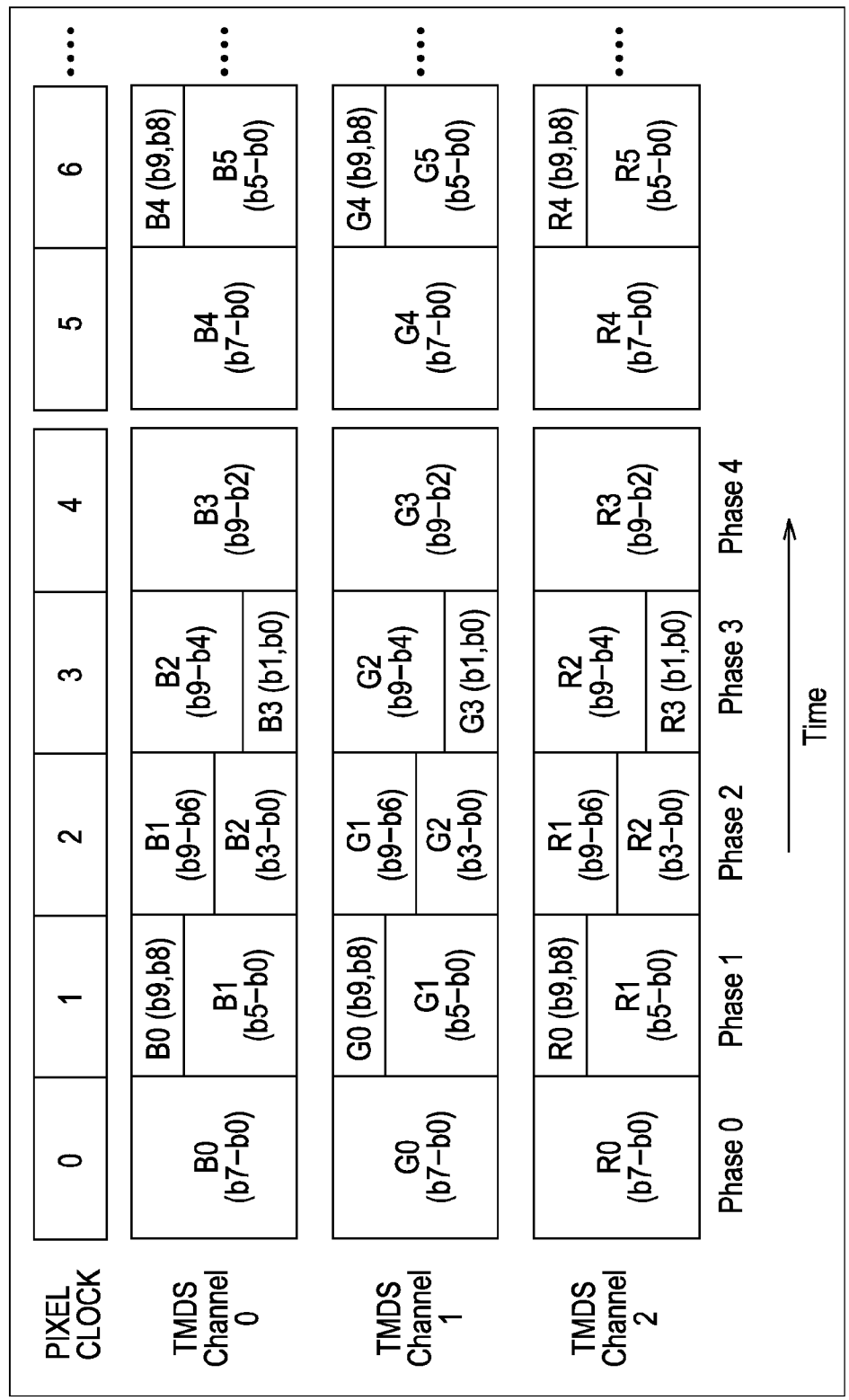
FIG. 7 is a timing chart showing the timing of transmission of pixel data when a 30-bit image is transmitted in the video data period of HDMI®.

FIG. 7 is a timing chart showing the timing of transmission of pixel data when a 30-bit image is to be transmitted in a video data period of HDMI®.

Transmission of a 30-bit image is common to the transmission of a 24-bit image in that the B component is transmitted through the TMDS channel #0, the G component is transmitted through the TMDS channel #1, and the R component is transmitted through the TMDS channel #2, and in that 8-bit data is transmitted per clock of a pixel clock.

However, the transmission of a 30-bit image differs from the transmission of a 24-bit image in the following points. In the transmission of a 24-bit image, since one component (the R component, the G component, or the B component) of one pixel is 8 bits, the 8-bit components are transmitted in one clock of the pixel clock. In comparison, in the transmission of a 30-bit image, since one component of one pixel is 10 bits, the 10-bit components are transmitted over a plurality of clocks of the pixel clock.

That is, the 10-bit components from the LSB (Least Significant Bit) to the MSB (Most Significant Bit) are denoted as b0 to b9. The R component, the G component, and the B component of the i-th pixel in the raster scan sequence, of the pixel constituting the image are denoted as R #i−1 component, G #i−1 component, and B #i−1 component, respectively, and the j-th clock will be referred to as a clock #j−1 by using a particular clock (pulse) of a pixel clock as a reference.

In this case, as shown in FIG. 7, regarding the B component, the low-order 8 bits b0 to b7 among the 10-bit B#0 components are transmitted in clock #0, and a total of 8 bits of the remaining high-order 2 bits b8 and b9 among the 10-bit B#0 component and the low-order 6 bits b0 to b5 among the 10-bit B#1 components of the next pixel are transmitted in clock #1.

Furthermore, a total of 8 bits of the remaining high-order 4 bits b6 to b9 among the 10-bit B#1 components and the low-order 4 bits b0 to b3 among the 10-bit B#2 components of the next pixel are transmitted in clock #2. A total of 8 bits of the remaining high-order 6 bits b4 to b9 among the 10-bit B#2 components, and the low-order 2 bits b0 and b1 among the 10-bit B#3 components of the next pixel are transmitted in clock #3.

Then, the remaining high-order 8 bits b2 to b9 among the 10-bit B#3 components are transmitted in clock #4.

In the manner described above, B#0 to B#3 components, which are B components of 4 pixels, are transmitted in 5 clocks of clocks #0 to #4, and hereinafter, the B components of 4 pixels are transmitted in 5 clocks in a similar manner.

As illustrated in FIG. 6, regarding a 24-bit image, 8-bit B components are transmitted in 1 clock, and regarding a 30-bit image, 10-bit B components for 4 pixels are transmitted in 5 clocks. Therefore, regarding a 30-bit image, by transmitting the B component by using a pixel clock of a frequency 5/4 times the frequency of the 24-bit image, one frame of the 30-bit image can be transmitted in the same period of time as for one frame of the 24-bit image.

Components other than the B component of the 30-bit image, that is, the G component and the R component, are also transmitted in the same manner as for the B component.

Furthermore, in the transmission of a 30-bit image, the transmission of pixel data of 4 pixels in 5 clocks forms a transmission unit, and the transmission unit is repeated. If the clock in the transmission unit is referred to as a phase, the transmission unit of the 30-bit image is composed of five phases.

Next, by increasing the frequency of the pixel clock, it is possible to transmit a high resolution image having a resolution higher than that of a 30-bit image, that is, a high resolution image in which the R component, the G component, and the B component are each, for example, 12 bits (hereinafter also referred to as a 36-bit (=12 bits×..3) image as appropriate), and a high resolution image in which the R component, the G component, and the B component are each, for example, 16 bits (hereinafter also referred to as a 48-bit (=16 bits×..3) image as appropriate).

More specifically, for example, by setting the frequency of the pixel clock to be 3/2 times 165 MHz in the case of transmitting a 24-bit image, it is possible to transmit a 36-bit image in which the R component, G component, and B component are each 12 bits.

Figure 8:
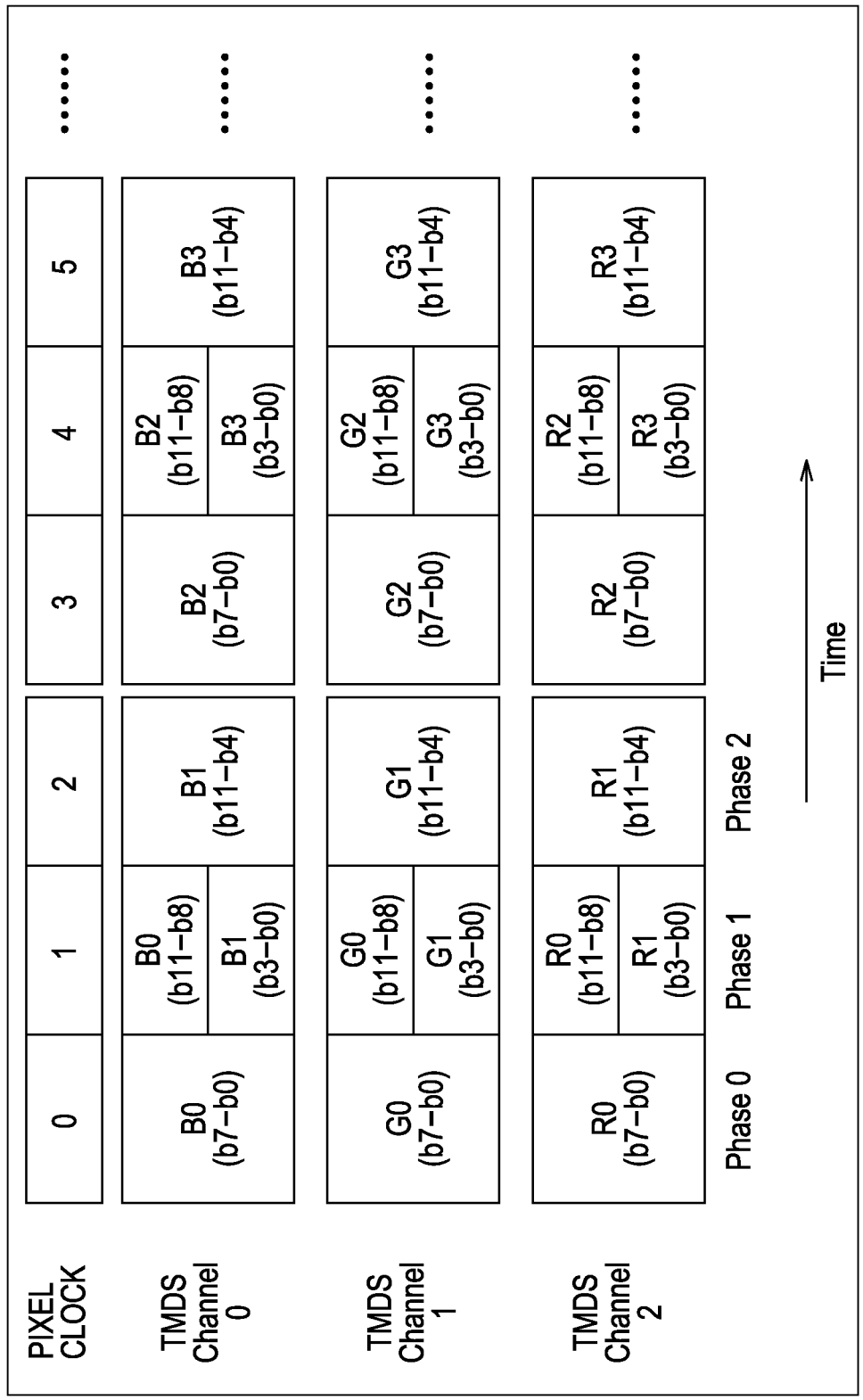
FIG. 8 is a timing chart showing the timing of transmission of pixel data when a 36-bit image is transmitted in the video data period of HDMI®.

FIG. 8 is a timing chart showing the timing of transmission of pixel data when a 36-bit image is to be transmitted in a video data period of HDMI®.

The transmission of a 36-bit image is common to the transmission of a 24-bit image in that the B component is transmitted through the TMDS channel #0, the G component is transmitted through the TMDS channel #1, and the R component is transmitted through the TMDS channel #2, and in that 8-bit data is transmitted per clock of a pixel clock.

However, in the transmission of a 24-bit image, since one component of one pixel is 8 bits, the 8-bit component is transmitted in one clock of a pixel clock. In comparison, in the transmission of a 36-bit image, since one component of one pixel is 12 bits, the transmission of a 36-bit image differs from the transmission of a 24-bit image in that the 12-bit component is transmitted over a plurality of pixel clocks.

That is, if the 12-bit components from the LSB to the MSB are denoted as b0 to b11, regarding the B components, as shown in FIG. 8, the low-order 8 bits b0 to b7 among the 12-bit B#0 components are transmitted in clock #0. A total of 8 bits of the remaining high-order 4 bits b8 to b11 among the 12-bit B#1 components, and the low-order 4 bits b0 to b3 of the next pixel are transmitted in clock #1.

Then, the remaining high-order 8 bits b4 to b11 among the 12-bit B#1 components are transmitted in clock #2.

In the manner described above, B#0 and B#1 components, which are B components of two pixels, are transmitted in 3 clocks of clocks #0 to #2, and hereinafter, the B components of two pixels are transmitted in 3 clocks in a similar manner.

As illustrated in FIG. 6, regarding the 24-bit image, 8-bit B components are transmitted in one clock, and regarding the 36-bit image, 12-bit B components for two pixels are transmitted in 3 clocks. Therefore, regarding the 36-bit image, by transmitting the B components by using a pixel clock of a frequency 3/2 times that of the 24-bit image, it is possible to transmit one frame of the 36-bit image in the same period of time as for one frame of the 24-bit image.

Components other than the B component of the 36-bit image, that is, the G component and the R component, are transmitted in the same manner as for the B component.

Furthermore, in the transmission of a 36-bit image, the transmission of pixel data of 2 pixels in 3 clocks forms a transmission unit, and the transmission unit is repeated. Therefore, the transmission unit of the 36-bit image is composed of three phases.

Next, the transmission of a 48-bit image in which the R component, the G component, and the B component are each 16 bits can be performed by setting the frequency of the pixel clock to be two times 165 MHz in the case of transmitting a 24-bit image.

Figure 9:
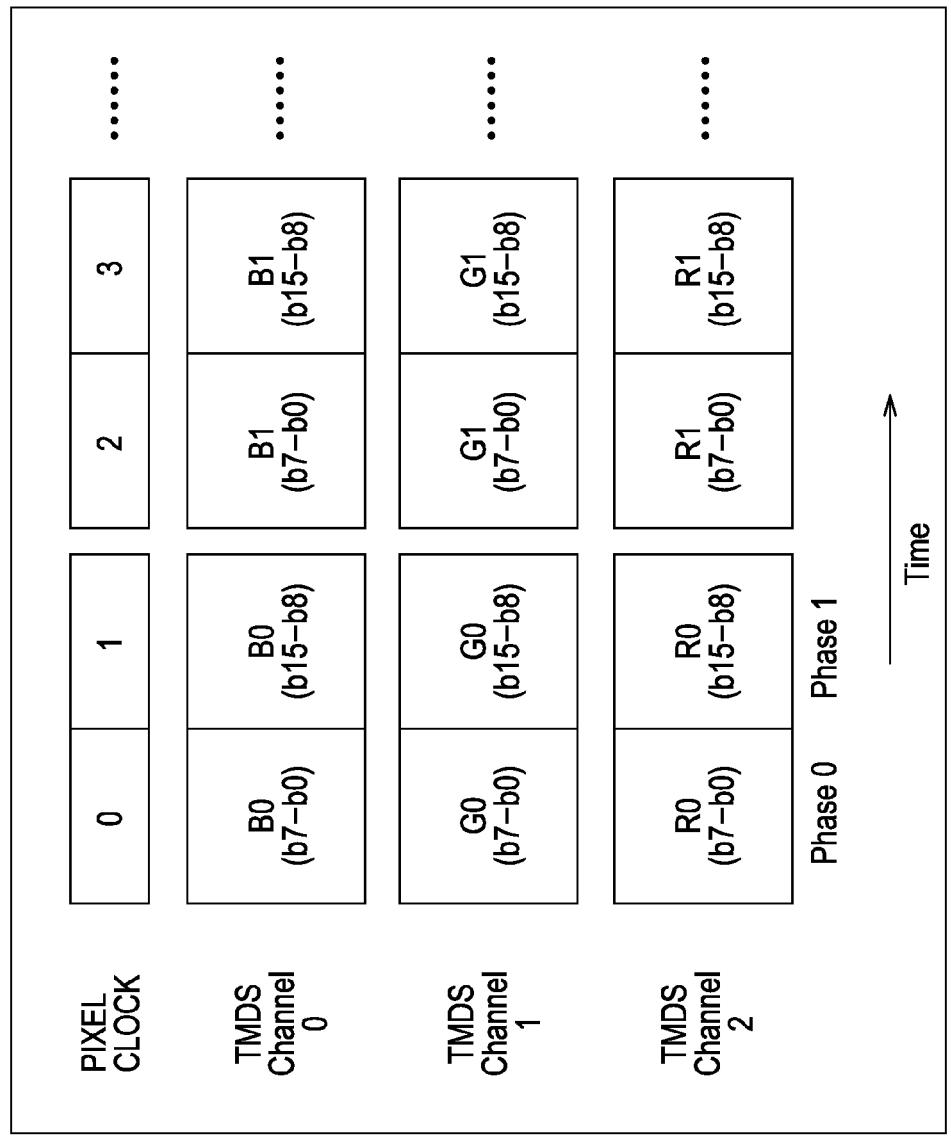
FIG. 9 is a timing chart showing the timing of transmission of pixel data when a 48-bit image is transmitted in the video data period of HDMI®.

FIG. 9 is a timing chart showing the timing of transmission of pixel data when a 48-bit image is to be transmitted in a video data period of HDMI®.

The transmission of a 48-bit image is common to the transmission of a 24-bit image in that the B component is transmitted through TMDS channel #0, the G component is transmitted through TMDS channel #1, the R component is transmitted through TMDS channel #2, and in that 8-bit data is transmitted per clock of a pixel clock.

The transmission of a 48-bit image differs from the transmission of a 24-bit image as follows. In the transmission of a 24-bit image, since one component of one pixel is 8 bits, the 8-bit component is transmitted in one clock of a pixel clock. In comparison, in the transmission of a 48-bit image, since one component of one pixel is 16 bits, the 16-bit component is transmitted over a plurality of clocks of the pixel clock.

That is, if 16-bit components from the LSB to the MSB are denoted as b0 to b15, as shown in FIG. 9, regarding the B components, the low-order 8 bits b0 to b7 among the 16-bit B#0 component are transmitted in clock #0, and the remaining high-order 8 bits b8 to b15 among the 16-bit B#0 component are transmitted in clock #1.

In the manner described above, the B#0 component, which is the B component of one pixel, is transmitted in two clocks of clocks #0 and #1, and hereinafter, the B component of one pixel is transmitted in two clocks in a similar manner.

As illustrated in FIG. 6, regarding the 24-bit image, 8-bit B components are transmitted in one clock, and regarding the 48-bit image, 16-bit B components for one pixel are transmitted in two clocks. Therefore, regarding the 48-bit image, by transmitting the B component by using a pixel clock of a frequency two times that of the 24-bit image, it is possible to transmit one frame of the 48-bit image in the same period of time as that of one frame of the 24-bit image.

Components other than the B component of the 48-bit image, that is, the G component and the R component, are also transmitted in the same manner as for the B component.

Furthermore, in the transmission of a 48-bit image, the transmission of pixel data of 1 pixel in 2 clocks forms a transmission unit, and the transmission unit is repeated. Therefore, the transmission unit of the 48-bit image is composed of two phases.

In the manner described above, by adjusting the frequency of the pixel clock so as to be, for example, 5/4 times, 3/2 times, and 2 times that in the case of transmitting a 24-bit image, the transmission of pixel data in which 10 bits, 12 bits, and 16 bits, which is greater than 8 bits, which is a fixed number of bits that are transmitted per clock of a pixel clock through the TMDS channel of the current HDMI®, are assigned to each component, that is, the transmission of a high resolution image, such as a 30-bit image, a 36-bit image, or a 48-bit image, can be performed by using the TMDS channel of the current HDMI® as it is.

Therefore, when it is considered that the transmission of a 24-bit image is performed in the current HDMI®, by adjusting the frequency of the pixel clock, the transmission of pixel data in which a number of bits, which is greater than 8 bits, which is a fixed number of bits that are transmitted per clock of a pixel clock through the TMDS channel of the current HDMI®, is assigned to each component, that is, for example, the transmission of a high resolution image such as a 30-bit image, a 36-bit image, or a 48-bit image, in addition to a 24-bit image, can be performed by using the TMDS channel of the current HDMI® as it is.

If a communication interface capable of performing the transmission of a high resolution image in addition to a 24-bit image by using the TMDS channel of the current HDMI® as it is referred to as, in particular, deep color HDMI®, in the case in which, for example, an HDMI® source in compliance with deep color HDMI® is to transmit a high resolution image, first, it is necessary to recognize whether or not a HDMI® sink with which communication is performed supports (complies with) deep color HDMI®.

At this point, whether or not the HDMI® sink complies with deep color HDMI® can be described (contained) in E-EDID that is capability information on the capability of the HDMI® sink.

FIG. 10 shows VSDB (Vender Specific Definition Bit) in E-EDID.

In the current HDMI®, bits #4, #5, and #6, which are fifth, sixth, and seventh bits from the LSB of byte #6 of VSDB are unused (Reserved). In FIG. 10, bits Suport_30bit, Suport_36bit, and Suport_48bit are assigned to bits #4, #5, and #6, respectively.

All the bit Suport_30bit assigned to bit #4 of byte #6 of VSDB, the bit Suport_36bit assigned to bit #5, and the bit Suport_48bit assigned to bit #6 are set to, for example, 0 when the HDMI® sink does not support a high resolution image, that is, when HDMI® sink supports only a 24-bit image.

When the HDMI® sink supports only a 30-bit image among high resolution images, only the bit Suport_30bit is set to 1. When the HDMI® sink supports only a 30-bit image and a 36-bit image among the high resolution images, only the bit Suport_36bit is set to 1. Furthermore, when the HDMI® sink supports all of the 30-bit image, the 36-bit image, and the 48-bit image, only the bit Suport_48bit is set to 1.

In the manner described above, as a result of describing whether or not the HDMI® sink complies with deep color HDMI® in the VSDB of the E-EDID, it is possible for the HDMI® source to recognize whether or not the HDMI® sink supports a high resolution image by reading E-EDID from the HDMI® sink and by referring to the VSDB of the E-EDID. Furthermore, when the HDMI® sink supports a high resolution image, it is possible to recognize which one of the 30-bit image, the 36-bit image, and the 48-bit image the HDMI® sink supports.

The bits Suport_30bit, Suport_36bit, and Suport_48bit shown in FIG. 10 can also be described in the VSDB of the E-EDID of the HDMI® source.

Next, exchanging of E-EDID between the HDMI® source and the HDMI® sink is performed at a specific timing, such as when the HDMI® source and the HDMI® sink are connected to each other or when the power supply of the HDMI® source or the HDMI® sink is turned on, and is not performed in a periodic manner.

On the other hand, when the HDMI® source and the HDMI® sink support a high resolution image, there are cases in which a 24-bit image is transmitted from the HDMI® source to the HDMI® sink or a high resolution image is transmitted, and in the case of transmitting a high resolution image, there is a case in which a 30-bit image, a 36-bit image, or a 48-bit image is transmitted.

As illustrated in FIG. 4, the transmission of an image is performed in a video data period assigned to an active video period (Active Video) of a video field. Therefore, it is preferable that the HDMI® sink can recognize which one of the 24-bit image, the 30-bit image, the 36-bit image, and the 48-bit image the image transmitted in the video data period is for each video field containing the video data period.

In this case, it is necessary to transmit for each video field, from the HDMI® source to the HDMI® sink, information (hereinafter also referred to as a "deep color mode" as appropriate) indicating which one of the 24-bit image, the 30-bit image, the 36-bit image, and the 48-bit image the image transmitted in the video data period contained in the video field is.

At this point, as information transmitted for each video field from the HDMI® source into the HDMI® sink, there is a general control packet transmitted in the control period illustrated in FIG. 4 within the vertical blanking period.

Therefore, the deep color mode can be contained in a general control packet, so that the deep color mode is transmitted from the HDMI® source to the HDMI® sink for each video field.

FIG. 11 shows the format of a general control packet.

The general control packet has a packet header (General Control Packet Header) and a subpacket (General Control Subpacket). The upper area of FIG. 11 shows a packet header, and the lower area of FIG. 11 shows a subpacket.

In the current HDMI®, it is stipulated that bits #0, #1, and #2, which are first, second, and third bits from the LSB of byte #SB1 of a subpacket (the lower area of FIG. 11) of a general control packet, are unused and set to 0. In FIG. 11, bits CD0, CD1, and CD2 indicating a deep color mode are assigned to the bits #0, #1, and #2, respectively.

FIG. 12 shows the relationship between bits CD0, CD1, and CD2 of byte #SB1 of a subpacket, and an image transmitted in a video data period (FIG. 4) contained in a video field containing a control period (FIG. 4) in which a general control packet having a subpacket is transmitted.

When the HDMI® sink does not support a high resolution image (Color Depth not indicated), all the bits CD0, CD1, and CD2 indicating a deep color mode are set to 0 in the same manner as in the current HDMI®.

Furthermore, when the HDMI® sink supports a high resolution image, in the case that an image transmitted in the video data period is a 24-bit image, the bits CD0, CD1, and CD2 indicating a deep color mode are set to, for example, 0, 0, and 1, respectively. When the image transmitted in the video data period is a 30-bit image, the bits CD0, CD1, and CD2 indicating a deep color mode are set to, for example, 1, 0, and 1, respectively.

Furthermore, when the image transmitted in the video data period is a 36-bit image, the bits CD0, CD1, and CD2 indicating a deep color mode are set to, for example, 0, 1, and 1, respectively. When the image transmitted in the video data period is a 48-bit image, all bits CD0, CD1, and CD2 indicating a deep color mode are set to, for example, 1.

In the manner described above, the HDMI® source transmits the bits CD0, CD1, and CD2 indicating a deep color mode, with the bits being contained in the general control packet, in the control period of the video field. As a result, it is possible for the HDMI® sink to recognize which one of the 24-bit image, the 30-bit image, the 36-bit image, and the 48-bit image the image transmitted in the video data period of the video field is.

In the current HDMI®, the bits #4, #5, and #6 of the fifth, sixth, and seventh bits from the LSB of byte #SB1 of a subpacket (the lower area of FIG. 11) of the general control packet shown in FIG. 11 are assumed to be unused and set to 0. In FIG. 11, the bits PP0, PP1, and PP2 indicating a phase are assigned to the bits #4, #5, and #6, respectively.

That is, when a 30-bit image, a 36-bit image or a 48-bit image is to be transmitted, a phase exists, as illustrated in FIGS. 7 to 9, respectively. In the bits PP0, PP1, and PP2 of byte #SB1 of the subpacket, values indicating the phase of the pixel data that is transmitted finally among the pixel data of an image transmitted in the video data period contained in the video field containing the control period in which the general control packet having the subpacket is transmitted are set.

Next, a description will be given, with reference to the flowcharts in FIGS. 13 and 14, of the operation of the HDMI® source 53 and the HDMI® sink 61 when the HDMI® source 53 and the HDMI® sink 61 in FIG. 2 complies with deep color HDMI®.

First, a description will be given below, with reference to the flowchart in FIG. 13, of the operation of the HDMI® source 53 in FIG. 2.

The HDMI® source 53 waits for E-EDID of the HDMI® sink 61 to be transmitted from the HDMI® sink 61 via the DDC illustrated in FIG. 2, and receives the E-EDID in step S11.

Then, by referring to VSDB (FIG. 10) of E-EDID from the HDMI® sink 61, in step S12, the HDMI® source 53 recognizes which one of a 24-bit image, a 30-bit image, a 36-bit image, and a 48-bit image the image (the corresponding image) that can be received by the HDMI® sink 61 is. Furthermore, the HDMI® source 53 determines the image in the deep color mode, that is, the image to be transmitted through the three TMDS channels #0 to #2, among the images supported by the HDMI® sink 61.

At this point, it is possible for the HDMI® source 53 to determine, for example, an image having the highest resolution as an image to be transmitted through the three TMDS channels #0 to #2 among the images supported by the HDMI® sink 61. In this case, when the HDMI® sink 61 supports, for example, a 24-bit image, a 30-bit image, a 36-bit image, and a 48-bit image, the 48-bit image having the highest resolution is determined as an image to be transmitted through the TMDS channels #0 to #2.

Thereafter, in step S13, the HDMI® source 53 adjusts the frequency of the pixel clock, and thereby starts outputting the pixel clock corresponding to the deep color mode determined in step S12. The process then proceeds to step S14.

In step S14, the HDMI® source 53 starts, through the TMDS channels #0 to #2, the transmission of the pixel data of the image indicated by the deep color mode determined in step S12.

The transmission of the image indicated by the deep color mode through the TMDS channels #0 to #2 is performed in synchronization with the pixel clock whose output has been started in step S13.

Furthermore, during the transmission of the image indicated by the deep color mode through the TMDS channels #0 to #2, as illustrated in FIGS. 11 and 12, the HDMI® source 53 transmits, for each video field, that is, for each frame, a general control packet in which the bits CD0, CD1, and CD2 indicating the deep color mode of the image transmitted in the video data period are written, in the control period (FIG. 4) of the vertical blanking period.

Next, a description will be given, with reference to the flowchart in FIG. 14, of the operation of the HDMI® sink 61 of FIG. 2.

In step S31, the HDMI® sink 61 transmits its own E-EDID to the HDMI® source 53 via the DDC (FIG. 2).

Figure 13:
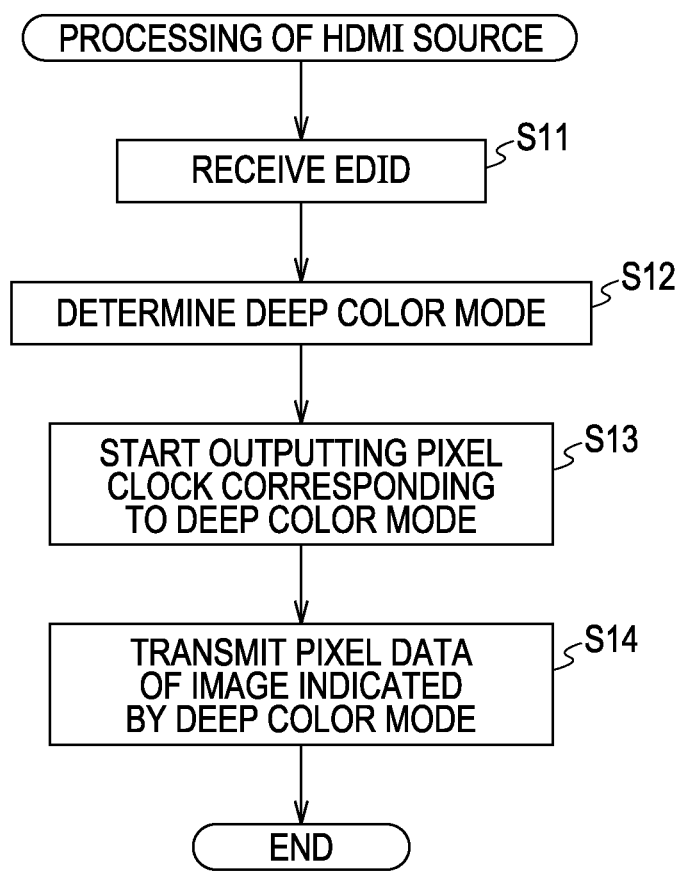
FIG. 13 is a flowchart illustrating the operation of an HDMI® source 53 in compliance with deep color HDMI®.
Figure 14:
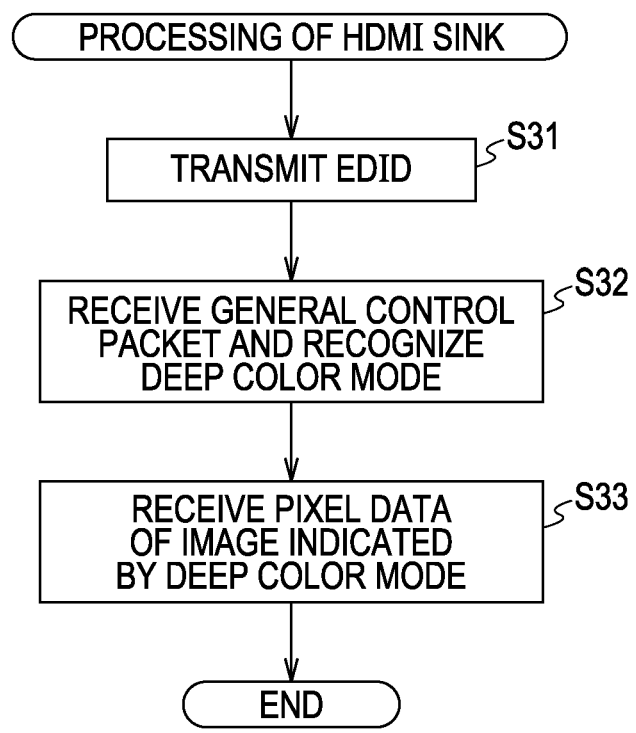
FIG. 14 is a flowchart illustrating the operation of an HDMI® sink 61 in compliance with deep color HDMI®.

Thereafter, as illustrated in FIG. 13, in the HDMI® source 53, the output of a pixel clock is started and a general control packet is transmitted via the TMDS channels #0 to #2. Then, in step S32, the HDMI® sink 61 receives the general control packet (FIGS. 11 and 12) from the HDMI® source 53, and recognizes the deep color mode of the image transmitted in the video data period by referring to the bits CD0, CD1, and CD2 of the general control packet.

Then, the HDMI® sink 61 waits for the pixel data of the image of the deep color mode, which was recognized in step S32, to be transmitted from the HDMI® source 53 in synchronization with the pixel clock via the TMDS channels #0 to #2, and receives the pixel data in step S33.

The processing of steps S32 and S33 is performed for each video field.

Next, as illustrated in FIG. 13, the HDMI® source 53 determines the deep color mode and transmits the image of the deep color mode through the TMDS channels #0 to #2. The image supplied as an object to be transmitted to the HDMI® source 53, that is, for example, the image to be transmitted from the codec 52 (FIG. 1) to the HDMI® source 53, does not necessarily match the image of the deep color mode, which was determined by the HDMI® source 53.

That is, there is a case in which the image to be transmitted is an image having a resolution lower than that in the deep color mode, which was determined by the HDMI® source 53.

At this point, the image to be transmitted from the HDMI® source 53 to the HDMI® sink 61 will be hereinafter referred to as a main image, as appropriate.

Figure 15:
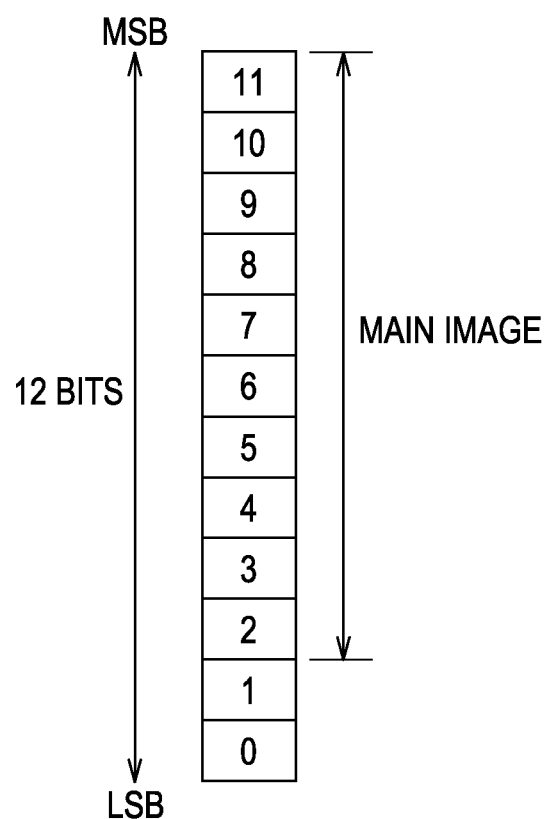
FIG. 15 illustrates the transmission of pixel data of a main image having a resolution lower than that of an image in a deep color mode determined by the HDMI® source 53.

In the manner described above, when the main image is an image having a resolution lower than that in the deep color mode, which was determined by the HDMI® source 53, the pixel data of the main image is transmitted as shown in, for example, FIG. 15.

FIG. 15 shows transmission pixel data that is pixel data transmitted through one TMDS channel when the image in the deep color mode is a 36-bit image and the main image is a 30-bit image having a resolution lower than that of an image in the deep color mode.

When the image of the deep color mode is a 36-bit image, each of R, G, and B components of the pixel data of the 36-bit image is 12 bits. Therefore, as shown in FIG. 15, transmission pixel data transmitted through one TMDS channel is 12-bit data.

On the other hand, when the main image is a 30-bit image, each of R, G, and B components of the pixel data of the 30-bit image is 10 bits. Therefore, when transmitting a 30-bit image that is a main image, the pixel data of the main image to be transmitted through one TMDS channel is data of 10 bits, which is less than 12 bits, which is a number of bits of the transmission pixel data.

In the manner described above, when the pixel data of the main image is an image with a number of bits smaller than that of transmission pixel data, the HDMI® source 53 transmits the pixel data of the main image in such a manner that, for example, as shown in FIG. 15, the pixel data is assigned to, by being packed closer to, the higher-order bits of the transmission pixel data.

Therefore, when the pixel data of the main image is 10 bits and the transmission pixel data is 12 bits, as shown in FIG. 15, the transmitter 72 (FIG. 2) of the HDMI® source 53 assigns the pixel data of the 10-bit main image to the high-order 10 bits of a 12-bit transmission pixel data and transmits it.

In this case, the receiver 81 (FIG. 2) of the HDMI® sink 61 receives the 12-bit transmission pixel data from the transmitter 72 of the HDMI® source 53. Only the pixel data of the main image, which is assigned to the high-order 10 bits among the 12-bit transmission pixel data, is processed, and the remaining low-order 2 bits are ignored (discarded).

At this point, when the HDMI® source 53 and the HDMI® sink 61 support, for example, a 36-bit image in the manner described above, that is, when the HDMI® source 53 transmits 12-bit transmission pixel data and the HDMI® sink 61 can receive 12-bit transmission pixel data, in the case that the pixel data of the main image is pixel data of less than 12 bits, in the HDMI® source 53 supporting a 36-bit image, the low-order bits to which the pixel data of the main image is not assigned among the 12-bit transmission pixel data are set as a no-signal (0). Then, in the HDMI® sink 61 supporting a 36-bit image, the 12-bit transmission pixel data from the HDMI® source 53 is processed as it is, and the thereby obtained image is displayed. In the display of the image, since the low-order bits to which the pixel data of the main image is not assigned among the 12-bit transmission pixel data are a no-signal (0), the low-order bits are ignored in the display of the image in the HDMI® sink 61. As a result, in the HDMI® sink 61, the image formed by the pixel data assigned to the high-order bits among the 12-bit transmission pixel data, that is, the main image, is displayed. Therefore, in the HDMI® sink 61, if 8-bit or 10-bit pixel data is assigned to the 12-bit transmission pixel data, an image formed by the 8-bit or 10-bit pixel data is displayed.

In the manner described above, when a number B1 of bits of the pixel data of the main image is smaller than a number B2 of bits of the transmission pixel data, the pixel data of the main image whose number of bits is B1 is assigned to the high-order bits of the transmission pixel data whose number of bits is B2, and the transmission pixel data is transmitted from the HDMI® source 53 to the HDMI® sink 61. In this case, since the low-order (B2−B1) bits to which the pixel data of the main image is not assigned among the transmission pixel data transmitted from the HDMI® source 53 to the HDMI® sink 61 are not substantially used, this is inefficient.

Therefore, it is possible for the HDMI® source 53 and the HDMI® sink 61 to assign a signal differing from the main image (hereinafter referred to as a "sub-signal" as appropriate) to bits to which the pixel data of the main image is not assigned among the transmission pixel data, thereby making it possible to perform efficient data transmission in which the main image and the sub-signal are transmitted simultaneously.

At this point, bits to which the pixel data of the main image is not assigned among the transmission pixel data will be hereinafter referred to remainder bits as appropriate.

Figure 16:
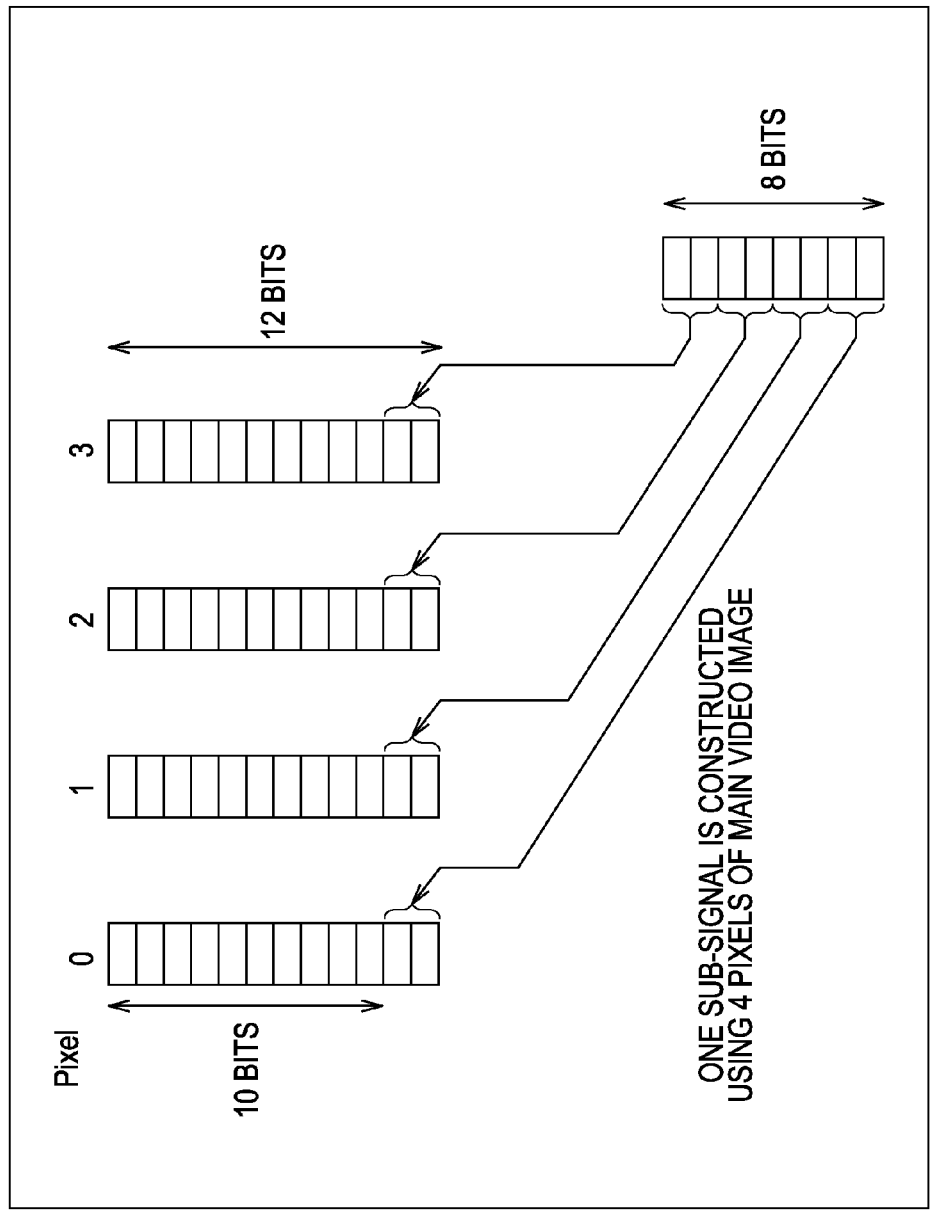
FIG. 16 illustrates an assignment method of assigning a sub-signal to transmission pixel data.

FIG. 16 shows an assignment method of assigning a sub-signal to transmission pixel data.

For example, as illustrated in FIG. 15, when the transmission pixel data (pixel data transmitted through one TMDS channel) is 12 bits and (one component of) the pixel data of the main image is 10 bits, the pixel data of the 10-bit main image is assigned to the high-order 10 bits of the transmission pixel data, and thereby the low-order 2 bits of the transmission pixel data become remainder bits.

If it is assumed that the sub-signal is a signal (data) in which, for example, 8 bits is one unit, as shown in FIG. 16, the sub-signal in one unit is divided into four pieces of data at intervals of two bits equal to the remainder bits, and the four pieces of the data are assigned to the low-order 2 bits, which are the remainder bits of the transmission pixel data of 4 pixels in a corresponding manner.

In this case, if the sub-signal is assumed to be an image in which, for example, each of R, G, and B components is 8 bits, as this image that is the sub-signal, for example, an image having a resolution of (the number of pixels) approximately ¼ that of the main image can be used.

At this point, when the main image is an image of 1920 pixels×..1080 lines in which, for example, each of R, G, and B components is 10 bits, and the transmission pixel data is, for example, 12 bits, in the case that the sub-signal is an image of 480 pixels×..360 lines in which each of R, G, and B components is 8 bits, the sub-signal as the image of 480 pixels×..360 lines can be assigned to the low-order 2 bits that are the remainder bits of the transmission pixel data for 360 lines among the 1080 lines of the main image. Then, in this case, another sub-signal can further be assigned to the transmission pixel data for 720 (=1080−360) lines, to which the sub-signal as the image for 480 pixels×..360 lines is not assigned, among the transmission pixel data for 1080 lines.

Furthermore, when the main image is an image of 1920 pixels×..1080 lines in which, for example, each of R, G, and B components is 8 bits, and the transmission pixel data is, for example, 12 bits, the low-order 4 bits of the transmission pixel data become remainder bits. In this case, an image of approximately 960 pixels×..720 lines in which each of R, G, and B components is 8 bits can be assigned to the transmission pixel data for 1080 lines of the main image.

In the following, the sub-signal is assumed to be a signal in units of 8 bits.

In the manner described above, HDMI® capable of assigning a sub-signal to the remainder bits of the transmission pixel data and transmitting transmission pixel data together with the main image through the TMDS channels #0 to #2 will be referred to as extended HDMI® in order to make a distinction from the current HDMI®. Then, when the HDMI® source in compliance with extended HDMI® assigns the sub-signal to the remainder bits of the transmission pixel data, first, it is necessary to recognize whether or not the HDMI® sink with which communication is performed complies with extended HDMI®.

Whether or not the HDMI® sink complies with extended HDMI® can be described in, for example, E-EDID, which defines capability information on the capability of the HDMI® sink, similarly to that described above, that is, whether or not the HDMI® sink complies with deep color HDMI®.

FIG. 17 shows the format of VSDB in E-EDID.

In the current HDMI®, as shown in FIG. 10, the bits #4, #5, #6, and #7 of the fifth, sixth, seventh, and eighth bits from the LSB of byte #7 of VSDB are unused (Reserved). In FIG. 17, the bits Sub_2bit, Sub_4bit, Sub_8bit, and Sub_Data_Support are assigned to the bits #4, #5, #6, and #7, respectively.

All of the bit Sub_2bit assigned to bit #4 of byte #7 of VSDB, the bit Sub_4bit assigned to bit #5, and the bit Sub_8bit assigned to bit #6 are set to 0 when the HDMI® sink cannot receive a sub-signal, that is, when the HDMI® sink cannot handle a sub-signal.

Then, when the HDMI® sink can set the low-order 2 bits of the transmission pixel data as remainder bits and can handle the sub-signal assigned to the 2-bit remainder bits, the bit Sub_2bit is set to 1. When the HDMI® sink can set the low-order 4 bits of the transmission pixel data as remainder bits and can handle the sub-signal assigned to the 4-bit remainder bits, the bit Sub_4bit is set to 1. Furthermore, when the HDMI® sink can set the low-order 8 bits of the transmission pixel data as remainder bits and can handle the sub-signal assigned to the 8-bit remainder bits, the bit Sub_8bit is set to 1.

The bit Sub_Data_Support is set to 1 when the HDMI® sink can handle a sub-signal and is set to 0 when the HDMI® sink does not comply with extended HDMI®.

When the bit Sub_Data_Support is 0, all of Sub_2bit, Sub_4bit, and Sub_8bit are set to 0.

In the manner described above, as a result of describing whether or not the HDMI® sink complies with extended HDMI® in VSDB of E-EDID, it is possible for the HDMI® source to recognize whether or not the HDMI® sink can handle the sub-signal by reading E-EDID from the HDMI® sink and by referring to the VSDB of the E-EDID. Furthermore, when the HDMI® sink can handle the sub-signal, it is possible to recognize how many of the low-order bits of the transmission pixel data can be assigned as remainder bits to the sub-signal.

The bits Sub_2bit, Sub_4bit, Sub_8bit, and Sub_Data_Support shown in FIG. 17 can also be described in VSDB of E-EDID of the HDMI® source.

Although it is assumed in FIG. 17 that the sub-signal to be assigned to the transmission pixel data is 2 bits, 4 bits, or 8 bits, the number of bits of the sub-signal to be assigned to the transmission pixel data is not limited to this.

Furthermore, it is possible to set a value corresponding to the number of bits of the sub-signal, which is assigned to the transmission pixel data, rather than Sub_2bit, Sub_4bit, Sub_8bit, and Sub_Data_Support, in the 4 bits #4 to #7 of the fifth to eighth from the LSB of byte #7 of VSDB. In this case, 4 bits, that is, bits #4 to #7, can represent 16 kinds of number of bits.

Next, as described above, transmission and reception of E-EDID to and from the HDMI® source and the HDMI® sink is performed at a specific timing, such as when the HDMI® source and the HDMI® sink are connected to each other or when the power supply of the HDMI® source or the HDMI® sink is turned on, and is not performed in a periodic manner.

On the other hand, when the HDMI® source and the HDMI® sink comply with extended HDMI®, there can be a case in which a sub-signal has been assigned to the transmission pixel data to be transmitted from the HDMI® source to the HDMI® sink and a case in which a sub-signal has not been assigned. Furthermore, when the sub-signal has been assigned to the transmission pixel data, there is a case in which the assigned sub-signal is 2 bits, 4 bits, or 8 bits.

At this point, for the sake of simplicity of description, the fact that a sub-signal has not been assigned to transmission pixel data will also be hereinafter represented that the number of bits of the sub-signal assigned to the transmission pixel data is 0, as appropriate.

As illustrated in FIG. 4, the transmission of the transmission pixel data is performed in the video data period assigned to the active video period (Active Video) of the video field. Therefore, it is preferable that the HDMI® sink can recognize, for each video field containing the video data period, which one of 0 bits, 2 bits, 4 bits, and 8 bits the sub-signal assigned to transmission pixel data transmitted in the video data period is.

In this case, it is necessary to transmit, for each video field from the HDMI® source to the HDMI® sink, information (hereinafter referred to as "sub-signal information" as appropriate) indicating which one of 0 bits, 2 bits, 4 bits, or 8 bits the sub-signal assigned to the transmission pixel data transmitted in the video data period contained in the video field is.

Similarly to the above-described deep color mode, the sub-signal information can be contained in the general control packet transmitted in the control period (FIG. 4) in the vertical blanking period, and can be transmitted from the HDMI® source to the HDMI® sink for each video field.

FIG. 18 shows a general control packet containing sub-signal information.

As illustrated in FIG. 11, the general control packet has a packet header (General Control Packet Header) and a sub-packet (General Control Subpacket). The upper area of FIG. 18 shows a packet header, and the lower area of FIG. 18 shows a subpacket.

In the current HDMI®, it is assumed that the bits #0, #1, and #2 of the first, second, and third bits from the LSB of byte #SB2 of a subpacket of a general control packet are unused and set to 0. In FIG. 18, bits SD0, SD1, and SD2 as sub-signal information are assigned to bits #0, #1, and #2, respectively.

FIG. 19 shows the relationship between the bits SD0, SD1, and SD2 of byte #SB2 of a subpacket, and the number of bits of a sub-signal assigned to transmission pixel data transmitted in the video data period (FIG. 4) contained in the video field containing the control period (FIG. 4) in which a general control packet having the subpacket is transmitted.

When the number of bits of the sub-signal assigned to the transmission pixel data is 0, that is, when a sub-signal is not assigned to the transmission pixel data (Sub Data not Inserted), all the bits SD0, SD1, and SD2 as sub-signal information are set to 0 in the same manner as in the current HDMI®.

Furthermore, when the number of bits assigned to the transmission pixel data is 2, the bits SD0, SD1, and SD2 as the sub-signal information are set to, for example, 1, 0, and 0, respectively. When the number of bits assigned to transmission pixel data is 4, the bits SD0, SD1, and SD2 as the sub-signal information are set to, for example, 0, 1, and 0, respectively. When the number of bits assigned to transmission pixel data is 8, the bits SD0, SD1, and SD2 as the sub-signal information are set to, for example, 1, 1, and 0, respectively.

In the manner described above, the HDMI® source transmits the bits SD0, SD1, and SD2 as the sub-signal information, with the bits SD0, SD1, and SD2 being contained in the general control packet, in the control period of the video field. As a result, it is possible for the HDMI® sink to recognize which one of 0 bits, 2 bits, 4 bits, and 8 bits the sub-signal assigned to the transmission pixel data transmitted in the video data period of the video field is.

Figure 20:
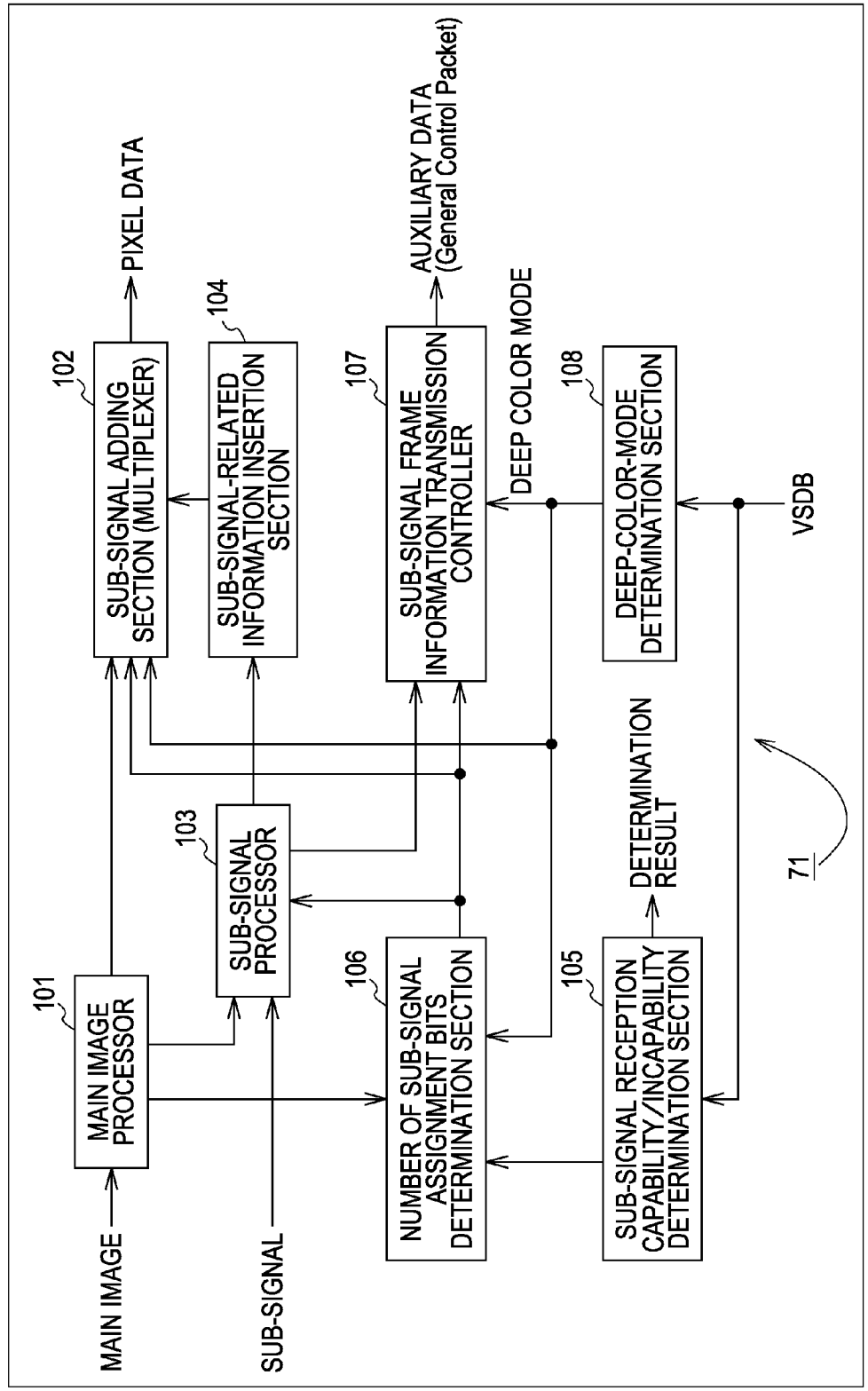
FIG. 20 is a block diagram showing an example of the configuration of a source signal processor 71.

FIG. 20 shows an example of the configuration of a source signal processor 71 possessed by the HDMI® source 53 when the HDMI® source 53 of FIG. 2 complies with extended HDMI.

In FIG. 20, the source signal processor 71 includes a main image processor 101, a sub-signal addition section 102, a sub-signal processor 103, a sub-signal-related information insertion section 104, a sub-signal reception capability/incapability determination section 105, a number of sub-signal assignment bits determination section 106, a sub-signal frame information transmission controller 107, and a deep-color-mode determination section 108.

For example, a main image having each of R, G, and B components is supplied to the main image processor 101. The main image processor 101 performs necessary processing on the main image supplied thereto, and supplies the pixel data of the main image to the sub-signal addition section 102.

Furthermore, the main image processor 101 detects the number P of pixels (the number of valid pixels) in the video data period of the video field (FIG. 4) of the main image supplied thereto, and supplies the number P of pixels to the sub-signal processor 103.

Furthermore, the main image processor 101 detects the number B1 of bits of each component of the pixel data of the main image supplied thereto and supplies the number B1 of bits to the number of sub-signal assignment bits determination section 106.

The pixel data of the main image whose number of bits is B1 is supplied to the sub-signal addition section 102 from the main image processor 101, and also a sub-signal is supplied to the sub-signal addition section 102 from the sub-signal-related information insertion section 104. Furthermore, the deep color mode is supplied to the sub-signal addition section 102 from the deep-color-mode determination section 108 and also, the number of sub-signal assignment bits indicating a number B3 of bits of the sub-signal assigned to the transmission pixel data is supplied to the sub-signal addition section 102 from the number of sub-signal assignment bits determination section 106.

The sub-signal addition section 102 recognizes the number B2 of bits of the transmission pixel data on the basis of the deep color mode supplied from the deep-color-mode determination section 108. That is, for example, when the deep color mode indicates one of a 24-bit image, a 30-bit image, a 36-bit image, and a 48-bit image, the sub-signal addition section 102 recognizes one of 8, 10, 12, and 16 as the number B2 of bits of the transmission pixel data, respectively.

Then, the sub-signal addition section 102 divides the sub-signal supplied from the sub-signal-related information insertion section 104 for each number B3 of sub-signal assignment bits from the number of sub-signal assignment bits determination section 106, and adds the division sub-signal, which is a divided sub-signal, as the low-order bits of the pixel data whose number of bits is B1, which is supplied from the main image processor 101. As a result, the transmission pixel data having the number B2 of bits, which is recognized from the deep color mode from the deep-color-mode determination section 108, that is, the transmission pixel data having the number of bits B2 (=B1+B3), in which the pixel data of the main image whose number of bits is B1 is assigned to the high-order bits and the division sub-signal whose number of bits is B3 is assigned to the low-order bits, is constructed.

The sub-signal addition section 102 constructs transmission pixel data whose number of bits is B2 with regard to each of R, G, and B components. The transmission pixel data having each of R, G, and B components, whose number of bits is B2, which is obtained by the sub-signal addition section 102, is supplied to the transmitter 72 (FIG. 2), and is transmitted, for example, at a timing corresponding to the number B2 of bits of the transmission pixel data among the timings described in FIGS. 6 to 9 through the TMDS channels #0 to #2.

As described above, the number P of bits in the video data period of the main image is supplied to the sub-signal processor 103 from the main image processor 101 and also, the sub-signal is supplied to the sub-signal processor 103. Furthermore, the number of sub-signal assignment bits is supplied to the sub-signal processor 103 from the number of sub-signal assignment bits determination section 106.

The sub-signal processor 103 determines the maximum amount of data P..×..B3 of the sub-signal that can be transmitted in the video data period of one video field on the basis of the number P of bits in the video data period of the main image, which is supplied from the main image processor 101, and the number B3 of bits of the sub-signal assignment bits B3, which is supplied from the number of sub-signal assignment bits determination section 106, and determines the amount D of data of the sub-signal (hereinafter referred to as an "amount of sub-signal addition unit data" as appropriate) that is transmitted in the video data period of one video field (1 frame) in the range of the maximum amount of data P..×..B3.

Furthermore, the sub-signal processor 103 supplies, for each of the amount D of the sub-signal addition unit data, the sub-signal supplied thereto, to the sub-signal-related information insertion section 104 for each of the amount D of the sub-signal addition unit data.

Furthermore, the sub-signal processor 103 supplies the sub-signal information indicating whether or not a sub-signal is contained in the transmission pixel data to the sub-signal frame information transmission controller 107.

That is, when the sub-signal of the amount D of the sub-signal addition unit data is to be supplied to the sub-signal-related information insertion section 104, that is, when there is a sub-signal to be assigned to the transmission pixel data, the sub-signal processor 103 supplies the sub-signal information indicating that a sub-signal is contained in the transmission pixel data to the sub-signal frame information transmission controller 107. Furthermore, when the sub-signal of the amount D of the sub-signal addition unit data is not to be supplied to the sub-signal-related information insertion section 104, that is, when there is no sub-signal to be supplied to the sub-signal-related information insertion section 104, the sub-signal processor 103 supplies the sub-signal information indicating that a sub-signal is not contained in the transmission pixel data to the sub-signal frame information transmission controller 107.

The sub-signal-related information insertion section 104 contains (inserts) sub-signal-related information related to the sub-signal, to the sub-signal of the amount D of the sub-signal addition unit data from the sub-signal processor 103 and supplies the signal to the sub-signal addition section 102.

The VSDB (FIG. 17) of the E-EDID, which is read from the HDMI® sink with which the HDMI® source 53 communicates, is supplied to the sub-signal reception capability/incapability determination section 105.

The sub-signal reception capability/incapability determination section 105 determines whether or not the HDMI® sink with which the HDMI® source 53 communicates can receive the sub-signal, that is, determines whether or not the HDMI® sink can handle the sub-signal, by referring to the bit Sub_Data_Support (FIG. 17) of the VSDB supplied thereto, and supplies the determination result to necessary blocks.

Furthermore, when it is determined that the HDMI® sink with which the HDMI® source 53 communicates can handle the sub-signal, the sub-signal reception capability/incapability determination section 105 further recognizes the number of bits of the sub-signal (hereinafter referred to as the "number of bits that can be handled" as appropriate) that can be handled by the HDMI® sink with which the HDMI® source 53 communicates by referring to the bits Sub_2bit, Sub_4bit, and Sub_8bit (FIG. 17) of the VSDB, and supplies the number of bits of the sub-signal to the number of sub-signal assignment bits determination section 106.

As described above, the number B1 of bits of the pixel data of the main image is supplied to the number of sub-signal assignment bits determination section 106 from the main image processor 101. Also, the number of bits that can be handled is supplied to the number of sub-signal assignment bits determination section 106 from the sub-signal reception capability/incapability determination section 105. Furthermore, the deep color mode is supplied to the number of sub-signal assignment bits determination section 106 from the deep-color-mode determination section 108.

On the basis of the deep color mode supplied from the deep-color-mode determination section 108, the number of sub-signal assignment bits determination section 106 recognizes the number B2 of bits of the transmission pixel data, and determines the difference B2−B1 with the number B1 of bits of the pixel data of the main image from the main image processor 101, that is, the number (B2−B1) of bits of the remainder bits of the transmission pixel data.

Then, when there is a number of bits matching the number (B2−B1) of bits of the remainder bits of the transmission pixel data in the numbers of bits that can be handled from the sub-signal reception capability/incapability determination section 105, the number of sub-signal assignment bits determination section 106 determines the number of bits to be the number B3 of sub-signal assignment bits.

At this point, when the number of bits that can be handled from the sub-signal reception capability/incapability determination section 105 is, for example, of three types of 2 bits, 4 bits, and 8 bits, the number B3 of sub-signal assignment bits is determined to be the following values.

That is, when the number B2 of bits of the transmission pixel data is, for example, 10 and the number B1 of bits of the pixel data of the main image is, for example, 8, the number B3 of sub-signal assignment bits is determined to be 2.

Furthermore, when the number B2 of bits of the transmission pixel data is, for example, 12 and the number B1 of bits of the pixel data of the main image is, for example, 8 or 10, the number B3 of sub-signal assignment bits is determined to be 4 or 2.

When the number B2 of bits of the transmission pixel data is, for example, 16 and the number B1 of bits of the pixel data of the main image is 8 or 12, the number B3 of sub-signal assignment bits is determined to be 8 or 4.

When there is no number of bits matching the number (B2−B1) of bits of the remainder bits of the transmission pixel data in the numbers of bits that can be handled from the sub-signal reception capability/incapability determination section 105, the numbers of sub-signal assignment bits determination section 106 can determine, for example, a maximum value among the number of bits that can be handled matching the number of bits less than the number (B2−B1) of bits of the remainder bits of the transmission pixel data among the numbers of bits that can be handled from the sub-signal reception capability/incapability determination section 105, to be the number B3 of sub-signal assignment bits. However, for the sake of simplicity of description, when there is no number of bits matching the number (B2−B1) of bits of the remainder bits of the transmission pixel data in the numbers of bits that can be handled from the sub-signal reception capability/incapability determination section 105, it is assumed that the HDMI® source 53 does not transmit the sub-signal and the HDMI® sink with which communication is performed performs the same processing as that when the sub-signal cannot be handled.

When the number B3 of sub-signal assignment bits is determined, the number of sub-signal assignment bits determination section 106 supplies the number B3 of sub-signal assignment bits to the sub-signal addition section 102, the sub-signal processor 103, and the sub-signal frame information transmission controller 107.

As described above, sub-signal information indicating whether or not the sub-signal is contained in the transmission pixel data is supplied to the sub-signal frame information transmission controller 107 from the sub-signal processor 103. Also, the number B3 of sub-signal assignment bits is supplied to the sub-signal frame information transmission controller 107 from the number of sub-signal assignment bits determination section 106. In addition, the deep color mode is supplied to the sub-signal frame information transmission controller 107 from the deep-color-mode determination section 108.

The sub-signal frame information transmission controller 107 allows the transmitter 72 (FIG. 2) to transmit the sub-signal information from the sub-signal processor 103, the deep color mode from the deep-color-mode determination section 108, and a general control packet (FIG. 18) containing the number B3 of sub-signal assignment bits, which is supplied from the number of sub-signal assignment bits determination section 106 as necessary.

That is, when the sub-signal information from the sub-signal processor 103 indicates that the sub-signal is not contained in the transmission pixel data, the sub-signal frame information transmission controller 107 performs transmission control such that the transmitter 72 transmits a general control packet in which all the bits SD0, SD1, and SD2 of FIG. 18 are set to 0, and the bits CD0, CD1, and CD2 are set to values indicating the deep color mode from the deep-color-mode determination section 108 (hereinafter referred to as a "general control packet with no sub-signal" as appropriate).

Furthermore, when the sub-signal information from the sub-signal processor 103 indicates that a sub-signal is contained in the transmission pixel data, the sub-signal frame information transmission controller 107 performs transmission control such that the transmitter 72 transmits a general control packet (hereinafter referred to as a "general control packet with a sub-signal" as appropriate) in which the bits SD0, SD1, and SD2 of FIG. 18 are set to values indicating the number B3 of sub-signal assignment bits from the number of sub-signal assignment bits determination section 106 and the bits CD0, CD1, and CD2 are set to values indicating the deep color mode from the deep-color-mode determination section 108.

The VSDB (FIG. 17) of the E-EDID read from the HDMI® sink with which the HDMI® source 53 communicates is supplied to the deep-color-mode determination section 108.

The deep-color-mode determination section 108 determines whether or not the HDMI® sink with which the HDMI® source 53 communicates supports a high resolution image by referring to the bits Suport_30bit, Suport_36bit, and Suport_48bit (FIG. 17) of the VSDB supplied thereto. When it is determined that the HDMI® sink does not support a high resolution image, the deep-color-mode determination section 108 determines the image in the deep color mode, that is, the image to be transmitted through three TMDS channels #0 to #2, to be a 24-bit image.

Furthermore, when it is determined that the HDMI® sink with which the HDMI® source 53 communicates supports a high resolution image, the deep-color-mode determination section 108 further refers to the bits Suport_30bit, Suport_36bit, and Suport_48bit (FIG. 17) of the VSDB, thereby recognizes the high resolution image supported by the HDMI® sink with which the HDMI® source 53 communicates and determines the image in the deep color mode, that is, the image to be transmitted through the three TMDS channels #0 to #2 among the high resolution images supported by the HDMI® sink.

That is, the deep-color-mode determination section 108 determines, for example, the image having the highest resolution among the images supported by, for example, the HDMI® sink, to be an image in the deep color mode (the image to be transmitted through the three TMDS channels #0 to #2).

Then, the deep-color-mode determination section 108 supplies the deep color mode to the sub-signal addition section 102, the number of sub-signal assignment bits determination section 106, and the sub-signal frame information transmission controller 107.

Next, a description will be given, with reference to FIG. 21, of sub-signal-related information inserted into a sub-signal by the sub-signal-related information insertion section 104 of FIG. 20.

In extended HDMI®, a sub-signal is assigned to the pixel data in the video data period of a video field (FIG. 4), that is, to the low-order bits of the transmission pixel data, and the sub-signal together with the main image assigned to the high-order bits of the transmission pixel data is transmitted. However, the sub-signal is not necessarily assigned to all the transmission pixel data.

That is, depending on the amount of data of the sub-signal, the sub-signal may be assigned to only the transmission pixel data in a portion of the video data period, and the sub-signal may not be assigned to the remaining transmission pixel data.

In the manner described above, when a sub-signal is assigned to the transmission pixel data in a portion of the video data period and the sub-signal is not assigned to the remaining transmission pixel data, it is necessary for the HDMI® sink that receive such transmission pixel data to distinguish between the transmission pixel data to which the sub-signal has been assigned and the transmission pixel data to which the sub-signal has not been assigned, and to extract, as the sub-signal, the low-order bits of only the transmission pixel data to which the sub-signal has been assigned.

Therefore, the sub-signal-related information insertion section 104 inserts sub-signal-related information containing at least information used to distinguish the transmission pixel data to which the sub-signal has been assigned into the sub-signal of the amount D of the sub-signal addition unit data, that is, the sub-signal assigned to the transmission pixel data in the video data period of one video field (FIG. 4).

Figure 21:
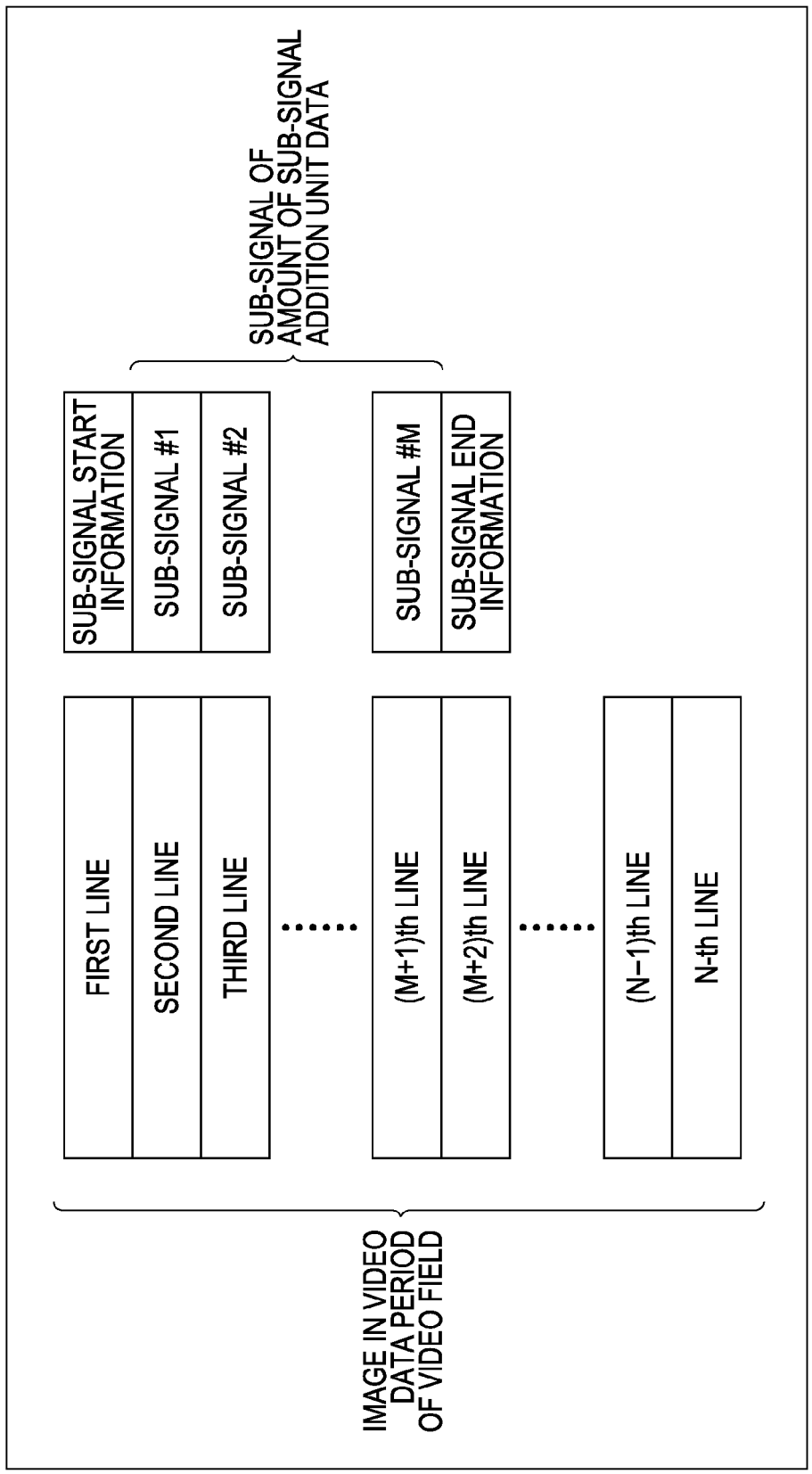
FIG. 21 illustrates sub-signal-related information contained in a sub-signal.

That is, the sub-signal-related information is composed of, for example, sub-signal start information and sub-signal end information, as shown in the right side of FIG. 21. The sub-signal start information is located at the beginning of the sub-signal of the amount D of the sub-signal addition unit data, and the sub-signal end information is located at the end of the sub-signal of the amount of the sub-signal addition unit data.

Then, the sub-signal start information is assigned to the transmission pixel data of the pixels constituting the first line (the first horizontal line from the top) in the video data period of the video field, shown at the left of FIG. 21, and the sub-signal of the amount of the sub-signal addition unit data is sequentially assigned to the transmission pixel data of the pixels constituting the second and subsequent lines.

If it is assumed that all the sub-signals of the amount D of the sub-signal addition unit data are assigned to the transmission pixel data of the pixels constituting the second to (M+1)th lines, the sub-signal end information is assigned to the transmission pixel data of the pixels constituting the (M+2)th line immediately after the (M+1)th line.

In the manner described above, in the sub-signal start information located at the beginning of the sub-signal of the amount D of the sub-signal addition unit data, for example, the fact that a sub-signal has been assigned to the transmission pixel data of the pixels of the second and subsequent lines, information indicating the type (attribute) of the sub-signal such that the sub-signal is image data, audio data, or text data, the format of the sub-signal, and other information related to the sub-signal, can be contained.

In the sub-signal end information located at the end of the sub-signal of the amount of the sub-signal addition unit data, a unique code indicating the end of the sub-signal can be contained. Furthermore, when the transmission pixel data to which the end of the sub-signal has been assigned is transmission pixel data of the pixel in the middle of the pixels constituting the (M+1)th line, information indicating the position of the pixel of the transmission pixel data can be contained in the sub-signal end information.

When one line in the video data period of the video field is composed of, for example, 1920 pixels, in the case that the sub-signal is assigned to, for example, the low-order 2 bits of the transmission pixel data, the amount of data that can be assigned to the transmission pixel data of the pixels constituting one line is 2 bits×..1920 pixels=3840 bits=480 bytes. Therefore, as the sub-signal start information and the sub-signal end information, 480-byte information can be used for each of them.

Furthermore, the sub-signal processor 103 of FIG. 20 determines the amount D of the sub-signal addition unit data in such a manner that the amount of data such that the amount of data of the sub-signal start information and the sub-signal end information contained in the sub-signal is added to the amount D of the sub-signal addition unit data does not exceed the maximum amount of data P..×..B3 of the sub-signal that can be transmitted in the video data period.

Next, a description will be given, with reference to the flowchart in FIG. 22, of the operation of the HDMI® source 53 when the HDMI® source 53 of FIG. 2 complies with extended HDMI® and the source signal processor 71 of the HDMI® source 53 is configured as shown in FIG. 20.

In the HDMI® source 53, the pixel data of the main image is supplied to the main image processor 101 of the source signal processor 71 (FIG. 20), and furthermore, a sub-signal is supplied to the sub-signal processor 103 as necessary.

The main image processor 101 performs necessary processing on the main image supplied thereto and supplies the pixel data of the processed main image to the sub-signal addition section 102.

Furthermore, the main image processor 101 detects the number P of pixels (the number of valid pixels) in the video data period of the video field (FIG. 4) of the main image supplied thereto, and supplies the number P of pixels to the sub-signal processor 103.

Furthermore, the main image processor 101 detects the number B1 of bits of each component of the pixel data of the main image, and supplies the number B1 of bits to the number of sub-signal assignment bits determination section 106.

Furthermore, the HDMI® source 53 waits for the E-EDID of the HDMI® sink 61 to be transmitted via the DDC illustrated in FIG. 2 from the HDMI® sink 61, and receives the E-EDID in step S101.

In the HDMI® source 53, the E-EDID from the HDMI® sink 61 is supplied to the sub-signal reception capability/incapability determination section 105 of the source signal processor 71 (FIG. 20) and the deep-color-mode determination section 108.

In step S102, the deep-color-mode determination section 108 recognizes which one of a 24-bit image, a 30-bit image, a 36-bit image, and a 48-bit image the image supported by the HDMI® sink 61 is by referring to the VSDB (FIG. 17) of the E-EDID from the HDMI® sink 61. Furthermore, the deep-color-mode determination section 108 determines the image to be transmitted through the three TMDS channels #0 to #2 from among the images supported by the DMI® sink 61, and supplies the deep color mode indicating the image to the sub-signal addition section 102, the number of sub-signal assignment bits determination section 106, and the sub-signal frame information transmission controller 107.

When the image supported by the HDMI® sink 61 is only a 24-bit image, that is, when the HDMI® sink 61 does not support a high resolution image, the HDMI® source 53 does not perform processing of step S104 and subsequent steps (to be described later) and performs processing in compliance with the current HDMI®. Therefore, in this case, the transmission of the sub-signal is not performed.

Thereafter, in step S103, the HDMI® source 53 adjusts the frequency of the pixel clock to a frequency corresponding to the deep color mode determined in step S102, and starts outputting a pixel clock. The process then proceeds to step S104.

In step S104, the sub-signal reception capability/incapability determination section 105 determines whether or not the HDMI® sink 61 can receive a sub-signal, that is, can handle a sub-signal, by referring to the bit Sub_Data_Support (FIG. 17) of the VSDB of the E-EDID from the HDMI® sink 61, which is supplied thereto.

When it is determined in step S104 that the HDMI® sink cannot handle a sub-signal, that is, when the bit Sub_Data- _Support (FIG. 17) of the VSDB has been set to 0 indicating that the sub-signal cannot be handled, the process proceeds to step S105. Hereafter, the HDMI® source 53 does not transmit a sub-signal and transmits the pixel data of the image indicated by the deep color mode determined in step S102 through the TMDS channels #0 to #2.

That is, in step S105, the sub-signal frame information transmission controller 107 allows the transmitter (FIG. 2) to transmit, in the control period (FIG. 4) of the vertical blanking period of the video field, a general control packet having no sub-signal, that is, a general control packet in which all the bits SD0, SD1, and SD2 in FIG. 18 are set to 0, and the bits CD0, CD1, and CD2 are set to values indicating the deep color mode supplied from the deep-color-mode determination section 108 in step S102. The process then proceeds to step S106.

In step S106, the sub-signal addition section 102 constructs the transmission pixel data of the number B2 of bits corresponding to the image of the deep color mode determined in step S102 on the basis of only the pixel data of the main image supplied from the main image processor 101, and supplies the transmission pixel data to the transmitter 72. As a result, the transmitter 72 transmits the transmission pixel data in the video data period of the video field, and the process then proceeds to step S107.

At this point, the transmission of the transmission pixel data is performed in synchronization with the pixel clock whose output has been started in step S103.

In step S107, the sub-signal addition section 102 determines whether or not the transmission pixel data that has not yet been transmitted exists in the active video period of the video field (hereinafter referred to as a "video field of interest" as appropriate) in which the transmission pixel data has been transmitted in the immediately previous step S106.

When it is determined in step S107 that the transmission pixel data that has not yet been transmitted exists in the active video period of the video field of interest, the process returns to step S106, where the transmission pixel data that has not yet been transmitted in the active video period of the video field of interest is transmitted.

When it is determined in step S107 that the transmission pixel data that has not yet been transmitted does not exist in the active video period of the video field of interest, that is, when the transmission of all the transmission pixel data in the active video period of the video field of interest is completed, the process proceeds to step S108, where the sub-signal addition section 102 determines whether or not a video field (frame) next to the video field of interest exists.

When it is determined in step S108 that the video field (frame) next to the video field of interest exists, the next video field is newly set as a video field of interest. The process then returns to step S105 and hereinafter, the same processing is repeated.

When it is determined in step S108 that the video field (frame) next to the video field of interest does not exist, the processing is completed.

On the other hand, when it is determined in step S104 that the HDMI® sink 61 can handle a sub-signal, that is, when the bit Sub_Data_Support (FIG. 17) of the VSDB is 1, which is a value indicating that a sub-signal can be handled, the sub-signal reception capability/incapability determination section 105 recognizes the number of bits that can be handled, which is the number of bits of the sub-signal that can be handled by the HDMI® sink 61, by referring to the bits Sub_2bit, Sub_4bit, and Sub_8bit (FIG. 17) of the VSDB, and supplies the number of bits to the number of sub-signal assignment bits determination section 106. The process then proceeds to step S109.

In step S109, on the basis of the number B1 of bits of the pixel data of the main image from the main image processor 101, the number of bits that can be handled from the sub-signal reception capability/incapability determination section 105, and the number B2 of bits of the transmission pixel data recognized from the deep color mode from the deep-color-mode determination section 108, the number of sub-signal assignment bits determination section 106 determines the number B3 of bits, which is the number of bits of the sub-signal assigned to the transmission pixel data in the manner described above, and supplies the number B3 of bits to the sub-signal addition section 102, the sub-signal processor 103, and the sub-signal frame information transmission controller 107. The process then proceeds to step S110.

At this point, when the number P of bits in the video data period of the main image is supplied to the sub-signal processor 103 from the main image processor 101, and the number B3 of bits of sub-signal assignment bits is supplied to the sub-signal processor 103 from the number of sub-signal assignment bits determination section 106, as described above, the sub-signal processor 103 determines the amount D of the sub-signal addition unit data, which is the amount of data of the sub-signal to be transmitted in the video data period of one video field, on the basis of the number P of bits in the video data period of the main image and the number B3 of sub-signal assignment bits.

Then, in step S110, the sub-signal processor 103 determines whether or not there is a sub-signal to be added to the pixel data in the video data period of the video field.

When it is determined in step S110 that there is a sub-signal to be added to the pixel data in the video data period of the video field, that is, when, for example, a sub-signal has been supplied to the sub-signal processor 103, the sub-signal processor 103 supplies the sub-signal for only the amount D of the sub-signal addition unit data within the sub-signal supplied thereto to the sub-signal-related information insertion section 104 and also supplies sub-signal information indicating that a sub-signal has been contained in the transmission pixel data to the sub-signal frame information transmission controller 107. The process then proceeds to step S111, where the HDMI® source 53 transmits the sub-signal and the pixel data of the main image indicated by the deep color mode determined in step S102 through the TMDS channels #0 to #2.

That is, in step S111, on the basis of the sub-signal information from the sub-signal processor 103, the sub-signal frame information transmission controller 107 allows the transmitter 72 (FIG. 2) to transmit, in the control period (FIG. 4) of the vertical blanking period of the video field, a general control packet having a sub-signal, that is, a general control packet in which the bits SD0, SD1, and SD2 in FIG. 18 are set to values corresponding to the number B3 of sub-signal assignment bits, which is the number of bits of the sub-signal assigned to the transmission pixel data, which is supplied from the number of sub-signal assignment bits determination section 106 in step S109, and the bits CD0, CD1, and CD2 are set to values indicating the deep color mode supplied from the deep-color-mode determination section 108 in step S102. The process then proceeds to step S112.

At this point, when it is determined in step S110 that there is a sub-signal to be added to the pixel data in the video data period of the video field, as described above, the sub-signal processor 103 supplies the sub-signal for the amount D of the sub-signal addition unit data within the sub-signal supplied thereto to the sub-signal-related information insertion section 104.

When the sub-signal for the amount D of the sub-signal addition unit data is supplied to the sub-signal-related information insertion section 104 from the sub-signal processor 103, the sub-signal-related information insertion section 104 inserts sub-signal-related information related to the sub-signal as illustrated in FIG. 21 and supplies it to the sub-signal addition section 102.

In step S112, the sub-signal addition section 102 starts the construction of the transmission image data, that is, the addition of the sub-signal from the sub-signal-related information insertion section 104 to the pixel data of the main image from the main image processor 101.

That is, the sub-signal addition section 102 divides the sub-signal from the sub-signal-related information insertion section 104 into division sub-signals at the intervals of the number B3 of sub-signal assignment bits supplied from the number of sub-signal assignment bits determination section 106 in step S109, and adds the division sub-signal as the low-order bits of the pixel data from the main image processor 101. As a result, the transmission pixel data of the number B2 of bits recognized from the deep color mode supplied from the deep-color-mode determination section 108 in step S102, that is, the transmission pixel data whose number of bits is B2, in which the pixel data of the main image whose number of bits is B1 has been assigned to the high-order bits and the division sub-signal whose number of bits is B3 has been assigned to the low-order bits, is constructed.

Then, the sub-signal addition section 102 proceeds from step S112 to step S113, where the sub-signal addition section 102 supplies the transmission pixel data in which the pixel data of the main image has been assigned to the high-order bits and the division sub-signal has been assigned to the low-order bits to the transmitter 72. As a result, the transmitter transmits the transmission pixel data in the video data period of the video field, and the process then proceeds to step S114.

At this point, the transmission of the transmission pixel data is performed in synchronization with the pixel clock whose output has been started in step S103.

In step S114, the sub-signal addition section 102 determines whether or not the transmission pixel data that has not yet been transmitted exists in the active video period of the video field of interest, which is a video field in which pixel data as transmission pixel data has been transmitted in the immediately previous step S113.

When it is determined in step S114 that the transmission pixel data that has not yet been transmitted exists in the active video period of the video field of interest, the process returns to step S113, where pixel data that has not yet been transmitted in the active video period video field of interest is transmitted as transmission pixel data.

Furthermore, when it is determined in step S114 that the transmission pixel data that has not yet been transmitted does not exist in the active video period of the video field of interest, that is, when the transmission of all the transmission pixel data in the active video period of the video field of interest is completed, the process proceeds to step S115, where the sub-signal addition section 102 determines whether or not there is a video field next to the video field of interest.

When it is determined in step S115 that there is a video field next to the video field of interest, the next video field is newly set as a video field of interest. The process then returns to step S110 and hereinafter, the same processing is repeated.

When it is determined in step S115 that there is no video field next to the video field of interest, the processing is completed.

On the other hand, when it is determined in step S110 that there is no sub-signal to be added to the pixel data in the video data period of the video field, that is, for example, when a sub-signal has not been supplied to the sub-signal processor 103, the sub-signal processor 103 supplies the sub-signal information indicating that a sub-signal is not contained in the transmission pixel data to the sub-signal frame information transmission controller 107. The process then proceeds to step S116, where, on the basis of the sub-signal information from the sub-signal processor 103, in the same manner as in step S105, the sub-signal frame information transmission controller 107 allows the transmitter 72 (FIG. 2) to transmit, in the control period (FIG. 4) of the vertical blanking period of the video field, a general control packet having no sub-signal, that is, a general control packet in which all the bits SD0, SD1, and SD2 in FIG. 18 are set to 0 and the bits CD0, CD1, and CD2 are set to values indicating the deep color mode supplied from the deep-color-mode determination section 108 in step S102.

Then, hereinafter, in steps S113 to S115, the HDMI® source 53 does not transmit a sub-signal and transmits the pixel data of the main image indicated by the deep color mode determined in step S102 through the TMDS channels #0 to #2.

That is, when a general control packet having no sub-signal has been transmitted in step S116, in step S113, the sub-signal addition section 102 constructs transmission pixel data for the number B2 of bits corresponding to the image of the deep color mode determined in step S102 on the basis of only the pixel data of the main image supplied from the main image processor 101, and supplies the transmission pixel data to the transmitter 72. As a result, the transmitter 72 transmits the transmission pixel data in the video data period of the video field, and the process then proceeds to step S114.

At this point, the transmission of the transmission pixel data is performed in synchronization with the pixel clock whose output has been started in step S103.

In step S114, the sub-signal addition section 102 determines whether or not transmission pixel data that has not yet been transmitted exists in the active video period of the video field of interest, which is a video field in which pixel data has been transmitted as transmission pixel data in the immediately previous step S113.

When it is determined in step S114 that transmission pixel data that has not yet been transmitted exists in the active video period of the video field of interest, the process returns to step S113, where the transmission pixel data that has not yet been transmitted in the active video period of the video field of interest is transmitted.

When it is determined in step S114 that transmission pixel data that has not yet been transmitted does not exist in the active video period of the video field of interest, that is, when the transmission of all the transmission pixel data in the active video period of the video field of interest has been completed, the process proceeds to step S115, where the sub-signal addition section 102 determines whether or not a video field next to the video field of interest exists.

When it is determined in step S115 that a video field next to the video field of interest exists, the next video field is newly set as a video field of interest. The process then returns to step S110 and hereinafter, the same processing is repeated.

When it is determined in step S115 that a video field next to the video field of interest does not exist, the processing is completed.

Figure 23:
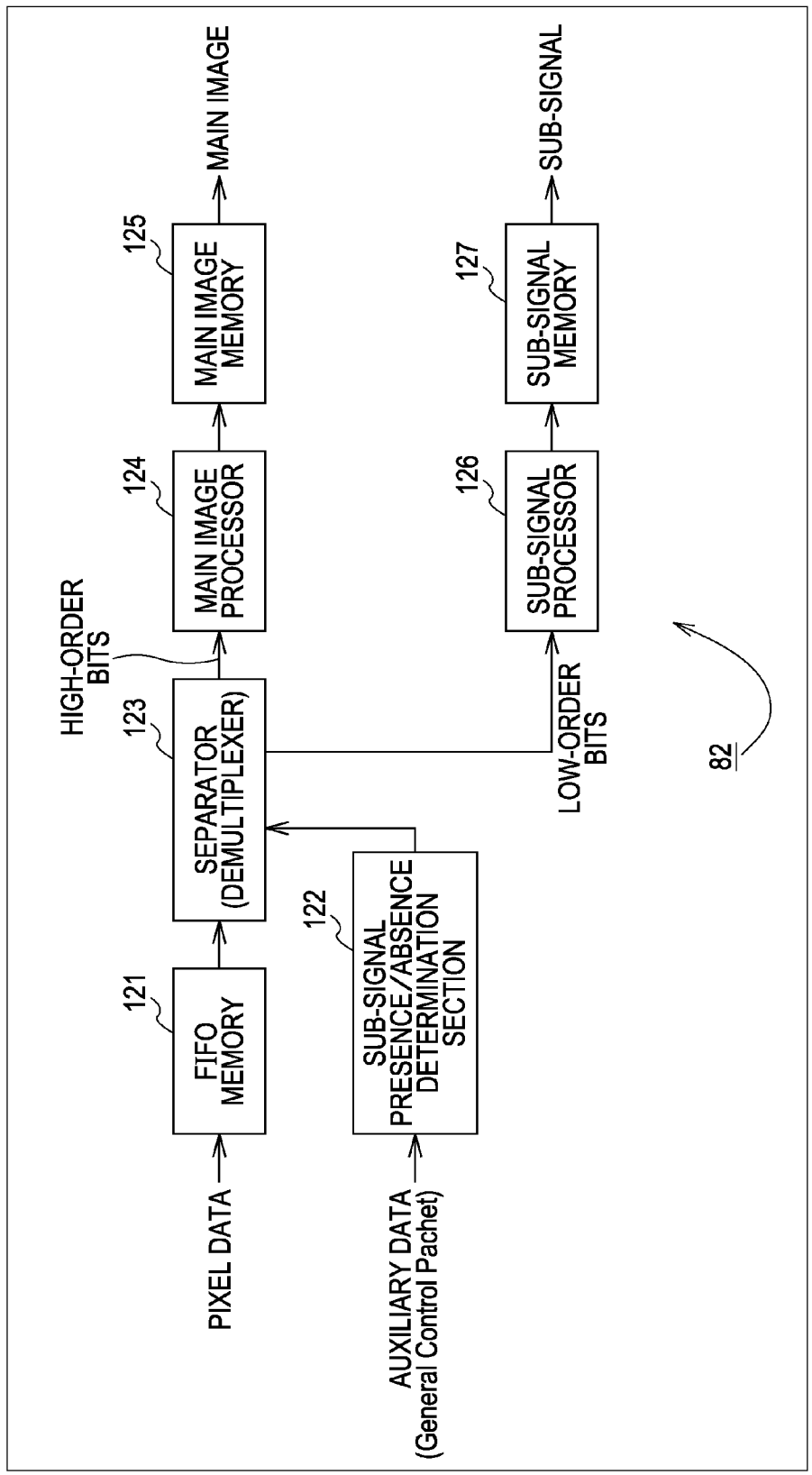
FIG. 23 is a block diagram showing an example of the configuration of a sink signal processor 82.

FIG. 23 shows an example of the configuration of a sink signal processor 82 possessed by the HDMI® sink 61 when the HDMI® sink 61 of FIG. 2 complies with extended HDMI.

In FIG. 23, the sink signal processor 82 includes an FIFO (First In First Out) memory 121, a sub-signal presence/absence determination section 122, a separator 123, a main image processor 124, a main image memory 125, a sub-signal processor 126, and a sub-signal memory 127.

Transmission pixel data in the video data period of the video field (FIG. 4), which is received by the receiver 81 (FIG. 2), is supplied to the FIFO memory 121.

The FIFO memory 121 sequentially stores the transmission pixel data from the receiver 81, and supplies it to the separator 123.

A general control packet in the control period of the vertical blanking period of the video field (FIG. 4), which was received by the receiver 81, is supplied to the sub-signal presence/absence determination section 122.

On the basis of the bits SD0, SD1, and SD2 of the general control packet (FIG. 18) from the receiver 81, the sub-signal presence/absence determination section 122 determines whether or not a sub-signal is contained in the transmission pixel data transmitted in the video data period immediately after the vertical blanking period in which the general control packet has been transmitted, and supplies the determination result to the separator 123.

Furthermore, when it is determined that a sub-signal is contained in the transmission pixel data, on the basis of the bits SD0, SD1, and SD2 of the general control packet (FIG. 18) from the receiver 81, the sub-signal presence/absence determination section 122 recognizes the number B3 of sub-signal assignment bits of the sub-signal contained in the transmission pixel data transmitted in the video data period immediately after the vertical blanking period in which the general control packet has been transmitted, and supplies the number B3 of sub-signal assignment bits of the sub-signal to the separator 123.

When the determination result indicating that a sub-signal is not contained in the transmission pixel data is supplied from the sub-signal presence/absence determination section 122, the separator 123 receives the transmission pixel data from the FIFO memory 121, and supplies the pixel data of the main image assigned to the transmission pixel data to the main image processor 124.

Furthermore, when the determination result indicating that a sub-signal is contained in the transmission pixel data is supplied from the sub-signal presence/absence determination section 122, the separator 123 receives the transmission pixel data from the FIFO memory 121, and separates the pixel data of the main image and the division sub-signal from the transmission pixel data on the basis of the number B3 of sub-signal assignment bits supplied from the sub-signal presence/absence determination section 122.

That is, the separator 123 extracts, as a division sub-signal, the low-order bits for only the number B3 of sub-signal assignment bits from the sub-signal presence/absence determination section 122 among the transmission pixel data from the FIFO memory 121, and supplies the division sub-signal to the sub-signal processor 126. Furthermore, the separator 123 extracts, as the pixel data of the main image, the remaining high-order bits among the transmission pixel data from the FIFO memory 121, and supplies it to the main image processor 124.

The main image processor 124 performs necessary processing on the pixel data of the main image supplied from the separator 123, reconstructs a main image for one video field, and supplies the main image to the main image memory 125.

The main image memory 125 temporarily stores the main image supplied from the main image processor 124. The main image stored in the main image memory 125 is read as appropriate and is supplied to the display controller 62 (FIG. 1).

The sub-signal processor 126 reconstructs the original sub-signal from the division sub-signal supplied from the separator 123 and supplies the sub-signal to the sub-signal memory 127. As illustrated in FIG. 21, the sub-signal-related information is contained in the sub-signal, and the sub-signal processor 126 reconstructs the sub-signal by referring to the sub-signal-related information as necessary.

The sub-signal memory 127 temporarily stores the sub-signal supplied from the sub-signal processor 126.

Figure 24:
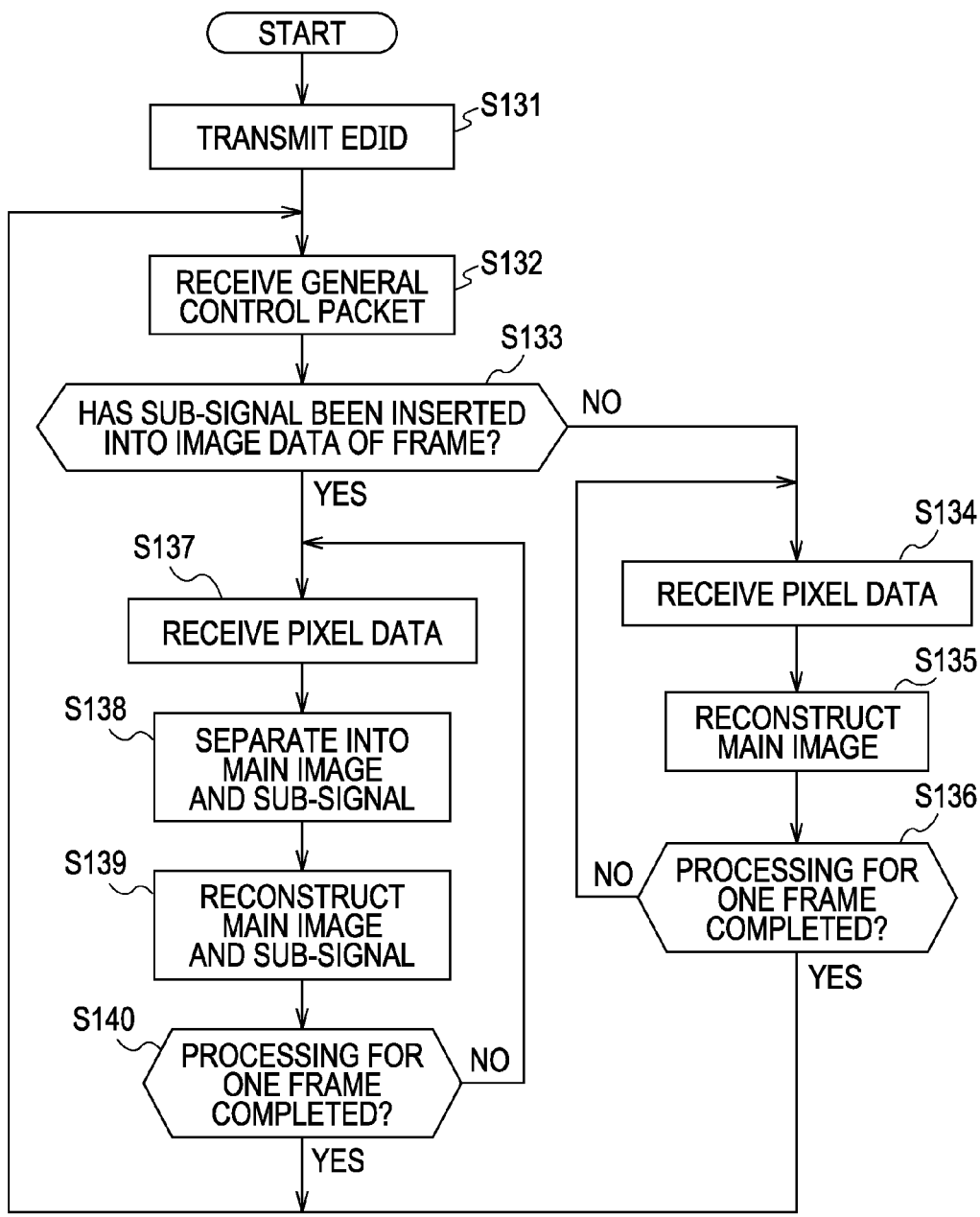
FIG. 24 is a flowchart illustrating the operation of the HDMI® sink 61 in compliance with extended HDMI®.

Next, a description will be given, with reference to the flowchart in FIG. 24, of the operation of the HDMI® sink 61 when the HDMI® sink 61 of FIG. 2 complies with extended HDMI® and the sink signal processor 82 of the HDMI® sink 61 is configured as shown in FIG. 23.

In step S131, the HDMI® sink 61 transmits its own E-EDID to the HDMI® sink 61 via the DDC (FIG. 2).

Figure 22:
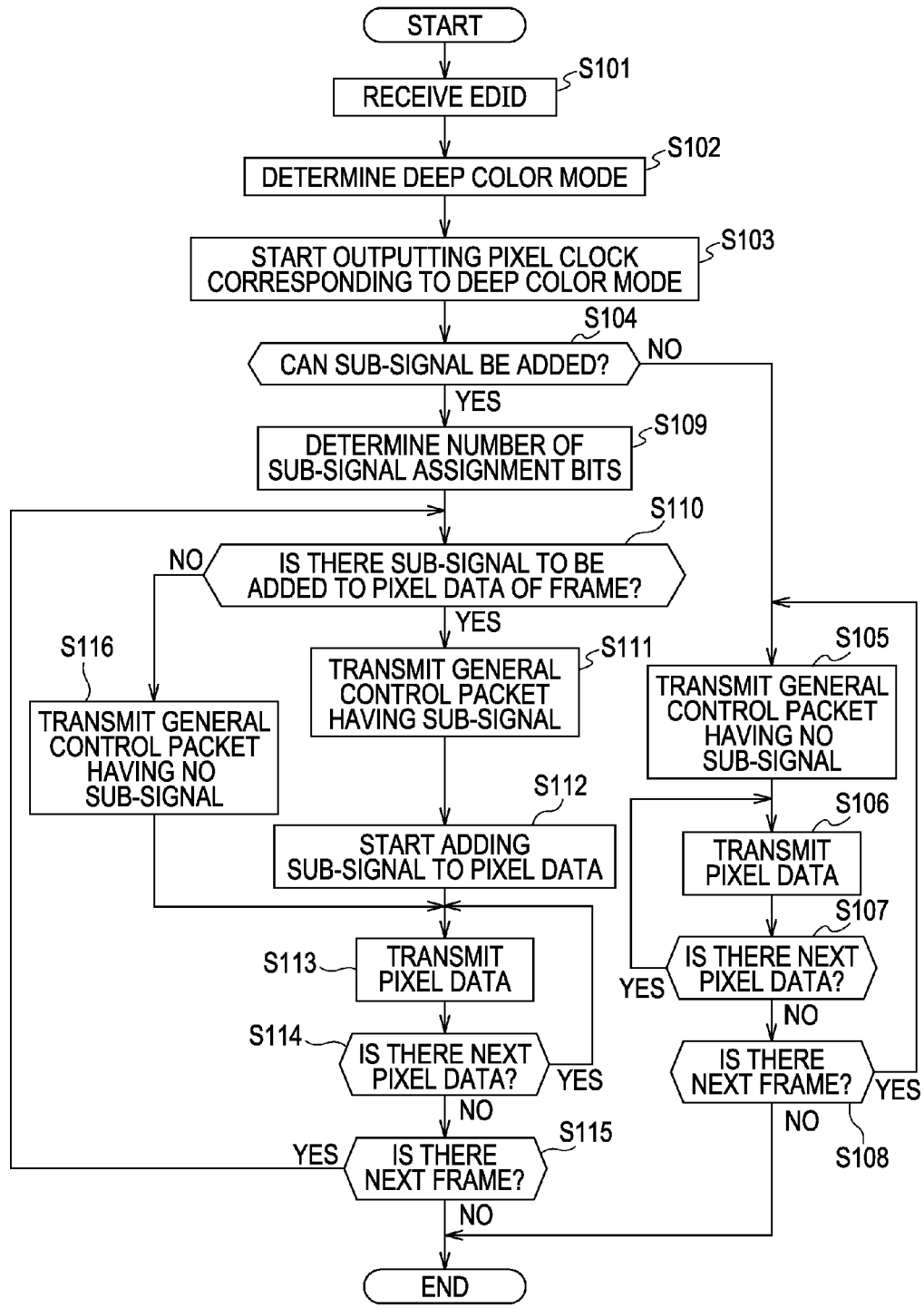
FIG. 22 is a flowchart illustrating the operation of the HDMI® source 53 in compliance with extended HDMI®.

Thereafter, as illustrated in FIG. 22, in the HDMI® sink 61, the output of the pixel clock is started, and the general control packet is transmitted via the TMDS channels #0 to #2. Then, in step S132, the receiver 81 (FIG. 2) of the HDMI® sink 61 receives the general control packet (FIG. 18) from the HDMI® sink 61, and supplies the general control packet to the sub-signal presence/absence determination section 122 (FIG. 23) of the sink signal processor 82. The process then proceeds to step S133.

In step S133, on the basis of the bits SD0, SD1, and SD2 of the general control packet (FIG. 18) from the receiver 81, the sub-signal presence/absence determination section 122 determines whether or not a sub-signal is contained in the transmission pixel data transmitted in the video data period immediately after the vertical blanking period in which the general control packet has been transmitted.

When it is determined in step S133 that a sub-signal is not contained in the transmission pixel data, the sub-signal presence/absence determination section 122 supplies the determination result indicating the fact to the separator 123. The process then proceeds to step S134.

In step S134, the receiver 81 (FIG. 2) of the HDMI® sink 61 waits for the transmission pixel data of the image of the deep color mode indicated by the bits CD0, CD1, and CD2 of the general control packet from the HDMI® source 53 to be transmitted from the HDMI® sink 61 via the TMDS channels #0 to #2 in synchronization with the pixel clock, receives the transmission pixel data, and supplies it to the separator 123 via the FIFO memory 121 of the sink signal processor 82. The process then proceeds to step S135.

In step S135, on the basis of the determination result indicating that a sub-signal is not contained in the transmission pixel data from the sub-signal presence/absence determination section 122, the separator 123 supplies the pixel data of the main image assigned to the transmission pixel data supplied via the FIFO memory 121 to the main image processor 124.

Furthermore, in step S135, in order to reconstruct a main image for one video field, the main image processor 124 supplies the pixel data of the main image from the separator 123 to the main image memory 125, whereby it is stored. The process then proceeds to step S136.

In step S136, the main image processor 124 determines whether or not the processing of the pixel data of the main image for one video field has been completed, that is, the main image for one video field has been stored in the main image memory 125.

When it is determined in step S136 that the processing of the pixel data of the main image for one video field has not been completed, the process returns to step S134 and hereinafter, the same processing is repeated.

Furthermore, when it is determined in step S136 that the processing of the pixel data of the main image for one video field has been completed, waiting for a general control packet to be transmitted in the next video field is performed. The process then returns to step S132 and hereinafter, the same processing is repeated.

On the other hand, when it is determined in step S133 that a sub-signal is contained in the transmission pixel data, on the basis of the bits SD0, SD1, and SD2 of the general control packet (FIG. 18) from the receiver 81, the sub-signal presence/absence determination section 122 recognizes the number B3 of sub-signal assignment bits of the sub-signal contained in the transmission pixel data, and supplies it together with the determination result indicating that a sub-signal has been contained in the transmission pixel data to the separator 123. The process then proceeds to step S137.

In step S137, the receiver 81 (FIG. 2) of the HDMI® sink 61 waits for the transmission pixel data of the deep color mode indicated by the bits CD0, CD1, and CD2 of the general control packet from the HDMI® source 53 to be transmitted from the HDMI® sink 61 via the TMDS channels #0 to #2 in synchronization with the pixel clock, receives the transmission pixel data, and supplies it to the separator 123 via the FIFO memory 121 of the sink signal processor 82. The process then proceeds to step S138.

In step S138, on the basis of the determination result indicating that a sub-signal is contained in the transmission pixel data from the sub-signal presence/absence determination section 122, the separator 123 separates, from the transmission pixel data supplied via the FIFO memory 121, the low-order bits for the number B3 of sub-signal assignment bits from the sub-signal presence/absence determination section 122, and supplies the low-order bits as a division sub-signal to the sub-signal processor 126.

Furthermore, in step S138, the separator 123 separates the remaining high-order bits from the transmission pixel data supplied via the FIFO memory 121, and supplies the remaining high-order bits as the pixel data of the main image to the main image processor 124. The process then proceeds to step S139.

In step S139, in order to reconstruct a main image for one video field, the main image processor 124 supplies the pixel data of the main image from the separator 123 to the main image memory 125, whereby it is stored. Furthermore, in step S139, in order to reconstruct a sub-signal, the sub-signal processor 126 supplies the division sub-signal from the separator 123 to the sub-signal memory 127, whereby it is stored.

In step S140, the main image processor 124 determines whether or not the processing of the pixel data of the main image for one video field has been completed, that is, a main image for one video field has been stored in the main image memory 125.

When it is determined in step S140 that the processing of the pixel data of the main image for one video field has not been completed, the process returns to step S137 and hereinafter, the same processing is repeated.

Furthermore, when it is determined in step S140 that the processing of the pixel data of the main image for one video field has been completed, waiting for a general control packet to be transmitted in the next video field is performed. The process then returns to step S132 and hereinafter, the same processing is repeated.

In the manner described above, in the HDMI® source 53 that receives E-EDID as capability information indicating the capability of the HDMI® sink 61 (FIG. 2) and thereafter transmits the pixel data of an uncompressed image for one screen in one direction to the HDMI® sink 61 by using a differential signal through the three TMDS channels #0 to #2 for transmitting a fixed number of bits of data per clock of a pixel clock in the video data period assigned to the active video period (the valid image period) in which the horizontal blanking period and the vertical blanking period are excluded from the video field (the period from one vertical synchronization signal to the next vertical synchronization signal), the transmitter 72 transmits the transmission pixel data to which a number of bits greater than 8 bits, which is a fixed number of bits, has been assigned, in one direction to the HDMI® sink 61 by using a differential signal through the three TMDS channels #0 to #2 by adjusting the frequency of the pixel clock.

In this case, the HDMI® source 53 determines whether or not the HDMI® sink 61 can receive a sub-signal on the basis of the VSDB (FIG. 17) of the E-EDID. When the HDMI® sink 61 can receive the sub-signal, the transmission pixel data is constructed by adding the sub-signal to the pixel data of the main image composed of pixel data having a number of bits less than that of the transmission pixel data transmitted by the transmitter 72, and is transmitted through the three TMDS channels #0 to #2 by the transmitter 72.

Furthermore, in the HDMI® source 53, a general control packet (FIG. 18) containing the bits SD0, SD1, and SD2 serving as sub-signal information indicating whether or not a sub-signal is contained in the transmission pixel data transmitted in the video data period immediately after the vertical blanking period is transmitted in the control period (FIG. 4) of the vertical blanking period.

On the other hand, in the HDMI® sink 61 that transmits E-EDID and thereafter receives pixel data transmitted using a differential signal through the three TMDS channels #0 to #2 from the HDMI® source 53, the receiver 81 receives the transmission pixel data transmitted using a differential signal through the three TMDS channels #0 to #2.

Furthermore, in the HDMI® sink 61, on the basis of the bits SD0, SD1, and SD2 contained in the general control packet (FIG. 18) transmitted in the control period (FIG. 4) of the vertical blanking period, it is determined whether or not a sub-signal has been contained in the transmission pixel data transmitted in the video data period immediately after the vertical blanking period. When a sub-signal is contained in the transmission pixel data, the sub-signal is separated from the transmission pixel data.

Therefore, when the number of bits of the pixel data of the main image is smaller than the number of bits of the transmission pixel data determined by the deep color mode, efficient data transmission such that the sub-signal is assigned to the bits of the transmission pixel data, which are not assigned to the pixel data of the main image, and the sub-signal is transmitted together with the main image can be performed.

The greater the difference between the number of bits of the transmission pixel data and the number of bits of the pixel data of the main image, a sub-signal (division sub-signal) having a larger amount of data can be assigned to the transmission pixel data.

In this embodiment, no particular mention has been made in the uses of the sub-signal, but the sub-signal can be used for various kinds of uses.

More specifically, as the sub-signal, for example, an image having a low resolution synchronized with a main image, an image of a program differing from a main image, and other images can be used. In this case, it is possible for the display 42 (FIG. 1) to display an image as a sub-signal on a sub-screen for PinP (Picture in Picture) or to split-display an image.

Furthermore, as the sub-signal, for example, a control signal for controlling the display of the main image can be used. In this case, it is possible for the display 42 to control the display of the main image in response to a control signal as a sub-signal.

When an image (moving image) is used as a sub-signal, in the case that audio is accompanied with the image, the audio can be assigned to transmission pixel data and transmitted, and can also be transmitted in the data island period (FIG. 4) similarly to the audio accompanied with the main image. That is, in HDMI®, in the data island period (FIG. 4), the audio data of a plurality of audio channels can be transmitted, and the audio accompanied with the image as the sub-signal can be transmitted using an audio channel that is not used for the transmission of the audio data accompanied with the main image.

Next, the series of processes of the source signal controller 71 and the sink signal processor 82 can be performed by dedicated hardware and can also be performed by software. When the series of processes is to be performed by software, a program forming the software is installed into, for example, a computer, such as a microcomputer, for controlling the HDMI® source 53 and the HDMI® sink 61.

Figure 25:
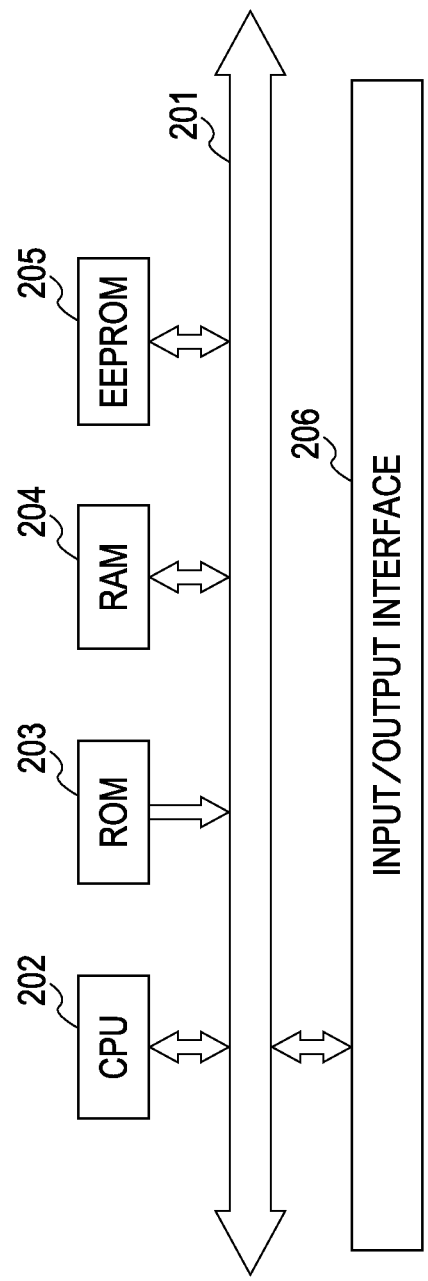
FIG. 25 is a block diagram showing an example of the configuration of an embodiment of a computer to which the present invention is applied.

FIG. 25 shows an example of the configuration of an embodiment of a computer to which programs for executing the above-described series of processes are installed.

Programs can be recorded in advance in an EEPROM (Electrically Erasable Programmable Read-only Memory) 205 and a ROM 203 serving as recording media incorporated in the computer.

Alternatively, programs can be temporarily or permanently stored (recorded) on a removable recording medium, such as a flexible disk, a CD-ROM (Compact Disc Read Only Memory), an MO (Magneto optical) disc, a DVD (Digital Versatile Disc), a magnetic disk, or a semiconductor memory. Such a removable recording medium can be provided in the form of packaged software.

In addition to being installed into the computer from the removable recording medium such as that described above, programs may be transferred in a wireless manner from a download site or may be transferred by wire to the computer via a network, such as a LAN (Local Area Network) or the Internet. It is possible for the computer to receive the programs that are transferred in such a manner via an input/output interface 206 and to install the programs into the EEPROM 205 incorporated therein.

The computer has a CPU (Central Processing Unit) 202 incorporated therein. The input/output interface 206 is connected to the CPU 202 via a bus 201, and the CPU 202 loads a program stored in the ROM (Read Only Memory) 203 or the EEPROM 205 into a RAM (Random Access Memory) 204 and executes the program. As a result, the CPU 202 performs processing in accordance with the above-described flowcharts or performs processing performed according to the constructions in the above-described block diagrams.

In this specification, the processing steps describing the program by which the computer performs various processes do not have to be executed chronologically according to the written orders in flowcharts, and the processing steps include processes which are executed in parallel or individually (for example, parallel processes or object-oriented processes).

The programs may be processed by one computer, and may also be processed in a distributed manner by a plurality of computers.

The embodiments of the present invention are not limited to the above-described embodiments, and various modifications are possible within the spirit and scope of the present invention.

That is, for example, all of the number B1 of bits of the pixel data of the main image, the number B2 of bits of the transmission pixel data, and the number B3 of sub-signal assignment bits are not limited to the above-described values. Furthermore, for example, areas for assigning the bits Suport_30bit, Suport_36bit, and Suport_48bit, the bits Sub_2bit, Sub_4bit, Sub_8bit, and Sub_Data_Support, the bits SD0, SD1, and SD2 serving as sub-signal information, and the like are not limited to the above-described areas. In the current HDMI®, they can be assigned to any areas that are unused (Reserved).

The present invention can be applied to, in addition to HDMI®, a communication interface including a transmission apparatus for, after capability information indicating the capability of a receiving apparatus is received, transmitting the pixel data of an uncompressed image for one screen in one direction to the receiving apparatus by using a differential signal through a plurality of channels for transmitting data of a fixed number of bits per clock of a pixel clock, in a valid image period that is a period in which a horizontal blanking period and a vertical blanking period are excluded from the period from one vertical synchronization signal to the next vertical synchronization signal, and a receiving apparatus for receiving pixel data transmitted using a differential signal from the transmission apparatus through a plurality of channels after the capability information is transmitted.

Next, a description will be given of a sending method, a transmission system, a transmission method, a transmission apparatus, a receiving method, and a receiving apparatus to which the present invention is applied.

The present invention relates to a sending method and a transmission system that are suitable for use with a digital video/audio input/output interface standard called the HDMI (High-Definition Multimedia Interface) standard, and to a transmission method, a transmission apparatus, a receiving method, and a receiving apparatus for use with the transmission system.

In recent years, as an interface standard for transmitting uncompressed digital video data and the like among a plurality of video devices, an interface standard called the HDMI standard has been developed. The HDMI standard is a standard for transmitting video data individually in units of one pixel as the primary-color data of each color (hereinafter referred to as a "pixel"). Audio data is also transmitted using a transmission line of the video data in the blanking period of the video data. For the primary-color data to be transmitted, primary-color data (R data, G data, B data) of 3 channels of additive color mixing of red, green, and blue is transmitted, or luminance and color-difference signals of Y, Cb, and Cr are transmitted.

Data of one pixel of each color is basically composed of 8 bits. With regard to synchronization signals such as a horizontal synchronization signal and a vertical synchronization signal, they are transmitted at a timing at which each synchronization signal is located. Furthermore, a transmission line for a pixel clock for video data and a transmission line for control data are also provided.

Figure 33:
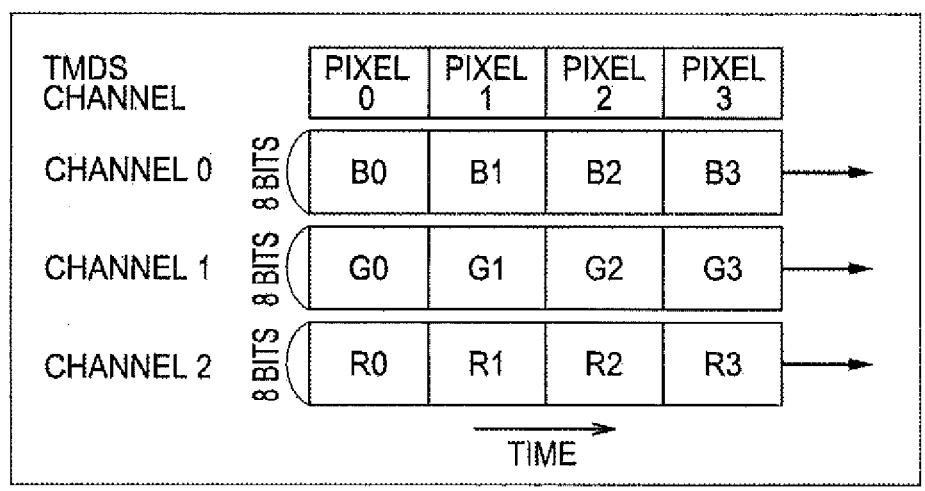
FIG. 33 is an illustration showing an example of data packing (example of 8 bits per pixel) of the HDMI standard.

FIG. 33 shows an overview of an example when primary-color data (R data, G data, B data) is transmitted using the interface of the HDMI standard. Regarding the video data, B data, G data, and R data are individually transmitted through three channels, that is, channel 0, channel 1, and channel 2. In the example of FIG. 33, a period in which data of 4 pixels of pixels 0, 1, 2, and 3 is transmitted is shown, and the data of 1 pixel of each channel is composed of 8 bits.

That is, for the B data (blue data), 8-bit data B0 is transmitted in the period of pixel 0 by using channel 0. Hereafter, 8-bit data B1, 8-bit data B2, and 8-bit data B3 are sequentially transmitted in synchronization with the pixel clock (not shown). For the G data (green data), 8-bit data G0 is transmitted in the period of pixel 0 by using channel 1. Hereafter, 8-bit data G1, 8-bit data G2, and 8-bit data G3 are sequentially transmitted in synchronization with the pixel clock. For the R data (red data), 8-bit data R0 is transmitted in the period of pixel 0 by using channel 2. Hereafter, 8-bit data R1, 8-bit data R2, and 8-bit data R3 are sequentially transmitted in synchronization with the pixel clock.

Although not shown in FIG. 33, control data and the pixel clock are transmitted using another channel. The control data is structured in such a manner that it can be transmitted from a transmission-side apparatus (source-side apparatus) for video data to the receiving-side apparatus (sink-side apparatus) and also can be transmitted from the receiving-side apparatus (sink-side apparatus) to the transmission-side apparatus (source-side apparatus). In the source-side apparatus, data is encrypted in units of 8 bits, and in the sink-side apparatus, the encrypted data is decrypted in units of 8 bits.

In the manner described above, the interface of the HDMI standard is standardized on the assumption that one pixel is sent in units of 8 bits per color. On the other hand, in recent years, it has been studied to increase the resolution of color, and it has been proposed that the number of bits per color of one pixel be made more than 8. For example, it has been proposed that the number of bits per color of one pixel be made 10 or 12.

Figure 34:
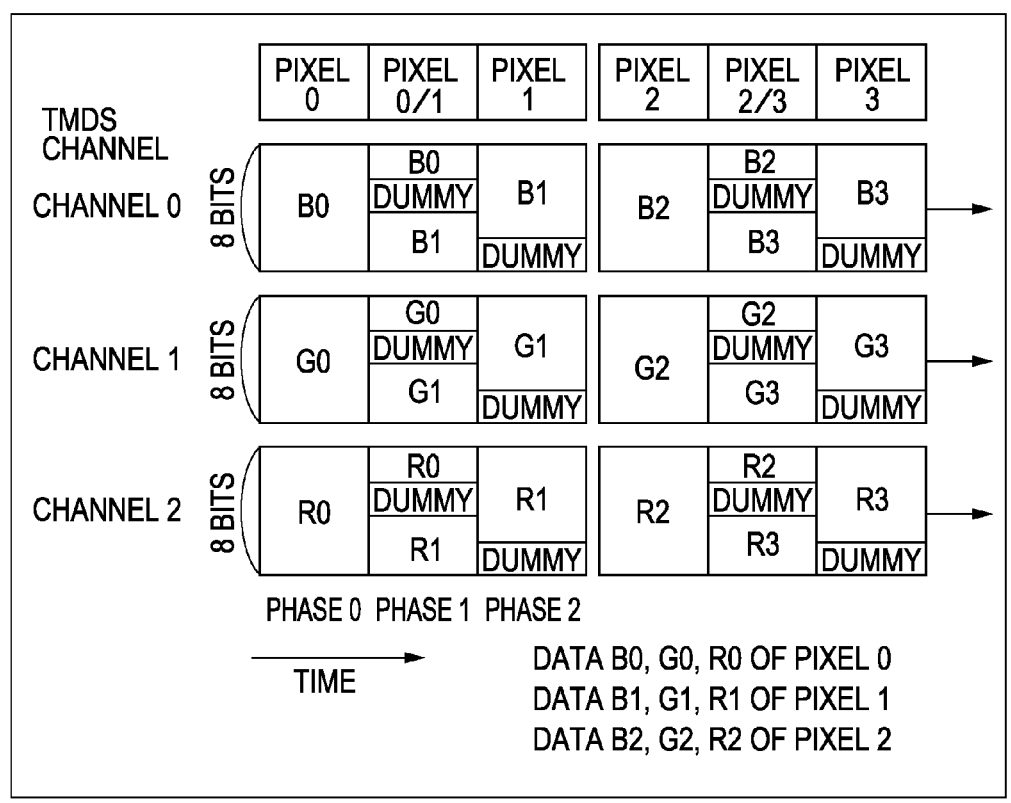
FIG. 34 is an illustration showing an example of data packing (example of 10 bits per pixel) of the HDMI standard.

FIG. 34 shows an example of a transmission state in which 10-bit data is assumed to be transmitted for each color of one pixel in the interface of the HDMI standard. As has already been described, the HDMI standard is a standard assumed such that data is transmitted using 8 bits as one unit, 8 bits are transmitted in one pixel clock, and in order to transmit 10-bit data, 2 pixel clocks are necessary. In the example of FIG. 34, data is arranged in such a manner that data of two pixels is transmitted in three pixel clocks. Phases 0, 1, and 2, shown in FIG. 34, each indicate one cycle of one pixel clock.

The data structure of FIG. 34 will be described. For example, regarding B data, 8 bits among the 10 bits of the pixel 0 are sent in the period of phase 0 of the channel 0. In the period of phase 1, the remaining 2 bits of the pixel 0 are sent, and in the period of the subsequent two bits, dummy data, which is invalid data, is sent. Then, in the period of the 4 bits of the second half of the phase 1, 4 bits among the 10 bits of the next pixel 1 are sent. In the next period of phase 2, the remaining 6 bits of the pixel 1 are sent, and in the period of the subsequent two bits, dummy data, which is invalid data, is sent. Hereinafter, this arrangement is repeated. For the G data of channel 1 and the R data of channel 2, pixel data and dummy data are sent in the same data arrangement. The period in which the dummy data is arranged is an example, and the dummy data may be arranged in another period. In the case of the data arrangement shown in FIG. 34, since a period of 1.5 pixel clocks is required, the pixel clock needs to have a higher frequency in a corresponding manner.

As a result of forming the data structure shown in FIG. 34, it is possible to send pixel data having a large number of bits comparatively efficiently by using the interface of the HDMI standard that is assumed such that data is transmitted using 8 bits as one unit.

In PCT publication WO2002/078336, the details on the HDMI standard have been described.

There has been a demand for making more advanced data transmission possible by using this type of interface, such as the HDMI standard. That is, the HDMI standard stipulates that video data and audio data associated with the video data are transmitted between a video device on the source side and a video device on the sink side. In addition to a transmission line for transmitting video data and audio data, a transmission line for transmitting control data is also provided, and the control data can be transmitted using the line for control data. However, there has been a demand for allowing still another piece of data to be transmitted simultaneously.

The present invention has been made in view of such points. An object of the present invention is to be capable of efficiently performing data transmission by using a standard in which the number of bits that can be transmitted is determined in a fixed manner, such as the HDMI standard.

The present invention has been configured as described below. When video data is to be transmitted using a transmission scheme for transmitting video data in units of 8 bits in synchronization with a pixel clock from a source-side apparatus to a sink-side apparatus by using individual transmission lines for each piece of color data or for each of luminance and color-difference signals, video data of one pixel to be transmitted from the source-side apparatus to the sink-side apparatus is made to be of a predetermined number of bits, which is not an integral multiple of 8 bits. The video data of a predetermined number of bits, which is not an integral multiple of 8 bits, is transmitted at a timing synchronized with a pixel clock. Data differing from the video data of a predetermined number of bits is arranged in a marginal transmission period that occurs in an amount corresponding to the number of bits of the difference between the number of bits transmitted in the period of the pixel clock assigned to the transmission of one pixel and the predetermined number of bits, and is transmitted from the source-side apparatus to the sink-side apparatus.

As a result of the above, it is possible to transmit various kinds of data differing from main video data by using a marginal transmission period that occurs in an amount corresponding to the number of bits of the difference between the number of bits transmitted in the period of the pixel clock assigned to the transmission of one pixel and the predetermined number of bits.

According to the present invention, it is possible to transmit various kinds of data differing from main video data by using a marginal transmission period that occurs in an amount corresponding to the number of bits of the difference between the number of bits transmitted in the period of the pixel clock assigned to the transmission of one pixel and the predetermined number of bits. Both the transmission of pixel data having a number of bits larger than 8 bits and the transmission of various kinds of data differing from main video data can be performed, and thus transmission efficiency is improved. Furthermore, the transmission mode is a transmission mode in which the transmission unit of 8 bits, which is defined by the transmission standard, is maintained, and encryption and decryption can be performed in a state defined by the standard.

An embodiment of the present invention will be described below with reference to FIGS. 26 to 32.

Figure 26:
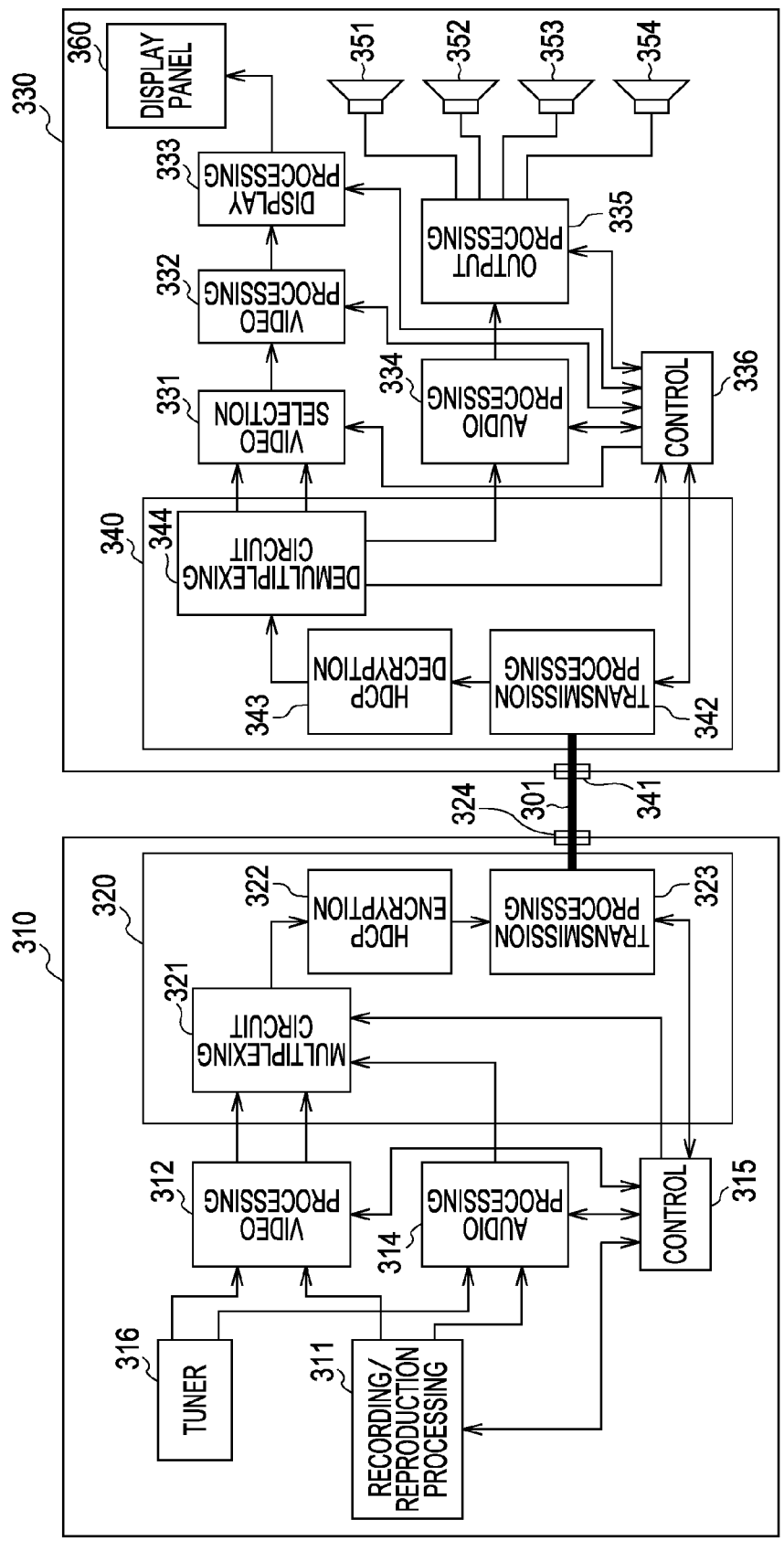
FIG. 26 is a block diagram showing an example of a system configuration according to an embodiment of the present invention.

In this example, the present invention is applied to a transmission system for transmitting video data and the like from a source-side apparatus to a sink-side apparatus by using the HDMI standard. FIG. 26 shows a system configuration of this example, in which a video recording/reproduction apparatus 310 that is a source-side apparatus and a television receiver 330 that is a sink-side apparatus are connected to each other via an HDMI cable 301, so that video data and audio data are transmitted from the video recording/reproduction apparatus 310 to the television receiver 330. In the following description, regarding the HDMI standard, necessary configuration and the like are described in sequence. Basically, the existing HDMI standard is used as it is, and the configuration of the HDMI cable 301 and the like are the same as those of the related art.

The video recording/reproduction apparatus 310 will be described first. The video recording/reproduction apparatus 310 includes a recording/reproduction section 311 and can record and reproduce video data and audio data. As the recording/reproduction section 311, for example, a hard disk drive (HDD) apparatus can be used. Video data obtained by reproduction by the recording/reproduction section 311 is supplied to a video processor 312, and audio data obtained by reproduction is supplied to an audio processor 314. The video recording/reproduction apparatus 310 further includes a tuner 316, and video data and audio data obtained by reception by the tuner 316 are supplied to the video processor 312 and the audio processor 314.

The video processor 312 performs processing for setting video data obtained by reproduction or reception to be video data for transmission. At this point, the video processor 312 of this example is configured so as to be capable of simultaneously processing video data of two systems, so that video data for a main image and video data for a sub-image can be generated. Regarding the video data for a main image, for example, one pixel is set as 10-bit data for each color, and regarding the video data for a sub-image, for example, one pixel is set as 2-bit data for each color.

The audio processor 314 performs processing for setting audio data obtained by reproduction or reception to be audio data for transmission. At this point, the audio processor 314 of this example can perform processing for setting the supplied audio data to be audio data of a general data structure for 2-channel audio reproduction and also to be audio data for which multi-channel reproduction, such as 5.1 channel, is performed. Audio data for 2-channel reproduction and audio data for multi-channel reproduction can be output simultaneously. The audio data for multi-channel reproduction may be bit-compressed audio data.

The video data and the audio data output by the video processor 312 and the audio processor 314 are output to an HDMI transmission processor 320. The HDMI transmission processor 320 is a circuit part for performing transmission processing of the interface of the HDMI standard and is, for example, formed as an integrated circuit. The video data and the audio data supplied to the HDMI transmission processor 320 are multiplexed by a multiplexing circuit 321. During the multiplexing, for the video data of the main image, data of 1 pixel is arranged using the period of 1.5 pixel clocks. However, since the transmission of 8 bits is possible for each channel in the period of 1 pixel clock, the transmission of 12 bits is possible in the period of 1.5 pixel clocks. In the case of this example, by using a period for 2 bits, which is a marginal period that occurs every 1.5 pixel clocks, other data is arranged by the multiplexing circuit 321.

As the other data, for example, sub-image data generated by the video processor 312 is arranged. As has already been described, the sub-image data is uncompressed video data such that 1 pixel is 2 bits per color, and is arranged at the interval of 1 pixel in the marginal period that occurs for 2 bits per pixel. However, horizontal synchronization data and vertical synchronization data in a blanking period are transmitted with regard to only the main image, and with regard to the sub-image data, vertical synchronization data and horizontal synchronization data exclusively used for the sub-image data are not transmitted. A specific example of the transmission of data will be described later. As the above-described other data, audio data for multi-channel reproduction may be arranged separately every two bits at the intervals of 1.5 pixel clocks. Alternatively, control data having a comparatively large amount of transmission data generated by the controller 315 of the video recording/reproduction apparatus 310 or auxiliary information may be arranged separately every two bits at the intervals of 1.5 pixel clocks.

2-channel audio data is multiplexed in such a manner as to be transmitted using a blanking period of a channel in which the video data therefor is transmitted. The processing in which the 2-channel audio data is arranged in the blanking period and is transmitted is a common transmission process formulated by the HDMI standard.

Then, the data for transmission, which was multiplexed by the multiplexing circuit 321, is encrypted by an HDCP encryptor 322. The HDCP encryptor 322 is designed so as to encrypt a channel in which at least video data is transmitted in accordance with the HDCP (High-bandwidth Digital Content Protection System) standard. Encryption herein is performed by using 8-bit data of 1 channel as a unit.

The data encrypted by the HDCP encryptor 322 is supplied to the transmission processor 323. Pixel data of each color is arranged in individual channels. In a pixel clock channel and a control data channel, a corresponding clock and corresponding data are arranged respectively, and these are sent to the HDMI cable 301 connected to an HDMI terminal 324.

The HDMI cable 301 is connected to an HDMI terminal 341 of a television receiver 330. The data transmitted via the HDMI cable 301 connected to the HDMI terminal 341 is detected (received) in synchronization with the pixel clock by a transmission processor 342 within the HDMI transmission processor 340. The detected data of each channel is decrypted from the encryption at the time of transmission by an HDCP decryptor 343. Decryption herein is also performed in units of 8 bits per channel.

The decrypted data is supplied to a demultiplexing circuit 344, whereby the data multiplexed for each channel is separated. For the separation process herein, audio data (audio data of 2 channels) arranged in the blanking period of the channel in which a video is transmitted is separated from the video data (main video data). Furthermore, the data arranged in the marginal period for two bits, which occurs every 1.5 pixel clocks, is also separated from the video data.

When the data arranged in the marginal period is sub-video data, the sub-video data is extracted. When the data arranged in the marginal period is multi-channel audio data, the multi-channel audio data is extracted. When the data arranged in the marginal period is control data or auxiliary information, the control data or auxiliary information is extracted.

The main video data and the sub-video data separated by the demultiplexing circuit 344 is supplied to a video selector/combiner 331. The video selector/combiner 331 selects one of the video images on the basis of an instruction from a controller 336 of the television receiver 330 and supplies the selected video data to the video processor 332. The video processor 332 performs necessary processing on the supplied video data and supplies it to a display processor 333. The display processor 333 performs processing for driving a display panel 360.

The audio data separated by the demultiplexing circuit 344 is supplied to an audio processor 334, whereby audio processing, such as analog conversion, is performed thereon. The processed output is supplied to an output processor 335, whereby processing such as amplification is performed thereon so as to drive a speaker so that audio is output from a plurality of speakers 351 to 354 connected to an output processor 335. When the audio data supplied to the audio processor 334 is 2-channel audio data, processing for 2 channels is performed, and when the audio data is multi-channel audio data, processing for multi-channel audio reproduction is performed.

The control data separated by the demultiplexing circuit 344 is supplied to the controller 336. The control data can also be sent from the controller 336 of the television receiver 330 to the controller 315 on the video recording/reproduction apparatus 310 side by using a control data channel.

Figure 27:
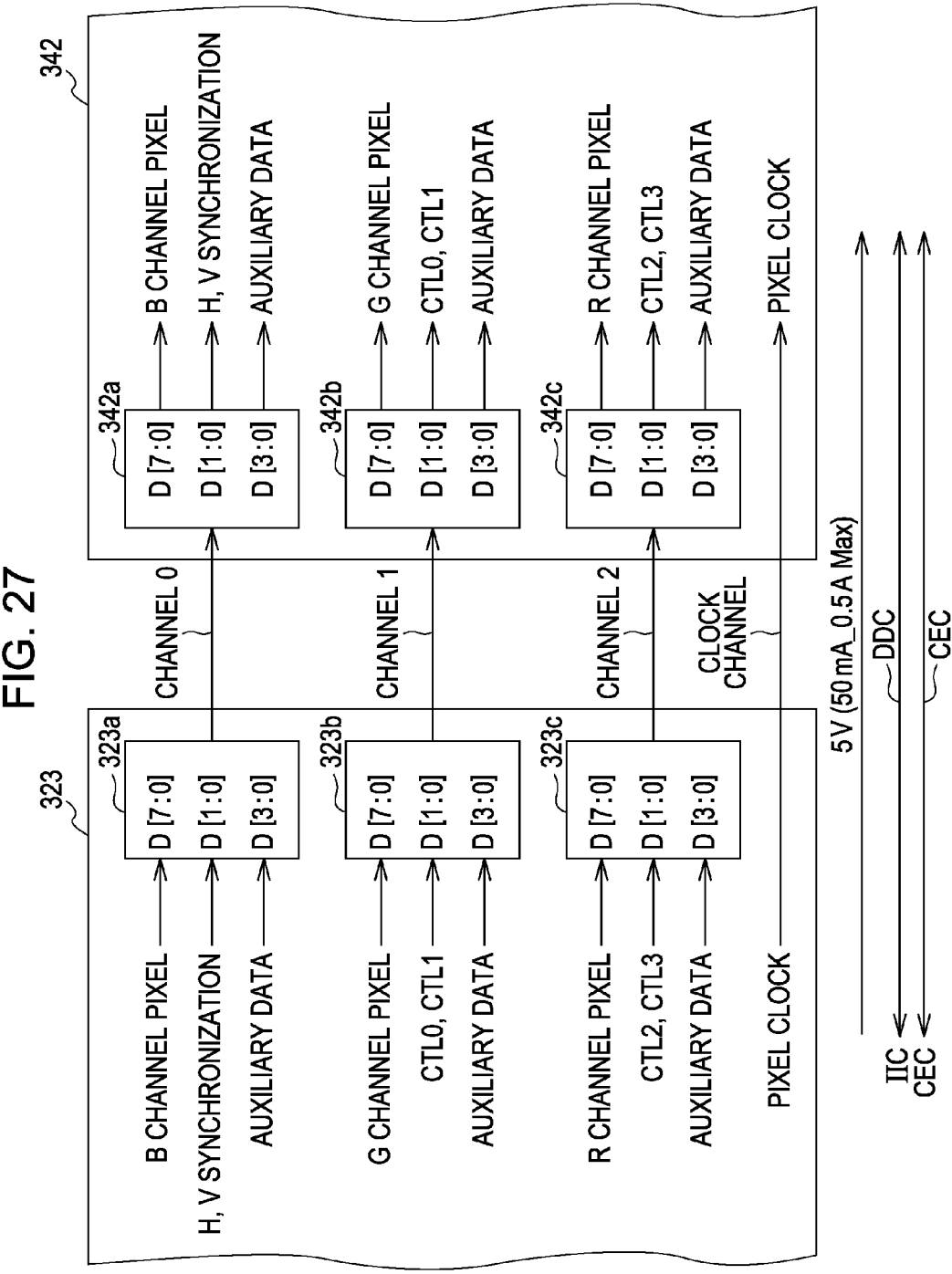
FIG. 27 is an illustration showing an example of the configuration of a transmission channel according to an embodiment of the present invention.

FIG. 27 shows an example of data structure for each channel through which data is transmitted via the HDMI cable 301 between the transmission processor 323 of the video recording/reproduction apparatus 310 and the transmission processor 342 of the television receiver 330. As shown in FIG. 27, as channels for transmitting video data, three channels, that is, channel 0, channel 1, and channel 2, are provided and furthermore, a clock channel for transmitting a pixel clock is provided. Furthermore, a DDC line and a CEC line are provided as control data transmission channels.

On the transmission side, transmission processors (transmitters) 323a, 323b, and 323c are provided within the transmission processor 323 for each channel for transmitting video data. Also, on the reception side, transmission processors (data receivers) 342a, 342b, and 342c are provided within the transmission processor 342 for each channel for transmitting video data.

The configuration of each channel will be described. In the channel 0, pixel data of B data, vertical synchronization data, horizontal synchronization data, and auxiliary data are transmitted. In the channel 1, pixel data of G data, two types of control data (CTL0, CTL1), and auxiliary data are transmitted. In the channel 2, pixel data of R data, two types of control data (CTL2, CTL3), and auxiliary data are transmitted.

Figure 28:
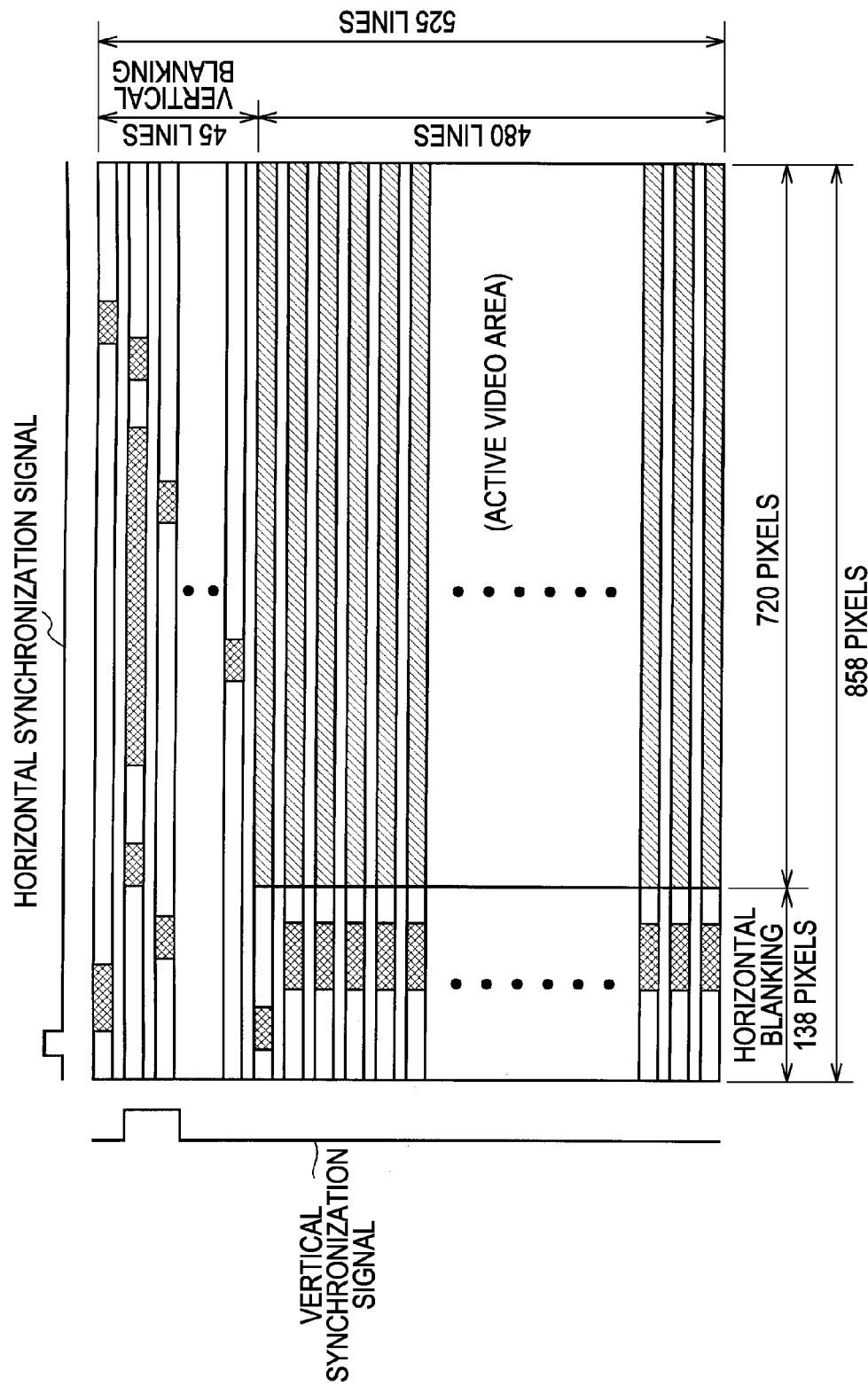
FIG. 28 is an illustration showing an example of bit structure according to an embodiment of the present invention.

FIG. 28 shows line structure and pixel structure for one frame, which is transmitted in the transmission configuration of this example. Video data (main video data) transmitted in the case of this example is uncompressed data, and a vertical blanking period and a horizontal blanking period are added thereto. More specifically, in the example of FIG. 28, a video area (area shown as an active video area) to be displayed is set to be pixel data of 480 lines×..720 pixels, and the number of lines and the number of pixels containing up to the blanking period are set to be 525 lines and 858 pixels, respectively. The area indicated by double hatching (the oblique lines in the right direction and in the left direction) in the blanking period is a period, in which auxiliary data can be added, which is called a data island.

Figure 29:
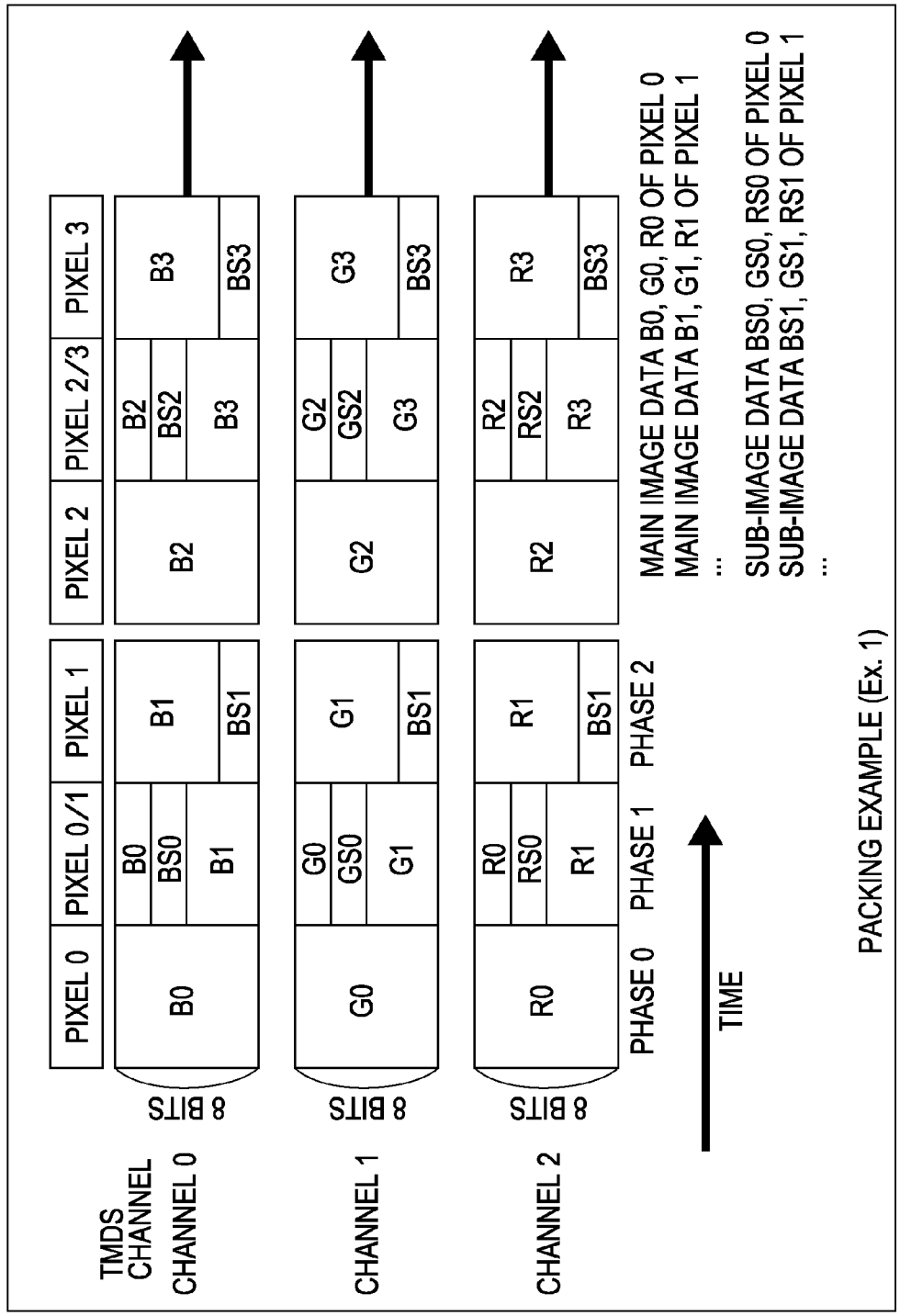
FIG. 29 is an illustration showing an example of a data packing example (example 1) according to an embodiment of the present invention.

Next, a description will be given, with reference to FIG. 29, of a state in which data is transmitted using channel 0, channel 1, and channel 2 through which pixel data is transmitted in the transmission configuration of this example. In the example of FIG. 29, data is arranged such that data of two pixels is transmitted in 3 pixel clocks. As data arranged in a marginal period for 2 bits, which occurs every 1.5 pixel clocks, sub-image data is used as an example. Phases 0, 1, and 2 shown in FIG. 29 each indicate one cycle of one pixel clock.

The data structure of FIG. 29 will be described. For example, regarding the B data, 8 bits among the 10 bits of the pixel 0 of the main image data in the period of phase 0 of the channel 0 are sent, the remaining 2 bits of the pixel 0 of the main image data are sent in the period at phase 1, and one pixel of B data of the sub-image data is sent in the period of the subsequent 2 bits.

Then, in the 4-bit period of the second half period of phase 1, 4 bits among the 10 bits of the next pixel 1 of the main image data are sent. In the period of the next phase 2, the remaining 6 bits of the pixel 1 of the main image data are sent, and in the period of the subsequent 2 bits, one pixel of the B data of the sub-image data is sent. Hereinafter, this arrangement is repeated. Regarding the G data of the channel 1 and the R data of the channel 2, the pixel data of the main image data and the pixel data of the sub-image are sent in the same data arrangement. In FIG. 29, data B0, G0, R0, B1, G1, and R1 each indicate pixel data of the three primary colors of the main image. Data BS0, GS0, RS0, BS1, GS1, and RS1 each indicate pixel data of the three primary colors of the sub-image.

Figure 30:
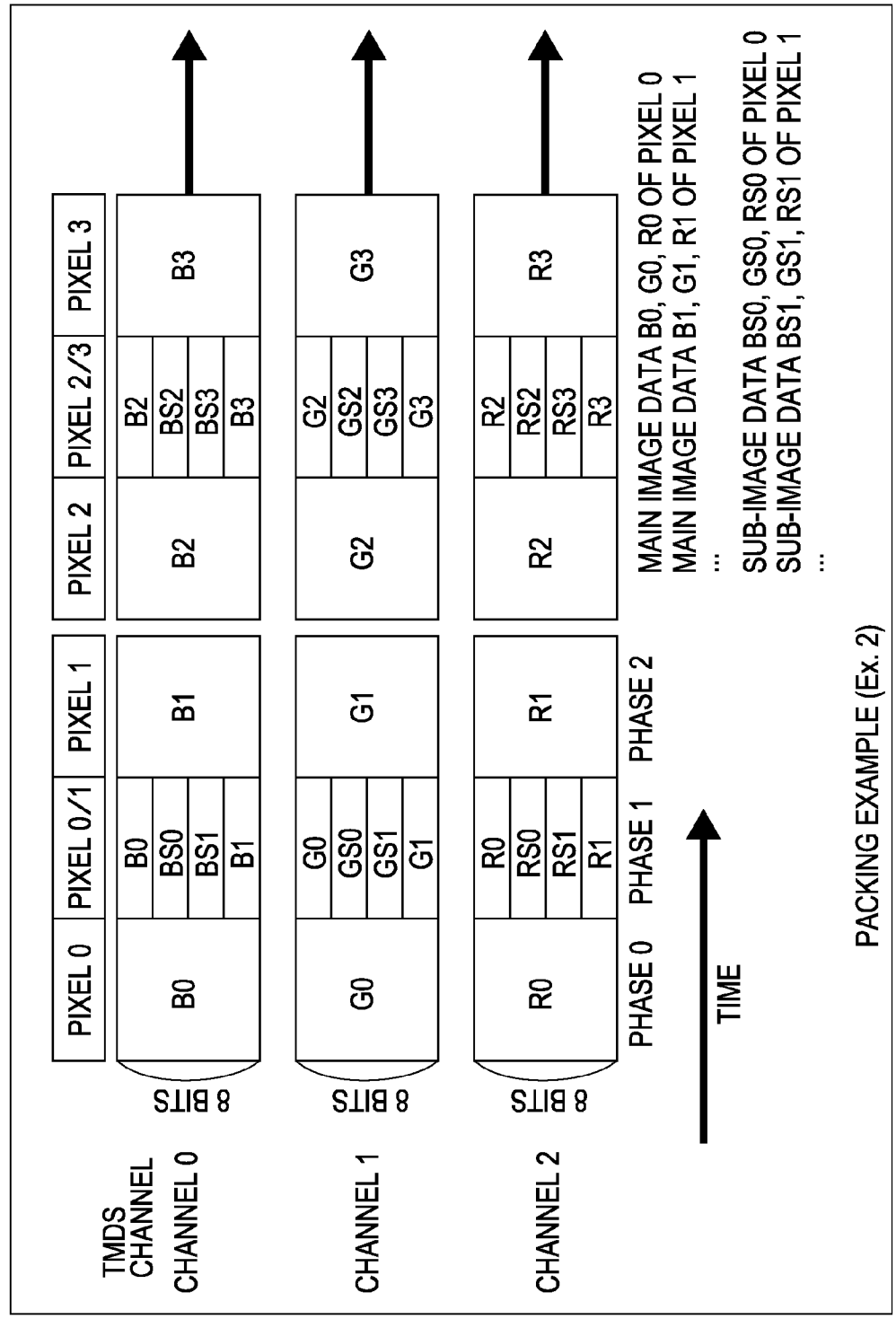
FIG. 30 is an illustration showing an example of a data packing example (example 2) according to an embodiment of the present invention.

FIG. 30 shows another example of data structure. In this example, when compared with the example of FIG. 29, as the period of phase 1, in the period of the first 2 bits, the remaining 2 bits of the pixel data of the main image of the pixel 0, which continues from the period of the previous phase 0, are sent. Next, 2-bit pixel data of the pixel 0 of the sub-image is sent, and furthermore, 2-bit pixel data of the pixel 1 of the sub-image is sent. Then, in the period of the final two bits at phase 1, the first 2 bits of the pixel data of the main image of the pixel 1 are sent, and at phase 2, the pixel data of the main image of the remaining 8 bits of pixel 1 is sent. In the manner described above, in the example of FIG. 30, the position at which the pixel data of the sub-image is arranged differs from that in the example of FIG. 29.

In the examples of FIGS. 29 and 30, as data other than the pixel data of the main image, the pixel data of the sub-image is used. Also, when other data, such as multi-channel audio data and control data, is to be arranged, it may be arranged at identical positions. As control data, for example, luminance control data for backlight required by a display panel may be sent.

FIG. 31 shows an example in which multiplexing data example is instructed from the source side to the sink side by using data called VSDB, which is data that specifies the structure of transmission data, when multiplexing for arranging data other than pixel data of a main image is performed in the manner described above. Data of VSDB is data transmitted using a DDC line (FIG. 27). In the case of the VSDB of this example, the data of the 6th byte indicates how many bits one pixel is composed of. In the case of this example, data of a total of 30 bits such that one pixel is 10 bits per color is shown. Then, the presence/absence of the sub-image is shown. In place of the data for the presence/absence of the sub-image, the presence/absence of addition of multi-channel audio or the presence/absence of addition of control data may be shown.

The controller 336 (FIG. 26) of the sink-side apparatus (television receiver 330) determines what kind of format the sub-image is transmitted by making a determination as to the data of the VSDB, and allows the demultiplexing circuit 344 or the like to perform processing, such as separation and decoding of the data of the received sub-image, so that display using the sub-image is correctly performed.

As data regarding the sub-image sent using VSDB, more detailed data, such as the number of pixels of the sub-image, may be sent. For example, when there are 4 types of formats A, B, C, and D as the format of the sub-image, the transmission may be configured such that which one of the 4 types the format is by using the low-order 4 bits of the 6th byte data. The details of the formats A, B, C, and D may be transmitted separately and may be reported to the sink-side apparatus. For example, the format A may be such that the sub-image has the same number of pixels, one pixel of each color is 2 bits, and the main image and the sub-image have the same frame rate. The format B may be such that the sub-image has a number of pixels of ¼ that of the main image, one pixel of each color is 8 bits, and the main image and the sub-image have the same frame rate. The details of such data structure of the sub-image may be transmitted and reported.

At this point, the data of VSDB is used to instruct a multiplexing data example from the source side. Alternatively, a device on the sink side may send identical data in order to show the capability of data that can be received (a display process capability). That is, when connected devices mutually authenticate, the controller of the sink-side apparatus shows its own display process capability to the source side by using the data of the VSDB (or other data). The controller on the source side constructs data so as to transmit the data of the sub-image at a format matching the capability. As a result of the above, a state of appropriate sub-image data transmission is reached.

The configuration in which data regarding a sub-image is transmitted using the data of the VSDB transmitted through a DDC line is an example. In addition, similar data, which is transmitted between the source-side apparatus and the sink-side apparatus, may be transmitted using another data period. For example, in a portion of a period of a data island in the blanking period shown in FIG. 28, additional information indicating that data containing a sub-image has been transmitted may be arranged.

At this point, the amount of data, such as a sub-image, that can be transmitted, will be studied. For example, when the frequency of the clock channel is approximately 225 MHz, data up to approximately 900 Mbps can be transferred on the basis of 225 MHz*(3 ch*8 bits)*((12 bits−10 bits)/12 bits)=900 Mbps. Furthermore, when a study is made on the basis of the number of pixels of a main image, in the case that the main image is 1920 pixels×..1080p at 60 Hz, the sub-video image becomes, for example, 1920 pixels×..1080p at 60 Hz at $2^6$=64 colors, and the sub-image is sent in synchronization with the main video image. In another example, when the main video image is 1920 pixels×..1080p at 60 Hz, if the resolution of the sub-image is made to be 960 pixels×..540p half that the length and width of the main image, a sub-video image such that one pixel is 8 bits is obtained for each color. Furthermore, a sub-video image of an SD resolution of 720 pixels×..480p at 60 Hz such that one pixel is 12 bits for each color can be sent in synchronization with the main video image. In the manner described above, for the sub-image, the color can be made to be represented by a larger number of bits, and the combination of the numbers of pixels can be changed as desired in a range not exceeding the transmission speed of data (dummy data in FIG. 34) that is left over in the transmission of the main image.

Figure 32:
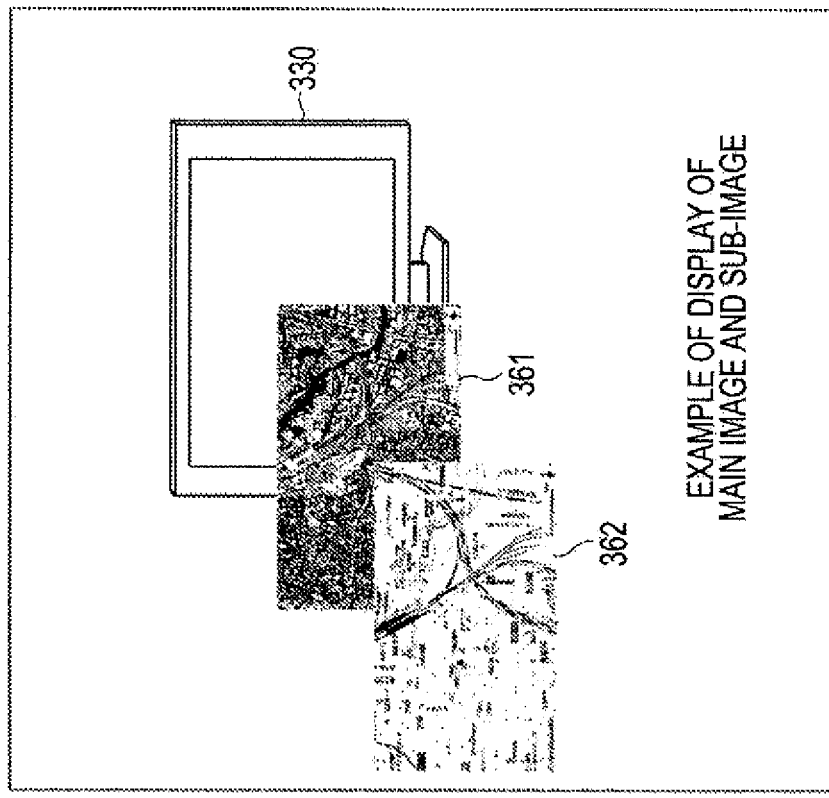
FIG. 32 is an illustration showing an example of display of a main image and a sub-image according to an embodiment of the present invention.

FIG. 32 shows an example of a main image and a sub-image. In this example, as a main image displayed in the television receiver 330, an aerial photograph (satellite photograph) image 361 of a specific place is shown, and a map image of that place is shown as a sub-image 362. By sending and displaying the main image and the sub-image that are related to each other in the manner described above, images can be used differently. In the case of this example, since the main image and the sub-image can be transmitted in such a manner that the bit positions are completely synchronized, synchronization data of the main image can be commonly used, and thus efficient transmission is possible.

By applying the transmission process of this example in the manner described above, the number of bits of the main image data can be increased to the number of bits in one transmission unit, and also, various kinds of data, such as a sub-image, can be transmitted using bit positions that are left over at that time. Thus, it is possible to achieve both a larger number of bits and improved transmission efficiency.

In the embodiment described thus far, an example has been described in which data of 10 bits per pixel is transmitted. When data of 12 bits, 14 bits, or the like differing from the number of bits (here, 8 bits) in basic transmission units is to be transmitted, other data such as a sub-image may be transmitted in the period of the bits that are left over in that case.

Furthermore, the present invention may be applied to a format at which transmission is possible at another number of bits, such as a format at which one pixel can be transmitted in units of 16 bits. Also, with regard to a unit for encryption and decryption, the present invention may be applied to processing performed by using another number of bits, such as 16 bits, as a unit.

The embodiment has been described on the assumption of the interface of the HDMI standard. The present invention can be applied to other similar transmission standards.

HDMI allows any video format timing to be transmitted and displayed. To maximize interoperability between products, common DTV formats have been defined. These video format timings define the pixel and line counts and timing, synchronization pulse position and duration, and whether the format is interlaced or progressive. HDMI also allows vendor-specific formats to be used.

In HDMI®, the video pixels carried across the link are in one of three different pixel encodings: RGB 4:4:4, $YC_BC_R$ 4:4:4 or $YC_BC_R$ 4:2:2.

The HDMI "source" determines the pixel encoding and video format of the transmitted signal based on the characteristics of the source video, the format and pixel encoding conversions possible at the "source", and the format and pixel encoding capabilities and preferences of the "sink".

In HDMI®, in order to provide maximum compatibility between video "sources" and "sinks", specific minimum requirements have been specified for "sources" and "sinks".

In HDMI®, some of support necessary conditions (i) to (vii) shown below are added to those specified in CEA-861-D.

(i) An HDMI "source" supports at least one of the following video format timings.
640×480p @ 59.94/60 Hz
720×480p @ 59.94/60 Hz
720×576p @ 50 Hz
(ii) An HDMI "source" that is capable of transmitting any of the following video format timings using any other component analog or uncompressed digital video output, is capable of transmitting that video format timing across the HDMI interface.
1280×720p @ 59.94/60 Hz
1920×1080i @ 59.94/60 Hz
720×480p @ 59.94/60 Hz
1280×720p @ 50 Hz
1920×1080i @ 50 Hz
720×576p @ 50 Hz
(iii) An HDMI "sink" that accepts 60 Hz video formats supports the 640×480p @ 59.94/60 Hz and 720×480p @ 59.94/60 Hz video format timings.
(iv) An HDMI "sink" that accepts 50 Hz video formats supports the 640×480p @ 59.94/60 Hz and 720×576p @ 50 Hz video format timings.
(v) An HDMI "sink" that accepts 60 Hz video formats, and that supports HDTV capability, supports 1280×720p @ 59.94/60 Hz or 1920×1080i @ 59.94/60 Hz video format timings.
(vi) An HDMI "sink" that accepts 50 Hz video formats, and that supports HDTV capability, supports 1280×720p @ 50 Hz or 1920×1080i @ 50 Hz video format timings.
(vii) An HDMI "sink" that is capable of receiving any of the following video format timings using any other component analog or uncompressed digital video input, is capable of receiving that format across the HDMI interface.
1280×720p @ 59.94/60 Hz
1920×1080i @ 59.94/60 Hz
1280×720p @ 50 Hz
1920×1080i @ 50 Hz During the "data island" period, HDMI carries HSYNC and VSYNC signals using encoded bits on "channel" 0. During "video data" periods, HDMI does not carry HSYNC and VSYNC and the "sink" should assume that these signals remain constant. During "control" periods, HDMI carries HSYNC and VSYNC signals through the use of four different control characters on TMDS "channel" 0.

Only pixel encodings of RGB 4:4:4, $YC_BC_R$ 4:2:2, and $YC_BC_R$ 4:4:4 (as specified in Section 6.5) may be used on HDMI.

All HDMI "sources" supports either $YC_BC_R$ 4:2:2 or $YC_BC_R$ 4:4:4 pixel encoding whenever that device is capable of transmitting a color-difference color space across any other component analog or digital video interface except where that device would be required to convert RGB video to $YC_BC_R$ in order to meet this requirement.

All HDMI "sinks" is capable of supporting both $YC_BC_R$ 4:4:4 and $YC_BC_R$ 4:2:2 pixel encoding when that device is capable of supporting a color-difference color space from any other component analog or digital video input.

If an HDMI "sink" supports either $YC_BC_R$ 4:2:2 or $YC_BC_R$ 4:4:4, then both are supported.

An HDMI "source" may determine the pixel-encodings that are supported by the "sink" through the use of the E-EDID. If the "sink" indicates that it supports $YC_BC_R$-formatted video data and if the "source" can deliver $YC_BC_R$ data, then it can enable the transfer of this data across the link.

HDMI "sources" and "sinks" may support color depths of 24, 30, 36 and/or 48 bits per pixel. All HDMI "sources" and "sinks" supports 24 bits per pixel.

Color depths of 30, 36, and 48 bits greater than 24 bits are defined as "deep color" modes. If an HDMI "source" or "sink" supports any "deep color" mode, it supports 36-bit mode though all "deep color" modes are optional.

For each supported "deep color" mode, RGB 4:4:4 is supported and optionally $YC_BC_R$ 4:4:4 may be supported. $YC_BC_R$ 4:2:2 is not permitted for any "deep color" mode.

An HDMI "sink" supports all EDID-indicated "deep color" modes on all EDID-indicated video formats except if that combination exceeds the Max TMDS Clock indication.

An HDMI "source" does not send any "deep color" mode to a "sink" that does not indicate support for that mode.

All specified video line pixel counts and video field line counts (both active and total) and HSYNC and VSYNC positions, polarities, and durations is adhered to when transmitting a specified video format timing.

For example, if a "source" is processing material with fewer active pixels per line than required (i.e. 704 pixels vs. 720 pixels for standard definition MPEG2 material), it may add pixels to the left and right of the supplied material before transmitting across HDMI. AVI bar info may need to be adjusted to account for these added pixels.

Detailed timing is found in CEA-861-D or a later version of CEA-861 for the following video format timings.

The primary video format timings are as follows.
640×480p @ 59.94/60 Hz
1280×720p @ 59.94/60 Hz
1920×1080i @ 59.94/60 Hz
720×480p @ 59.94/60 Hz
720(1440)×480i @ 59.94/60 Hz
1280×720p @ 50 Hz
1920×1080i @ 50 Hz
720×576p @ 50 Hz
720(1440)×576i @ 50 Hz The secondary video format timings are as follows.
720(1440)×240p @ 59.94/60 Hz
2880×480i @ 59.94/60 Hz
2880×240p @ 59.94/60 Hz
1440×480p @ 59.94/60 Hz
1920×1080p @ 59.94/60 Hz
720(1440)×288p @ 50 Hz
2880×576i @ 50 Hz
2880×288p @ 50 Hz
1440×576p @ 50 Hz
1920×1080p @ 50 Hz
1920×1080p @ 23.98/24 Hz
1920×1080p @ 25 Hz
1920×1080p @ 29.97/30 Hz
2880×480p @ 59.94/60 Hz
2880×576p @ 50 Hz
1920×1080i (1250 total) @ 50 Hz
720(1440)×480i @ 119.88/120 Hz
720×480p @ 119.88/120 Hz
1920×1080i @ 119.88/120 Hz
1280×720p @ 119.88/120 Hz
720(1440)×480i @ 239.76/240 Hz
720×480p @ 239.76/240 Hz
720(1440)×576i @ 100 Hz
720×576p @ 100 Hz
1920×1080i @ 100 Hz
1280×720p @ 100 Hz 720(1440)×576i @ 200 Hz
720×576p @ 200 Hz Next, a description will be given of pixel repetition.

Video formats whose unique pixel rate is 25 M pixels/sec or less needs pixel repetition because they are sent via the TMDS link. At the video format timings of 720×480i and 720×576i, pixels are always repeated.

Furthermore, the HDMI® "source" indicates use of pixel repetition using a "pixel-repetition field in AVI InfoFrame. This field indicates the number of pixel repetitions, each of which is unique, which is transmitted to the HDMI® "sink". In non-repeated formats, this value is set to 0.

Regarding pixel-repeated formats, this value indicates the number of pixels that can be discarded by the "sink" without losing real image content.

The "source" always indicates a pixel repetition count that is used correctly. The use of the "pixel-repetition field is optional with regard to the HDMI® "sink". The use of the pixel repetition is described in detail in CEA-861-D.

There are three types of pixel coding that can be sent via an HDMI® cable: $YC_BC_R$ 4:4:4, $YC_BC_R$ 4:2:2, and RGB 4:4:4. Whichever coding is used, this conforms to one of the methods described below.

Four color depths, that is, 24, 30, 36, and 48 bits, are supported per pixel. In the depths (the "deep color" mode) of 30, 36, and 48 bits, which are greater than 24 bits, only RGB 4:4:4 and $YC_BC_R$ 4:4:4 are permitted.

Figure 35:
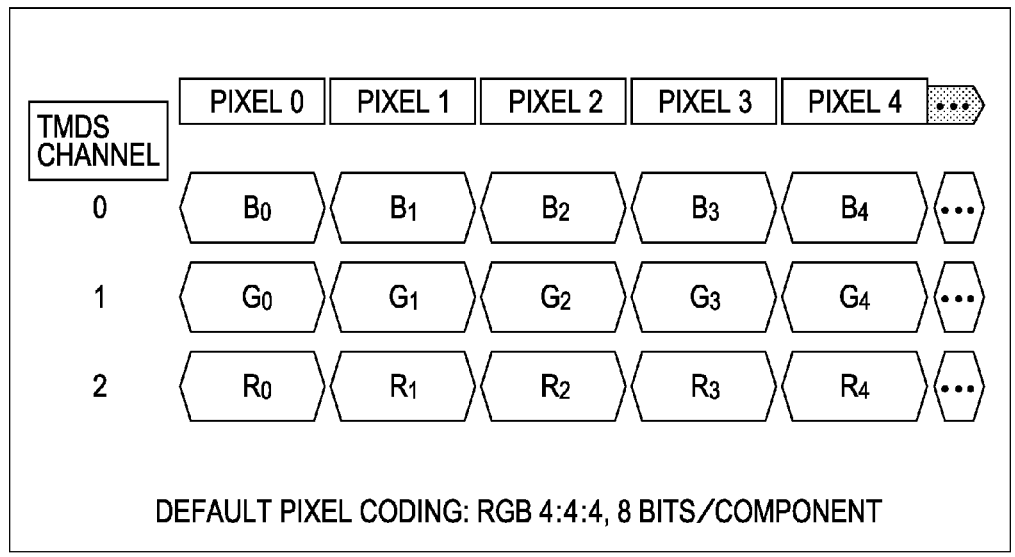
FIG. 35 shows RGB 4:4:4 for 24-bit color depth.

FIG. 35 shows default coding, that is, RGB 4:4:4 for a 24-bit color depth.

The R, G, and B components of the first pixel for a specific line of video are transferred in the first pixel in the video data period following a guard band character.

Figure 36:
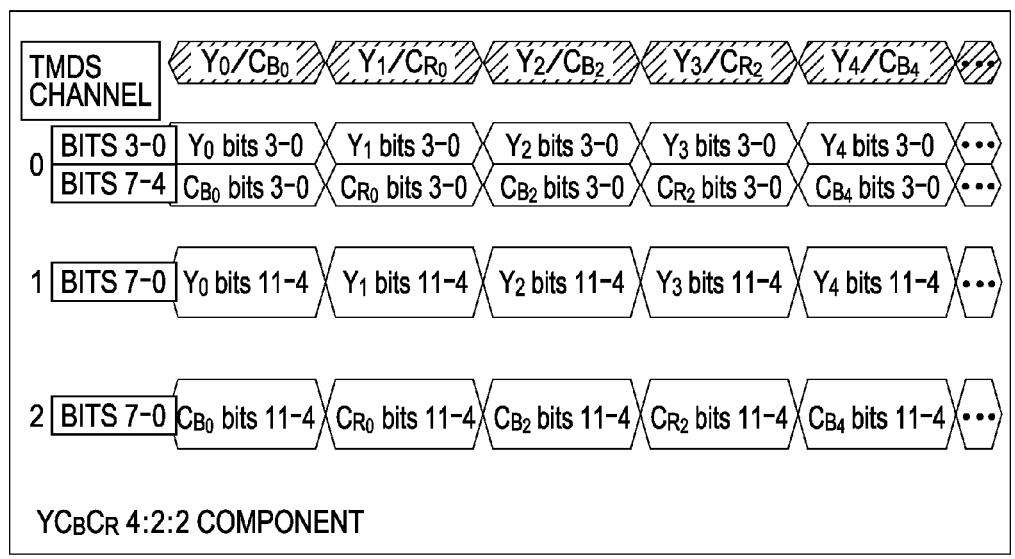
FIG. 36 shows a signal mapping and a timing for transferring 24-bit $YC_BC_R$ 4:2:2 data in HDMI®.

FIG. 36 shows a signal mapping and a timing for transferring 24-bit $YC_BC_R$ 4:2:2 data in HDMI®.

Since 4:2:2 data needs only two components per pixel, it is possible to assign more bits to each component. In FIG. 36, 24 bits that can be used are divided into 12 bits for the Y component and are divided into 12 bits for the C component.

$YC_BC_R$ 4:2:2 pixel coding in HDMI® resembles much the standard ITU-R BT.601. The high-order 8 bits of a Y sample are mapped to 8 bits of "channel" 1, and the low-order 4 bits are mapped to the low-order 4 bits of "channel" 0. When 12 bits or less are used, effective bits are justified to the left (that is, MSb=MSb) by embedding 0 to the LSb or lower bits.

The first pixel transmitted within the "video data period" contains three components Y0, Cb0, and Cr0. Y0 and Cb0 components are transmitted in the first pixel period, and Cr0 is transmitted in the second pixel period. The second pixel period also contains only the component Y1 of the second pixel. In the manner described above, through the link, one $C_B$ sample is sent at intervals of two pixels, and one Cr sample is sent at intervals of two pixels.

The two components ($C_B$ and $C_R$) are multiplexed and transmitted in the same signal path of the link.

Furthermore, in the third pixel, this process is repeated on the third pixel to be transmitted using the Y and $C_B$ components. In the next pixel period, the $C_R$ component of the third pixel and the Y component of the fourth pixel follow this.

That is, with regard to the image of $YC_BC_R$ 4:2:2, each pixel has Y component, and one pixel within the two pixels has $C_B$ component and $C_R$ component at intervals of two pixels. In HDMI®, bits are assigned to each of the Y component, the $C_B$ component, and the $C_R$ component of the pixel data of an image of $YC_BC_R$ 4:2:2.

Then, in HDMI®, as shown in FIG. 36, with regard to the pixel data of $YC_BC_R$ 4:2:2, the low-order 4 bits (bits 3-0) within the Y component of 12 bits of one pixel and the low-order 4 bits (bits 3-0) of one of the $C_B$ components and the $C_R$ components of 12 bits of one pixel can be transmitted through the TMDS channel #0 per clock of the pixel clock. Furthermore, through the TMDS channel #1, the high-order 8 bits (bits 11-4) within the Y component of 12 bits of one pixel is transmitted. Also, through the TMDS channel #2, the high-order 8 bits (bits 11-4) of one of the $C_B$ component and the $C_R$ component of 12 bits of one pixel can be transmitted.

That is, with respect to the pixel data of $YC_BC_R$ 4:2:2, the Y component of 12 bits of one pixel is transmitted per clock of the pixel clock. Furthermore, one of the $C_B$ component and the $C_R$ component of 12 bits of one pixel is transmitted per clock of one of two pixel clocks, and the other component is transmitted per remaining clock.

Figure 37:
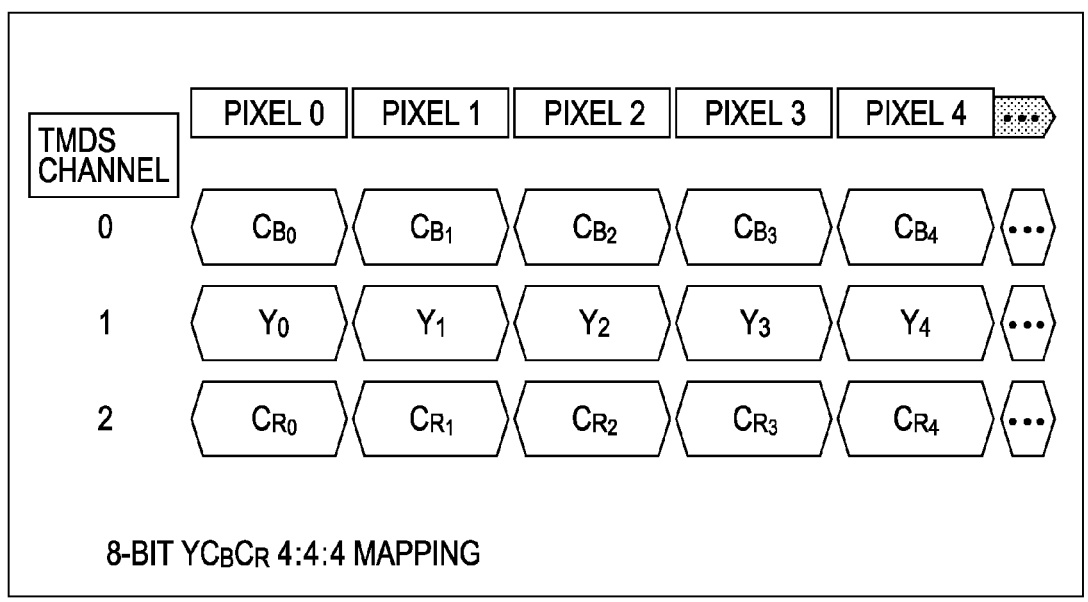
FIG. 37 shows a signal mapping and a timing for transferring 24-bit $YC_BC_R$ 4:4:4 data in HDMI®.

FIG. 37 shows a signal mapping and a timing for transferring 24-bit $YC_BC_R$ 4:4:4 data in HDMI®.

Next, a description will be given of packing of deep color pixels.

In the color depth of 24 bits/pixel, pixels are sent at the rate of one pixel per TMDS clock. In a color depth deeper than this, the TMDS clock is executed earlier than the source pixel clock and provides an extra bandwidth to additional pixels. Furthermore, the TMDS clock rate increases at the ratio of the pixel size to 24 bits.

The TMDS clock in each bit mode is shown in the following.

24-bit mode: TMDS clock=1.0×pixel clock (1:1)
30-bit mode: TMDS clock=1.25×pixel clock (5:4)
36-bit mode: TMDS clock=1.5×pixel clock (3:2)
48-bit mode: TMDS clock=2.0×pixel clock (2:1)

When operating in the "deep color" mode, all the video data (pixels) and signals (HSYNC, VSYNC, DE transition) are categorized as a series of pack formats "pixel groups". Each of them has the same number of pixels, and needs the same number of TMDS clocks for the purpose of transmission. In each TMDS clock, the "fragment of one pixel group" is transmitted. The number of pixels per group and the number of fragments per group are determined by the pixel size.

In the following, the number of pixels per group and the number of fragments per group in each bit mode are shown.

24-bit mode: 1 pixel/group, 1 fragment/group
30-bit mode: 4 pixels/group, 5 fragments/group
36-bit mode: 2 pixels/group, 3 fragments/group
48-bit mode: 1 pixel/group, 2 fragments/group During the active video period, the input pixel data is packed to these groups. During the blanking period, HSYNC and VSYNC are packed to these same groups. In the manner described above, all the video-related protocol elements are sent in direct proportion to the pixel clock. In the manner described above, it is ensured that there is no change in the relation between the pixel clock and the pixel data and between DE transition and HSYNC or VSYNC transition. This makes it possible to be supported in 24 bits/pixel, which is supported equally at another pixel size.

All other HDMI® protocol elements are not affected by "deep color" pixel packing. "Data islands", "video guard bands", and "preamble" occur in the same manner as that in a normal (24-bit) mode. That is, each "preamble" is 8 TMDS clocks, each "data island" is 32 TMDS clocks, and each "guard bandwidth" is 2 TMDS clocks.

In the manner described above, the pixel group is composed of 1, 2, or 4 pixels. Each pixel group is divided into 1, 2, 3, or 5 pixel fragments, in which one fragment is transmitted per TMDS clock.

In each TMDS character period (1 TMDS clock) within a stream to be transmitted, the "fragment of a single pixel group" is sent, thereby showing a specific "packing phase" of the group.

In order to synchronize the unpacking state of the pixel with the pixel packed state of the source, the "sink" needs to make a determination as to which character within a character stream indicates the start or phase 0 of a new group. In order to achieve this, the source sends a packet indicating the packing phase of a specific pixel. This packet is sent at least once per video field and indicates the then-current packing state. By using the data, the sink determines the first start point of each new group, confirms that synchronization continues by using periodic updating, or recovers from gross errors in the link.

FIG. 38 shows all "pixel codings" for all color depths.

In FIG. 38, packing of each phase is shown with regard to each mode. The packing phase for active video is identified as "mPn" (10P0, 10P1, etc.), and the packing phase of blanking is identified as "mCn" (10C0, 10C1, etc.).

During the blanking, one HSYNC value and one VSYNC value are sent per pixel clock in each "pixel group". This is for providing HSYNC and VSYNC slots, the number of which is greater by one than the necessary number per group (for example, 5 TMDS clocks with respect to 4 pixels). For this reason, the HSYNC and VSYNC values are simply repeated in the final TMDS clock of the group.

FIGS. 39 to 43 show a group size and the sequence of HSYNC and VSYNC transmission within the group with regard to a 24-bit mode, a 30-bit mode, a 30-bit mode, the remainder of a 36-bit mode, and a 48-bit mode.

In FIGS. 39 to 43, source HSYNC/VSYNC values of each pixel are labeled as S, T, U, and V (as necessary). The source HSYNC/VSYNC value S is the leftmost (earliest) code within the group.

In a 30-bit mode, if the "video data period" ends before the pixel group boundary, the remaining fragments are filled using one or more steps from the 10PCn sequence shown in FIG. 41 until the group boundary is reached (step 10PC4). After that, the normal sequence is used (steps 10Cn).

FIG. 41 shows the remainder of a 30-bit mode (the falling edge of DE occurs in an intermediate group). "10PCn" shown in FIG. 41 refers to a bridge state regarding the transition from 10Pn to 10C0.

When in a "deep color" mode, the "source" and "sink" each record the packing phase of the last pixel character of a "video data" period.

The "source" occasionally sends a "general control packet (GCP)" communicating the current color depth and the packing phase of the last pixel character sent prior to the GCP. This data is valid in the GCP whenever CD (CD0, CD1, CD2, CD3) is nonzero.

Whenever the "sink" receives a GCP with non-zero CD data, it should compare the receiver's own color depth and phase with the CD data. If they do not match, the "sink" should adjust its color depth and/or phase to match the CD data.

When transmitting "deep color", the "source" sends a "general control packet (GCP)" with an accurate CD field indicating the current color depth and with the PP field (PP0, PP1, PP2, PP3) indicating the packing phase of the last pixel character (within the last "video data period") sent prior to the GCP. "Sources" only send GCPs with non-zero CD to "sinks" that indicate support for "deep color", and only select color depths supported by the "sink".

Once a "source" sends a GCP with non-zero CD to a sink, it should continue sending GCPs with non-zero CD at least once per video field even if reverting to 24-bit color, as long as the "sink" continues to support "deep color".

When the "sink" does not receive a GCP together with a non-zero CD for 4 or more consecutive video fields, the "sink" should need to exit the deep color mode (revert to 24-bit color).

FIG. 44 shows color depth values (CD fields) of SB1.

As shown in FIG. 44, when the CD is 0, information on the color depth is not indicated. PP is set to 0.

When the CD is other than 0, the color depth is displayed, and the packing phase bit (PP) is valid.

When the "sink" does not indicate support for the "deep color", a CD field of 0 (the "color depth" is not indicated) is used. This value may also be used in the "deep color" mode to transmit a GCP indicating only "non-deep color" information (e.g., AVMUTE).

When the CD field indicates 24 bits per pixel, the PP field is invalid and should be ignored by the "sink".

In the "pixel packing phase" field (PP) of SB1, when the CD field is 0, the PP field is also set to 0. When the CD field is not 0, the PP field indicates the packing phase of the final fragment of the most recent "video data period" (prior to the GCP message).

Figures 45, 46:
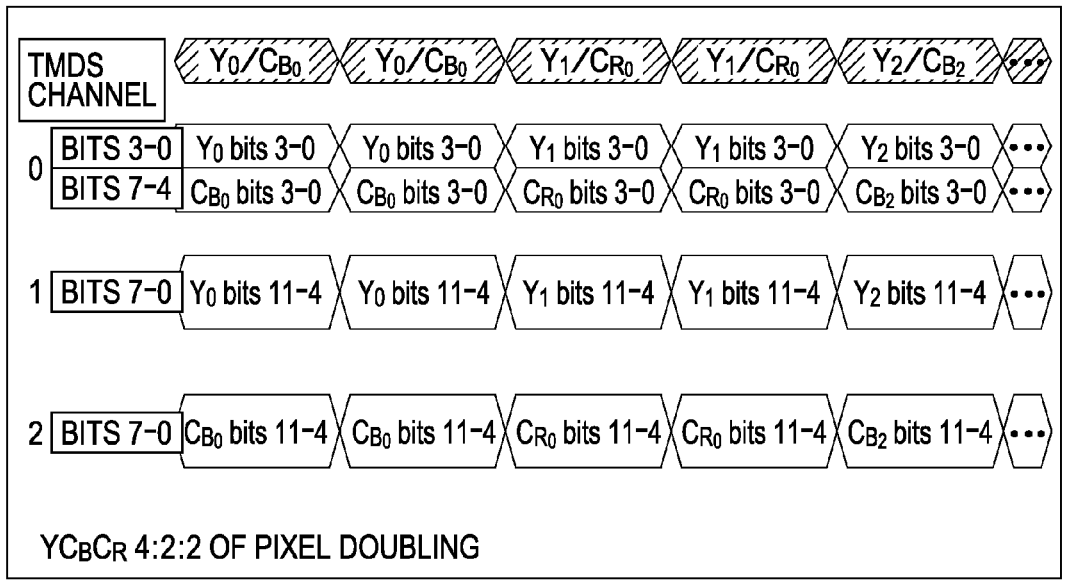
FIG. 45 shows specific PP values regarding each packing phase shown in a packing phase table in an early period.
FIG. 46 shows $YC_BC_R$ 4:2:2 of pixel-doubling.
Figure 48:
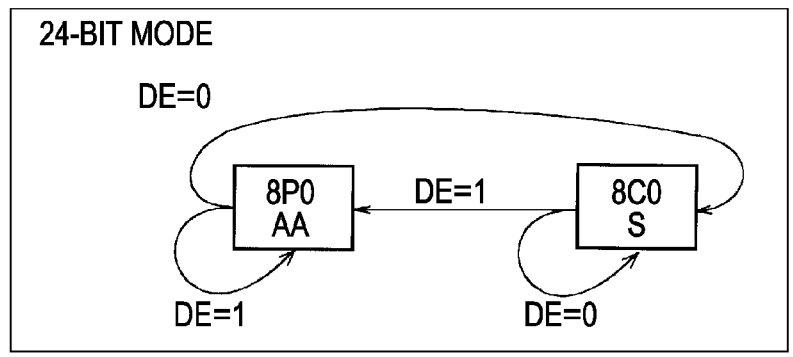
FIG. 48 is a state machine diagram for a 24-bit mode.
Figure 49:
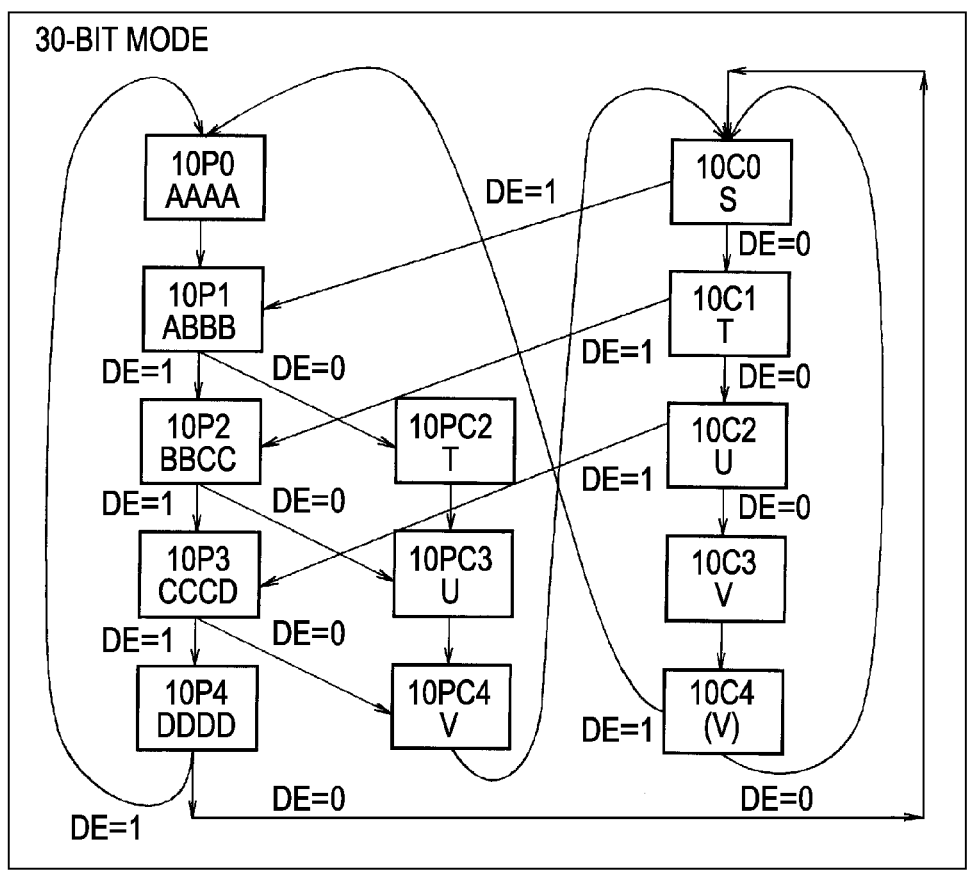
FIG. 49 is a state machine diagram for a 30-bit mode.
Figure 50:
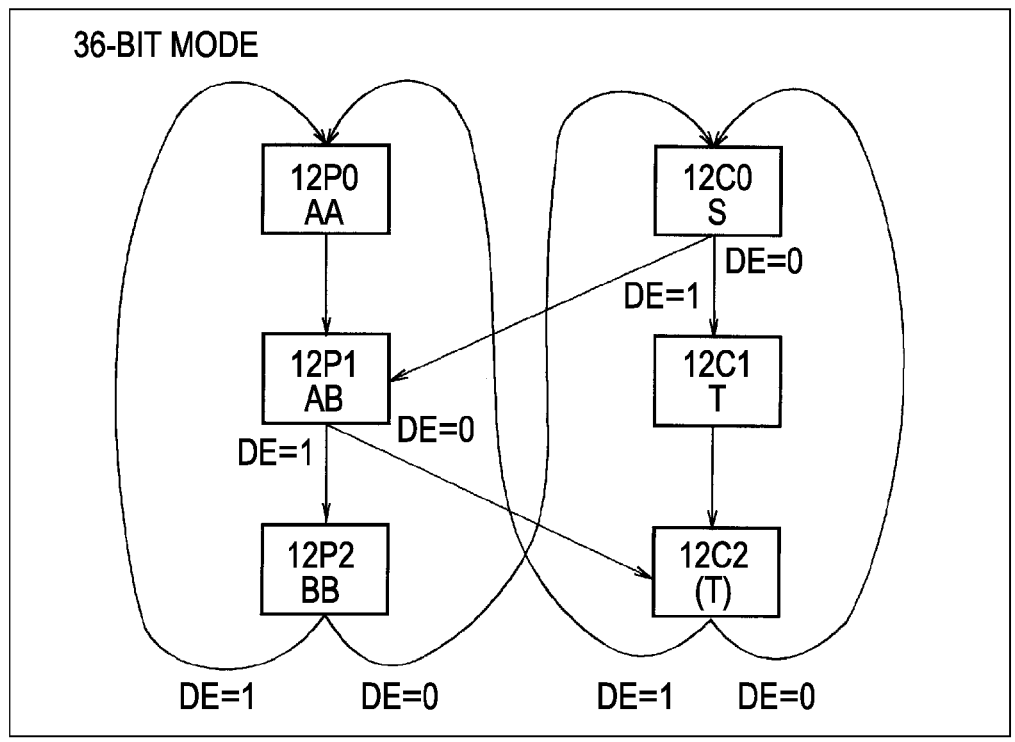
FIG. 50 is a state machine diagram for a 36-bit mode.
Figure 51:
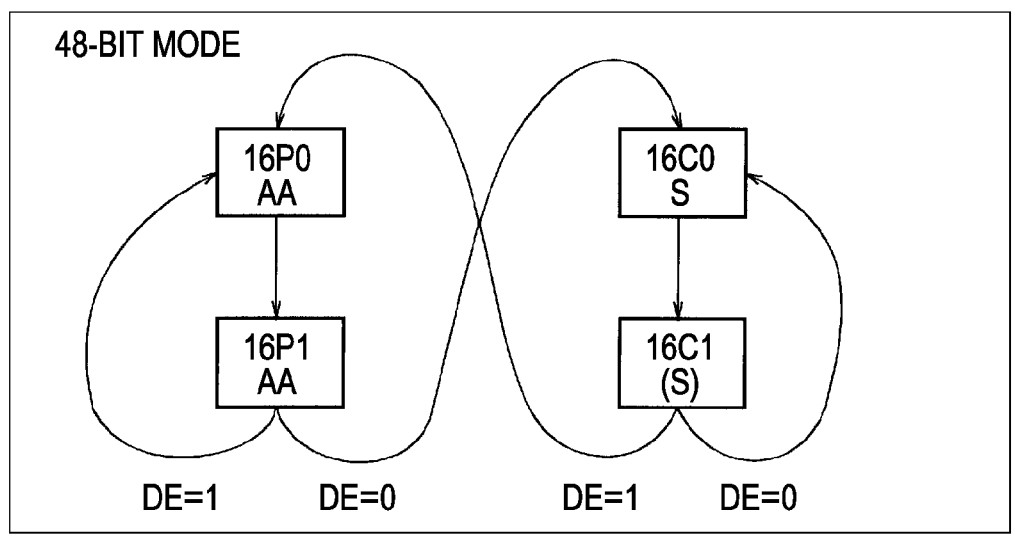
FIG. 51 is a state machine diagram for a 48-bit mode.

FIG. 45 shows a specific PP value regarding each packing phase shown in a packing phase table in an early period.

Since phase 0 always represents only part of the first pixel of the group, no "video data period" will end at phase 0. Therefore, Packing phase 0 does not need to be indicated using the PP bits. If the active video ends after the first pixel, then the final phase will be phase 1, containing the last bits of the first pixel.

If the transmitted video format has timing such that the phase of the first pixel of every "video data period" corresponds to pixel packing phase 0 (e.g., 10P0, 12P0, 16P0), the "source" may set the Default_Phase bit in the GCP. The "sink" may use this bit to optimize its filtering or handling of the PP field.

Next, a description will be given of a Default_Phasefield of GCP SB2.

When Default_Phase is 0, the PP bits may vary and the first pixel of each "video data period" may vary.

When Default_Phase is 1, (i) to (iv) described below are true.
  (i) The first pixel of each "video data period" always has a pixel packing phase of 0 (10P0, 12P0, 16P0).
  (ii) The first pixel following each "video data period" has a pixel packing phase of 0 (10C0, 12C0, 16C0).
  (iii) The PP bits are constant for all GCPs and will be equal to the last packing phase (10P4, 12P2, 16P1).
  (iv) The first pixel following every transition of HSYNC or VSYNC has a pixel packing phase of 0 (10C0, 12C0, 16C0).

Next, the above-described pixel repetition will be described further.

During pixel-doubling (Pixel_Repetition_Count=1), all of the data sent across during the first pixel period will be repeated during the second pixel period. The third pixel period will then represent the second actual pixel and so on.

FIG. 46 shows $YC_BC_R$ 4:2:2 of pixel-doubling.

Pixel repetition is permitted in conjunction with "deep color modes". The source replicates the pixels as described above prior to deep color packing into multiple fragments.

Next, a description will be given of video quantization ranges.

Black and white levels for video components are either a "full Range" or a "limited range". $YC_BC_R$ components are always a limited range while RGB components may be either a full range or a limited range. While using RGB, the limited range is used for all video formats defined in CEA-861-D, with the exception of VGA (640×480) format, which requires the full range.

FIG. 47 shows a video color component gamut.

The component gamut regarding xvYCC has been described in IEC 61966-2-4.

Next, a description will be given of colorimetry. "Sources" will typically use the specific default colorimetry for the video format being transmitted. If no colorimetry is indicated in the AVI InfoFrame's C field (C1, C0) then the colorimetry of the transmitted signal matches the default colorimetry for the transmitted video format.

The default colorimetry for all 480-line, 576-line, 240-line, and 288-line video formats described in CEA-861-D is based on SMPTE 170M.

The default colorimetry of the high-definition video formats (1080i, 1080p, and 720p) described in CEA-861-D is based on ITU-R BT.709-5.

The default colorimetry of the other video formats is sRGB.

Next, a description will be given of applicable colorimetry standards.

For any video categorized as SMPTE 170M, ITU-R BT.601-5 Section 3.5 is used for any color space conversion needed in the course of processing.

The encoding parameter values are as defined in Table 3 of ITU-R BT.601-5.

For any video categorized as ITU-R BT.709, Part 1, Section 4 of that document is used for any color space conversion needed in the course of processing.

The digital representation is as defined in Part 1, Section 6.10 of ITU-R BT.709-5.

IEC 61966-2-4 (xvYCC) defines the "Extended-gamut YCC color space for video applications". It is based on the YCC color encoding described in ITU-R BT.709-5, but extends its definition to a much wider gamut.

xvCC601 is based on colorimetry defined in ITU-R $BT_{.601}$, and $xvYCC_{709}$ is based on colorimetry defined in ITU-R BT.709. The details have been described in Chapter 4.3 of IEC 61966-2-4.

Any "source" transmission of xvYCC video (either $xvYCC_{601}$ or $xvYCC_{709}$) is accompanied by the transmission of valid gamut boundary metadata.

If the attached "sink" does not support xvYCC or "gamut metadata packets", then the source should not transmit xvYCC-encoded video and does not indicate $xvYCC_{601}$ or $xvYCC_{709}$ in the AVI InfoFrame.

Next, a description will be given of gamut-related metadata.

HDMI® has capability of sending description of the video gamut boundary by using a "gamut metadata packet".

Furthermore, the "sink" sets one or more bits of MD0, MD1, and the like in a "colorimetry data block", thereby indicating support for a specific transmission profile.

When the EDID of the attached "sink" does not contain a "colorimetry data block", the "source" does not transmit a "gamut metadata packet". Note should be taken as to the fact that the xvYCC colorimetry requires that the gamut metadata be transmitted.

FIGS. 48 to 51 are state machine diagrams for each mode of a 24-bit mode, a 30-bit mode, a 36-bit mode, and a 48-bit mode.

For each mode, the source sequence starts at phase 0 and is incremented through each phase. When DE=1 (pixel data can be used), a pixel data fragment mPn is transmitted. When DE=0, a blanking fragment mCn is transmitted.

Next, a description will be given of recommended N and expected CTS values.

FIGS. 52 to 57 show recommended values of N of the standard pixel clock rate in a "deep color" mode.

FIG. 52 shows recommended N and expected CTS values of bits/pixel for 32 kHz. FIG. 53 shows recommended N and expected CTS values of 36 bits/pixel for 44.1 kHz and multiples. FIG. 54 shows recommended N and expected CTS values of 36 bits/pixel for 48 kHz and multiples.

FIG. 55 shows recommended N and expected CTS values of bits/pixel for 32 kHz. FIG. 56 shows recommended N and expected CTS values of 48 bits/pixel for 44.1 kHz and multiples. FIG. 57 shows recommended N and expected CTS values of 48 bits/pixel for 48 kHz and multiples.

The "source" having a non-interferential clock is recommended to use values shown for TMDS clocks of the "others"

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A transmission method for transmitting 24 bit pixel data of an uncompressed image for one screen in one direction to a receiving apparatus by using a differential signal transmitted via a plurality of transition minimized differential signaling (TMDS) channels, the TMDS channels being operable to transmit data of a fixed number of bits per clock transition of a pixel clock in a valid image period, the valid image period being a period between sequential vertical synchronization signals and not including a horizontal blanking period and a vertical blanking period, the transmission method comprising:

receiving, via a display data channel (DDC) line, high resolution image data related information which indicates whether or not the receiving apparatus supports a high resolution image having pixel data of 30 bit, 36 bit or 48 bit, the high resolution image data related information is described in High Definition Multimedia Interface (HDMI) Vender Specific Data Bit (VSDB) of Enhanced Extended Display Identification Data (E-EDID) stored in the receiving apparatus;

determining whether or not the receiving apparatus supports a high resolution image based on the high resolution image data related information; and based on the determining, transmitting high resolution image data in one direction to the receiving apparatus by using a differential signal transmitted via the plurality of TMDS channels in the valid image period, raising a frequency of the pixel clock, and inserting a color depth (CD) bit, which is related to a bit number of the high resolution image data, into a general control packet, the general control packet including a general control packet header and general control subpacket including CD values, being transmitted during a data island period of the high resolution image data, in one direction, to the receiving apparatus, in which the CD values of CD2=1, CD1=0 and CD0=1 indicate 30 bits per pixel, the CD values of CD2=1, CD1=1 and CD0=0 indicate 36 bits per pixel, and the CD values of CD2=1, CD1=1 and CD0=1 indicate 48 bits per pixel, wherein during the transmitting step, after raising the frequency of the pixel clock, one pixel data of the high resolution image data of 30 bit is transmitted in 1.25 pixel clock transitions, one pixel data of the high resolution image data of 36 bit is transmitted in 1.5 pixel clock transitions, or one pixel data of the high resolution image data of 48 bit is transmitted in two pixel clock transitions, in which the high resolution image data is encrypted in accordance with High-Bandwidth Digital Content Protection (HDCP).

2. A transmission apparatus for transmitting 24 bit pixel data of an uncompressed image for one screen transmitted in one direction to a receiving apparatus by using a differential signal transmitted via a plurality of transition minimized differential signaling (TMDS) channels, the TMDS channels being operable to transmit data of a fixed number of bits per clock transition of a pixel clock in a valid image period, the valid image period being a period between sequential vertical synchronization signals and not including a horizontal blanking period and a vertical blanking period, the transmission apparatus comprising:

a receiving unit that, via a display data channel (DDC) line, receives high resolution image data related information which indicates whether or not the receiving apparatus supports a high resolution image having pixel data of 30 bit, 36 bit or 48 bit, in which the high resolution image data related information is described in High Definition Multimedia Interface (HDMI) Vender Specific Definition Bit (VSDB) of Enhanced Extended Display Identification Data (E-EDID) stored in the receiving apparatus;

a determination unit that determinates whether or not the receiving apparatus supports a high resolution image based on the high resolution image data related information;

a transmitting unit that transmits high resolution image data in one direction to the receiving apparatus by using a differential signal transmitted via the plurality of TMDS channels in the valid image period, raising a frequency of the pixel clock, and inserting a color depth (CD) bit, which is related to a bit number of the high resolution image data, into a general control packet, the general control packet including a general control packet header and a general control subpacket including CD values, being transmitted during a data island period of the high resolution image data in one direction to the receiving apparatus, in which the CD values of CD2=1, CD1=0 and CD0=1 indicate 30 bits per pixel, the CD values of CD2=1, CD1=1 and CD0=0 indicate 36 bits per pixel, and the CD values of CD2=1, CD1=1 and CD0=1 indicate 48 bits per pixel, wherein, after the transmitting unit raises the frequency of the pixel clock, one pixel data of the high resolution image data of 30 bit transmitted in 1.25 pixel clock transitions, one pixel data of the high resolution image data of 36 bit transmitted in 1.5 pixel clock transitions, or one pixel data of the high resolution image data of 48 bit is transmitted in two pixel clock transitions, in which the high resolution image data is encrypted in accordance with High-Bandwidth Digital Content Protection (HDCP).

* * * * *